United States Patent
Disorbo

(10) Patent No.: US 9,499,334 B2
(45) Date of Patent: Nov. 22, 2016

(54) MODULAR SHIPPING APPARATUS AND SYSTEM

(71) Applicant: Cargo Cube Systems, LLC, Margate, FL (US)

(72) Inventor: Aldo Disorbo, Davie, FL (US)

(73) Assignee: Cargo Cube Systems, LLC

( * ) Notice: Subject to any disclaimer, the term of this patent is extended or adjusted under 35 U.S.C. 154(b) by 0 days.

(21) Appl. No.: 14/973,830

(22) Filed: Dec. 18, 2015

(65) Prior Publication Data

US 2016/0101931 A1 Apr. 14, 2016

Related U.S. Application Data

(63) Continuation-in-part of application No. 14/414,473, filed as application No. PCT/US2015/011088 on Jan. 13, 2015, and a continuation-in-part of application No. 14/361,280, filed on May 28, 2014, and a continuation (Continued)

(51) Int. Cl.
*B65D 88/00* (2006.01)
*B65D 88/12* (2006.01)
*B65D 90/00* (2006.01)

(Continued)

(52) U.S. Cl.
CPC ............... *B65D 88/12* (2013.01); *B60P 1/435* (2013.01); *B65D 88/129* (2013.01); *B65D 90/008* (2013.01); *B65D 90/0066* (2013.01); *B65D 90/02* (2013.01); *B65D 90/08* (2013.01); *B65D 90/18* (2013.01)

(58) Field of Classification Search
CPC .... B65D 88/00; B65D 88/005; B65D 88/02; B65D 8/022; B65D 8/027; B65D 88/10; B65D 88/12; B65D 88/121; B65D 88/127; B65D 88/128; B65D 88/129; B65D 90/004; B65D 90/006; B65D 9/0066; B65D 9/0073; B65D 9/008; B65D 9/02; B65D 9/023; B65D 9/08; B65D 9/18
See application file for complete search history.

(56) References Cited

U.S. PATENT DOCUMENTS 1,693,607 A * 12/1928 Kellett ...................... B60P 7/13
105/159
2,172,154 A * 9/1939 Perin ........................ B60P 7/13
220/1.5

(Continued)

FOREIGN PATENT DOCUMENTS

CA 2144886 CA 9/1996

*Primary Examiner* — Steven A. Reynolds
*Assistant Examiner* — Javier A Pagan
(74) *Attorney, Agent, or Firm* — Jennifer Meredith, Esq.; Meredith & Keyhani, PLLC

(57) ABSTRACT

A cargo container system, comprising: a base; at least four end frame supports attached substantially perpendicular to the base and having a substantially closed square portion with four sides and having outer extensions extending from two of the four sides and an additional support extending from the junction of the remaining two of the four sides of the substantially closed square portion, the additional support having two substantially L-shaped portions that are substantially parallel to the outer extensions and each of the at least four end frame supports having a corner support that is substantially parallel to the junction; at least three panels having two S-shaped ends, with at least one S-shaped end interposed between one of the two substantially L-Shaped portions; at least three rectangular frames removably attached to a corner support; a top; at least one door attached to one of the outer extensions.

29 Claims, 71 Drawing Sheets

Related U.S. Application Data of application No. PCT/US2014/034186, filed on Apr. 15, 2014, and a continuation of application No. 14/242,998, filed on Apr. 2, 2014.

(60) Provisional application No. 62/241,263, filed on Oct. 14, 2015, provisional application No. 61/927,957, filed on Jan. 15, 2014.

(51) Int. Cl.
*B65D 90/18* (2006.01)
*B65D 90/02* (2006.01)
*B60P 1/43* (2006.01)
*B65D 90/08* (2006.01)

(56) References Cited

U.S. PATENT DOCUMENTS

| | | | |
|---|---|---|---|
| 2,287,886 A | 6/1942 | Kellett | |
| 2,858,774 A | 11/1958 | Lee | |
| 2,988,036 A | 6/1961 | Monneyhan | |
| 3,315,826 A | 4/1967 | Gardner | |
| 3,722,705 A | 3/1973 | Gould | |
| 3,735,884 A | 5/1973 | Klett | |
| 3,854,544 A * | 12/1974 | Kolchev | B65D 7/28 180/11 |
| 3,866,539 A | 2/1975 | Gasser | |
| 4,130,208 A | 12/1978 | Barry | |
| 4,231,695 A * | 11/1980 | Weston, Sr. | B60P 1/52 277/590 |
| 4,344,368 A | 8/1982 | Remington | |
| 4,421,186 A | 12/1983 | Bradley | |
| 4,699,337 A | 10/1987 | Lewis | |
| 4,747,504 A * | 5/1988 | Wiseman | B65D 88/14 220/1.5 |
| 4,770,589 A | 9/1988 | Bryan | |
| 4,976,365 A | 12/1990 | Seo | |
| 6,485,239 B2 | 11/2002 | Afful | |
| 6,622,854 B2 | 9/2003 | Coblentz | |
| 6,824,338 B2 * | 11/2004 | Looker | B60P 7/13 410/35 |
| 7,482,928 B2 | 1/2009 | Brackmann | |
| 7,686,550 B2 | 3/2010 | Mix | |
| 8,353,388 B2 | 1/2013 | Rice | |
| 8,718,372 B2 | 5/2014 | Holeva | |
| 2008/0211669 A1 * | 9/2008 | Dagher | B65D 90/022 340/561 |
| 2010/0091094 A1 | 4/2010 | Serowski | |
| 2010/0147842 A1 * | 6/2010 | Reynard | B65D 88/022 220/23.88 |
| 2011/0234389 A1 | 9/2011 | Mellin | |
| 2012/0205943 A1 | 8/2012 | Nelson | |
| 2015/0053691 A1 * | 2/2015 | Sanger | B65G 65/00 220/544 |
| 2015/0129444 A1 * | 5/2015 | Witczak | B65D 85/66 206/389 |
| 2016/0055506 A1 | 2/2016 | Tama | |

\* cited by examiner

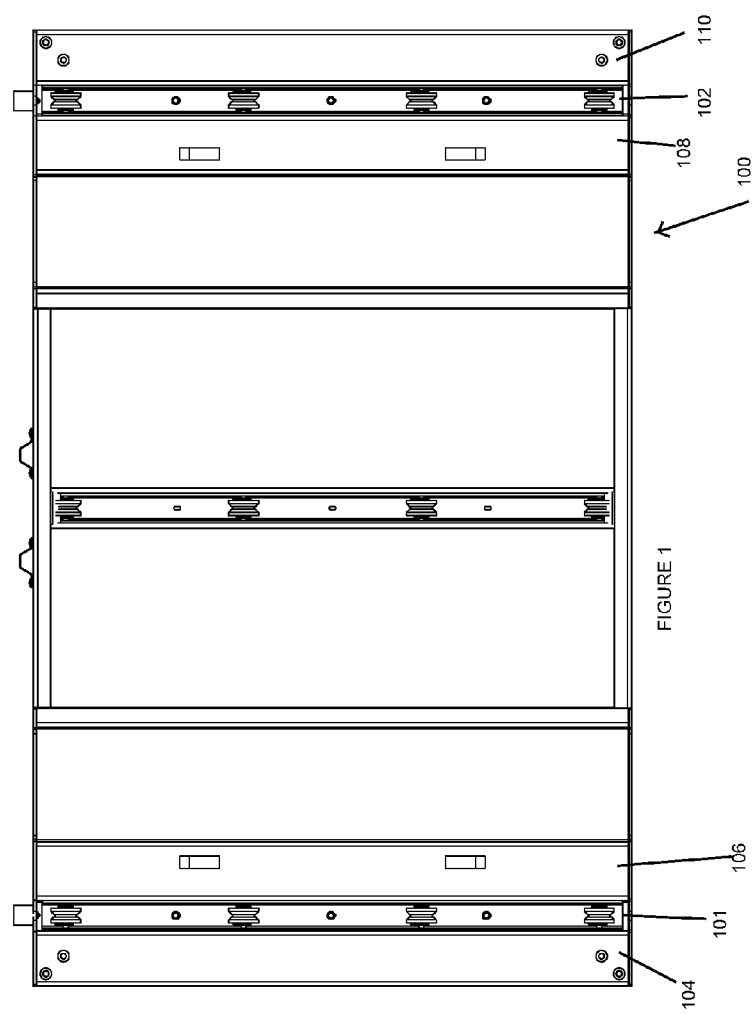
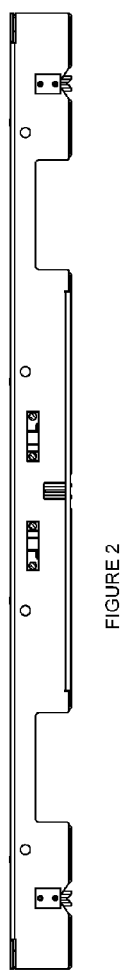
FIGURE 1
FIGURE 2

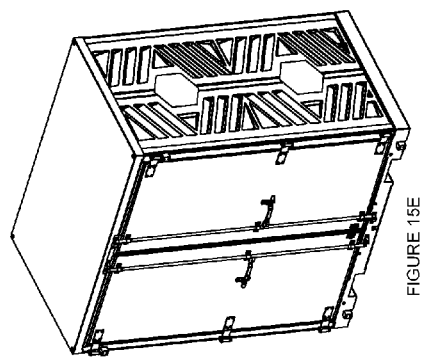
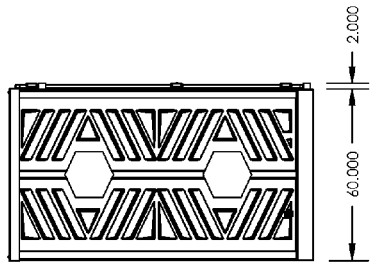
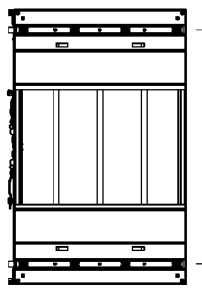
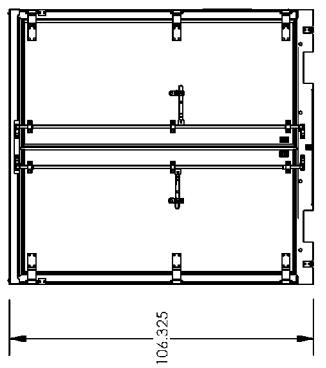
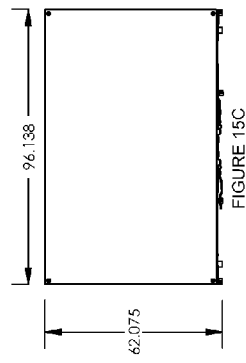

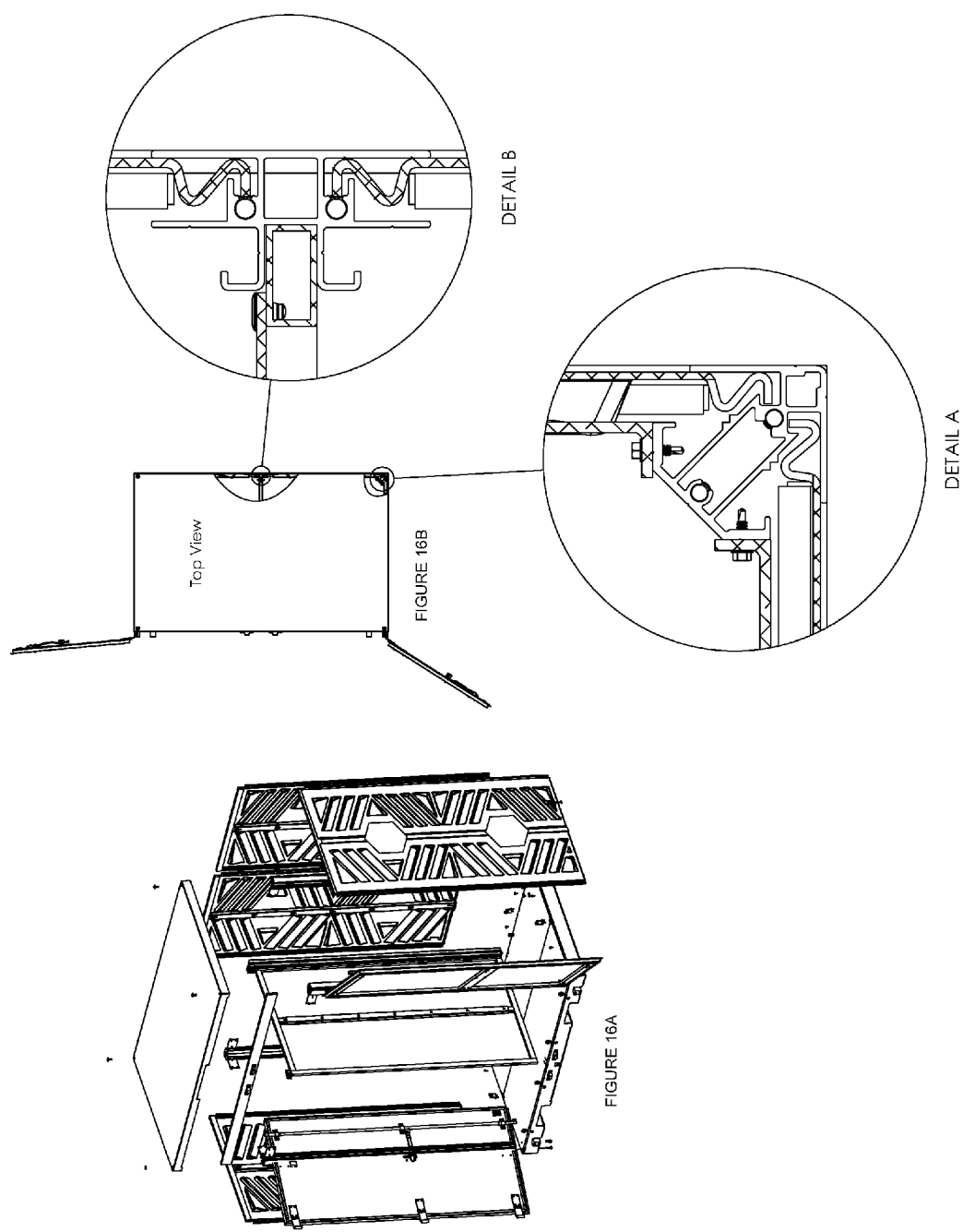

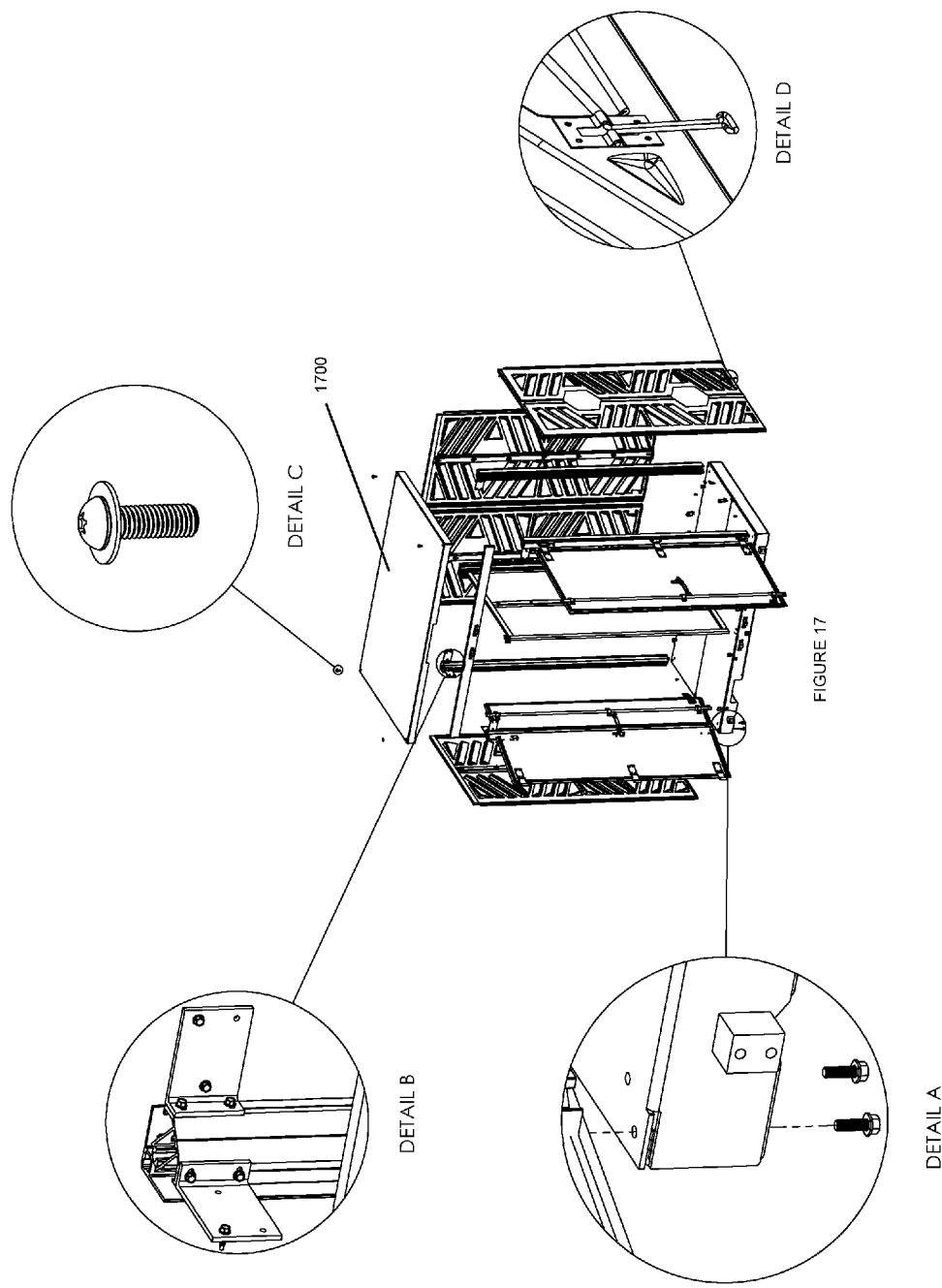

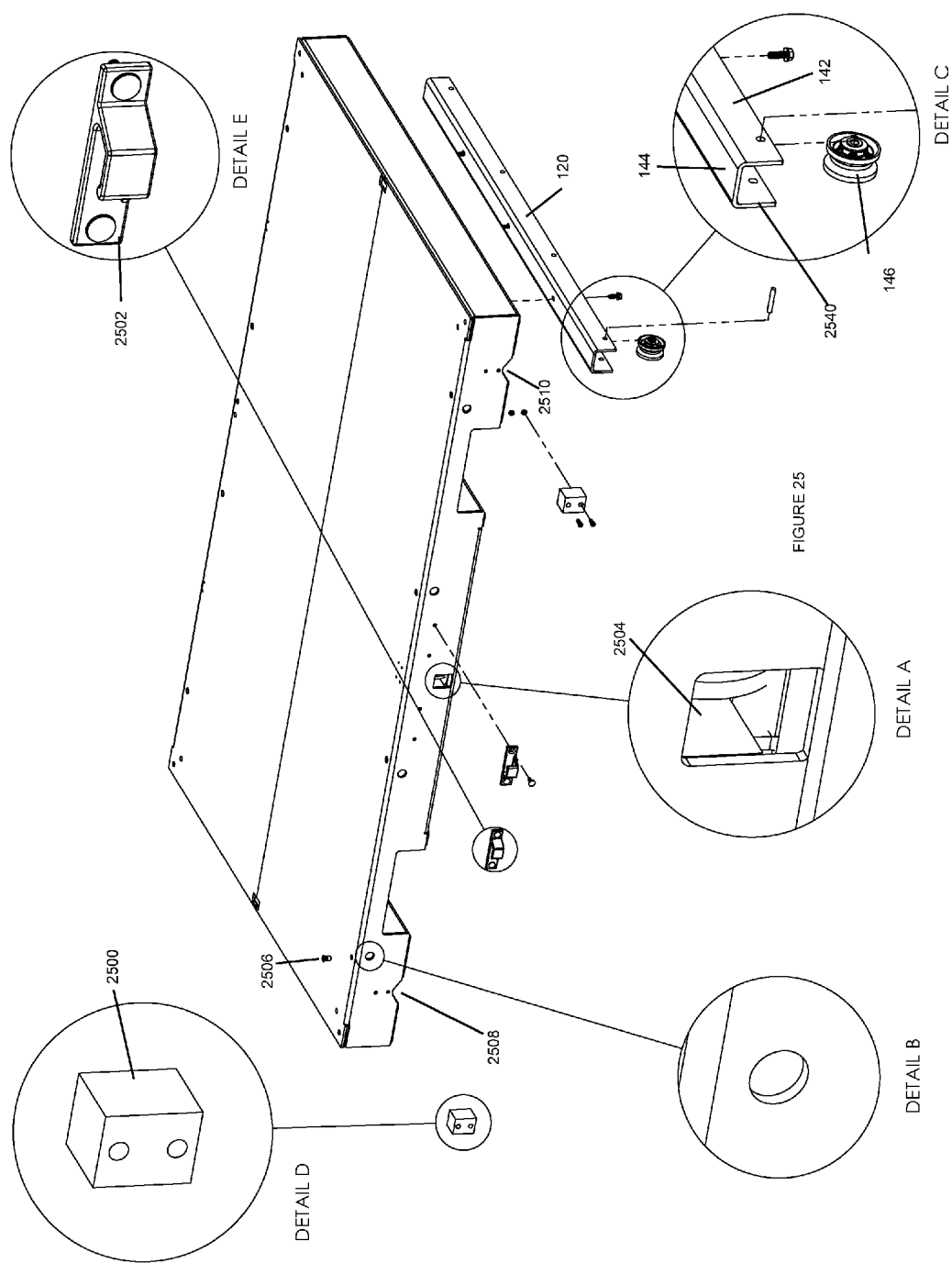

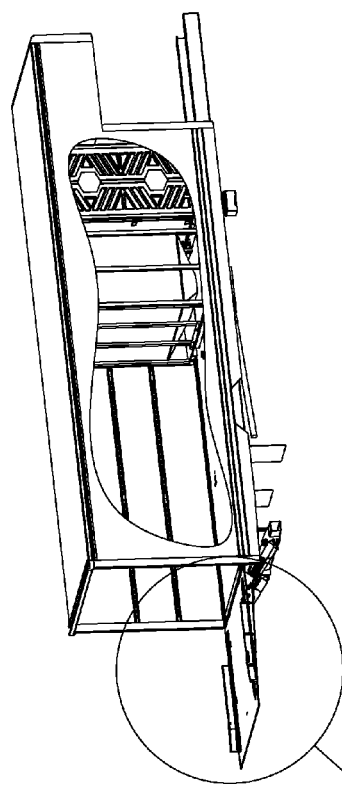
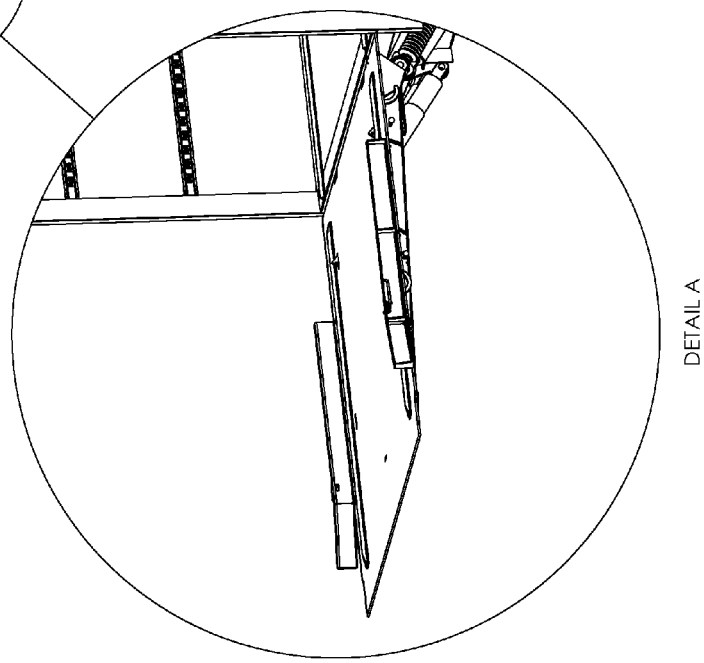
FIGURE 33
DETAIL A

DETAIL A

DETAIL A

DETAIL A

MODULAR SHIPPING APPARATUS AND SYSTEM

FIELD OF THE INVENTION

The present invention relates generally to the field of transportation, storage, and shipping. The present invention is a system to transport, consolidate and store all types of cargo. The system is designed to the reduce cost of transportation and labor. It is also designed to ensure security of cargo for worldwide transportation.

BACKGROUND

In the shipping industry, it is desirable to utilize all of the space available. The simple stacking of a plurality of boxes having variable shapes often results in wasted space in a storage compartment. Unused space in a storage compartment also increases the likelihood that objects stored there will shift during transport, suffering damage or fracture.

Shipping is common, as are large-scale shipping vessels. However, much ground transportation is not efficiently conducted. In addition, trailers used for shipping may elevate several feet off the ground. Operating one of these trailers requires the use of ramps or the lifting by human operators in an effort to place objects in one of said trailers. Trailer lifts have also been developed to assist in this operation.

Once objects are placed inside a trailer it is often challenging to stack and arrange said objects in an alignment in which they can be transported in an efficient manner utilizing all available space, and in such a way so as to prevent shifting or damage during transport.

Distribution centers, where cargo is redistributed among trailers and forklifts, are commonly used. However, it is difficult to operate a forklift inside a trailer. In addition, a pallet generally used with standard forklifts does not have the same dimensions as that of a trailer. Thus, using forklifts may require less manual labor, but does not improve the ability to maximize the use of storage space.

It is therefore desirable to provide a means to efficiently maximize the amount of space used inside a storage or transportation container.

It is also desirable to provide a means for efficiently and easily arranging transported objects inside a trailer or other compartment.

It is also desirable to provide a system that may be utilized in conjunction with a rail system, which is more cost effective.

The present invention also seeks to provide an efficient manner in which to transport commodities.

BRIEF SUMMARY OF THE INVENTION

Accordingly, objects of the present invention are to provide modular shipping systems, apparatuses and methods for improving efficient use of space in storage compartments in the transport and shipping industries.

It is therefore an object of the present invention to provide an apparatus and system for improving transportation and storage of cargo. According to one aspect of the present invention, a cargo container system is provided, comprising: a base (6800); at least four end frame supports (6802) attached substantially perpendicular to the base, wherein each of the end frame supports (6802) has a substantially closed square portion (6804) with four sides and having outer extensions (6806 and 6810) extending from two of the four sides and an additional support (6814) extending from the junction (6812) of the remaining two of the four sides of the substantially closed square portion (6804), wherein the additional support (6814) has two substantially L-shaped portions (6816 and 6818) that are substantially parallel to the outer extensions (6806 and 6810) and each of the at least four end frame supports having a corner support (6822) that is substantially parallel to the junction (6812); at least three panels (e.g. 6824), wherein each of the panels (6824) has two S-shaped ends (6842) and at least one of the two S-shaped ends (6842) is interposed between one of the two substantially L-Shaped portions (e.g. 6816 and 6818) that are substantially parallel to the outer extensions (6806 and 6810); at least three rectangular frames (e.g. 6826 and 6828) each being removably attached to a corner support (6822); a top (6820) attached to the at least three rectangular frames; and at least one door (6830), each at least one door attached by at least one hinge (6700) to one of the outer extensions (e.g. 6806 and 6810) of one of the at least four closed end frame supports (6802).

According to another embodiment, a cargo container system is provided, comprising: a base (6800) wherein each base (100) has at least two open bottom rectangular spaces (e.g. 101 and 102) and at least one wheel assembly (120) is attached in each of the at least two open bottom rectangular spaces (e.g. 101 and 102); at least four end frame supports (6802) attached substantially perpendicular to the base, wherein each of the end frame supports (6802) has a substantially closed square portion (6804) with four sides and having outer extensions (6806 and 6810) extending from two of the four sides and an additional support (6814) extending from the junction (6812) of the remaining two of the four sides of the substantially closed square portion (6804), wherein the additional support (6814) has two substantially L-shaped portions (6816 and 6818) that are substantially parallel to the outer extensions (6806 and 6810) and each of the at least four end frame supports having a corner support (6822) that is substantially parallel to the junction (6812); at least three panels (e.g. 6824), wherein each of the panels (6824) has two S-shaped ends (6842) and at least one of the two S-shaped ends (6842) is interposed between one of the two substantially L-Shaped portions (e.g. 6816 and 6818) that are substantially parallel to the outer extensions (6806 and 6810); at least three rectangular frames (e.g. 6826 and 6828) each being removably attached to a corner support (6822); a top (6820) attached to the at least three rectangular frames; at least one door (6830), each at least one door attached by at least one hinge (6700) to one of the outer extensions (e.g. 6806 and 6810) of one of the at least four closed end frame supports (6802).

These and other objects and advantages of the present invention will become apparent from a reading of the attached specification and appended claims. There has thus been outlined, rather broadly, the more salient features of the invention in order to better appreciate the contribution of the instant invention to the art. There are features of the instant invention that will be described hereinafter and which will form the subject matter of the claims appended hereto.

BRIEF DESCRIPTION OF THE DRAWINGS

FIG. 1 is a picture of a base.
FIG. 2 is a picture of a front side of the base.

FIGS. 15A, 15B, 15C, 15D and 15E are views of the cargo container.

FIGS. 16A and 16B depict different view of the cargo container.

FIG. 17 is an exploded view of a shipping container and a base.

FIG. 25 is an exploded view of a base.

FIG. 33 is a picture of a lift gate attached to a truck.

DETAILED DESCRIPTION

The claimed invention is designed to use every available square inch of a vehicle. A vehicle may include a truck, trailer, international container, rail car, overseas container, or other transportation vehicle. A transportation box is also referred to as a Cargo Container or Cargo Cube. The claimed invention may enable a buffer space of 1 inch on each side plus 1 inch on the top and 1 inch on the bottom for the transportation modular components to fit. This arrangement increases efficiency and enables a user to use every square inch of the vehicle.

Figure 23:
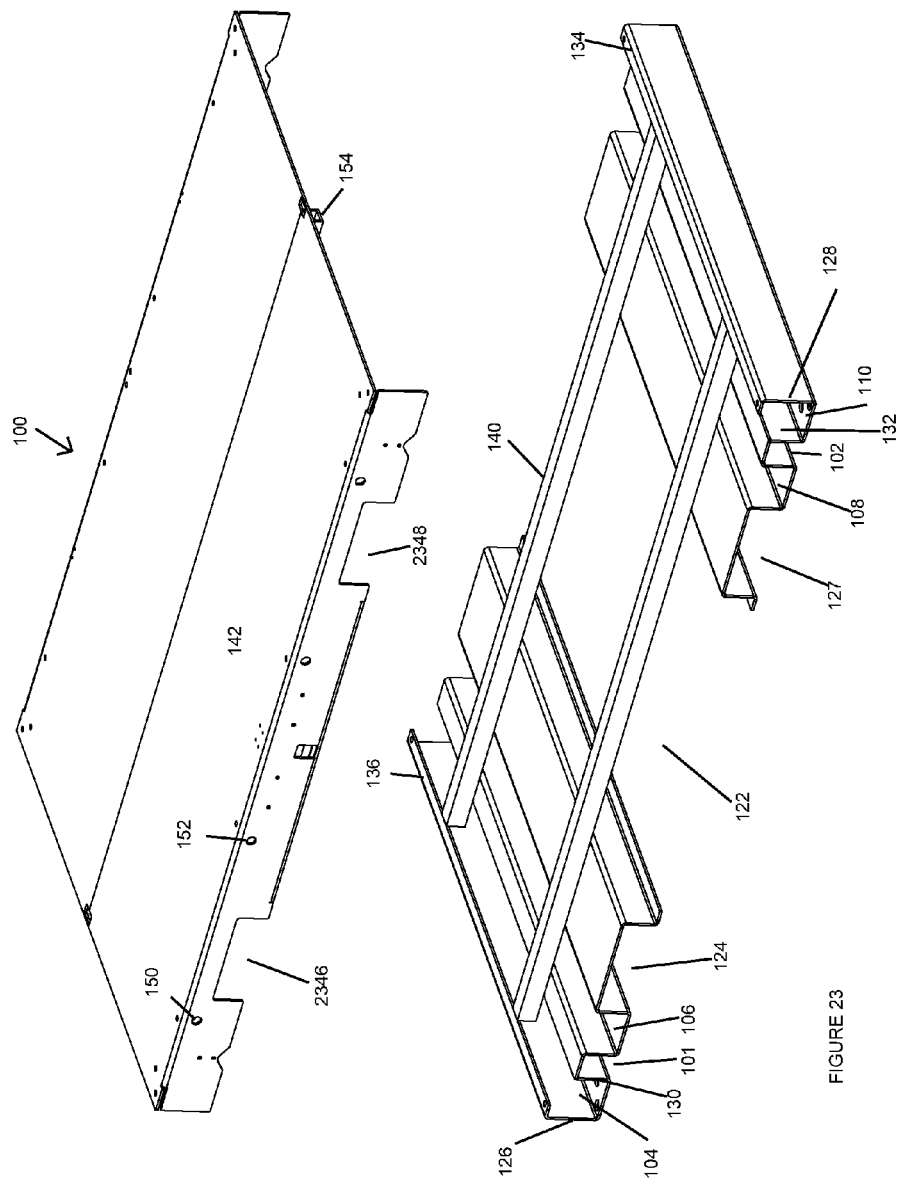
FIG. 23 depicts an exploded view of a base according to the present invention.
Figure 24B:
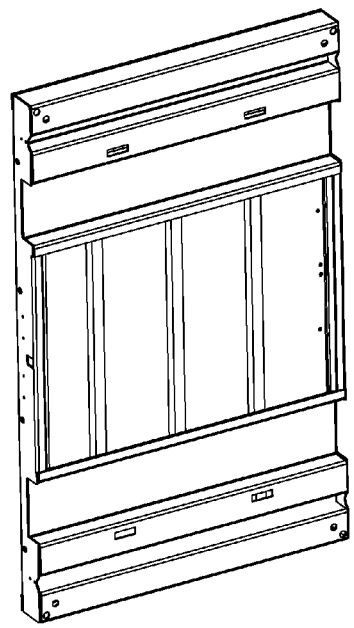
FIG. 24b depicts a bottom elevational view of a base.
Figure 24A:
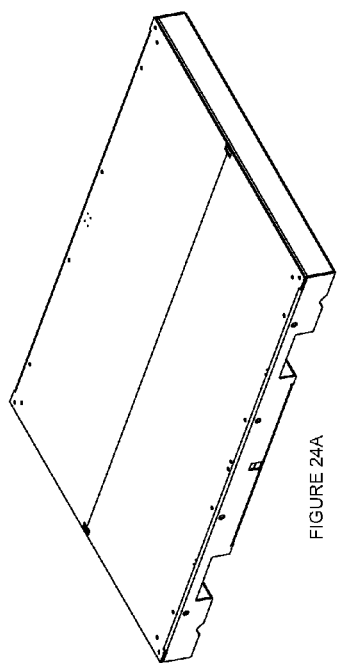
FIG. 24a depicts a top elevational view of a base.
Figure 24C:
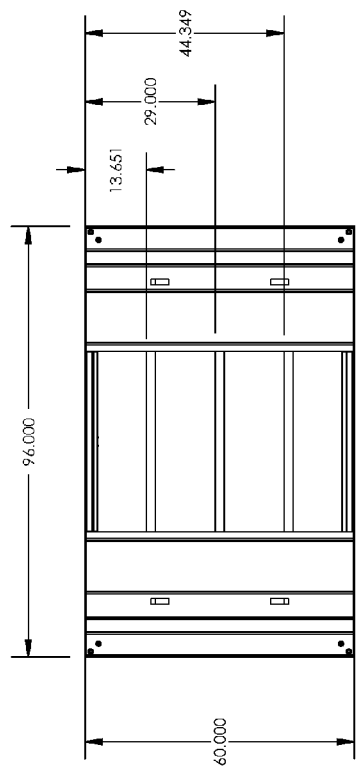
FIG. 24c depicts a bottom view of a base.
Figure 26:
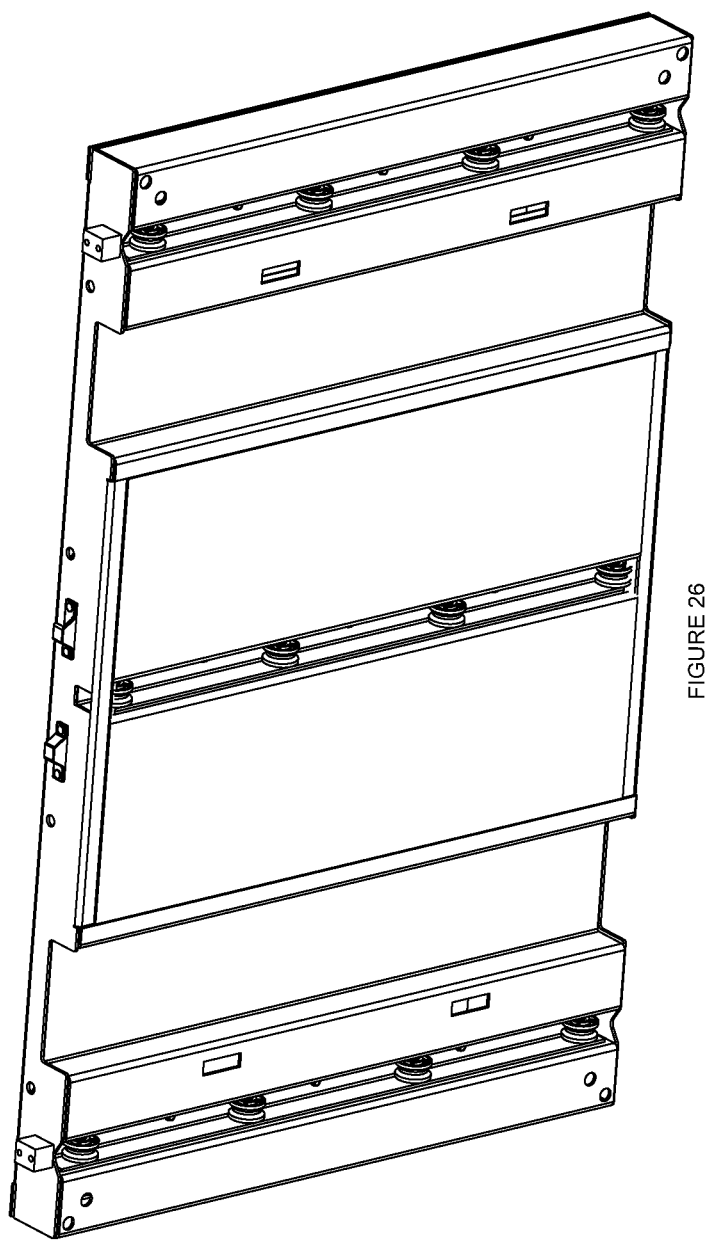
FIG. 26 is a bottom view of a base with three open bottom rectangular spaces and four wheel assemblies attached in each of the open bottom rectangular spaces.
Figure 27:
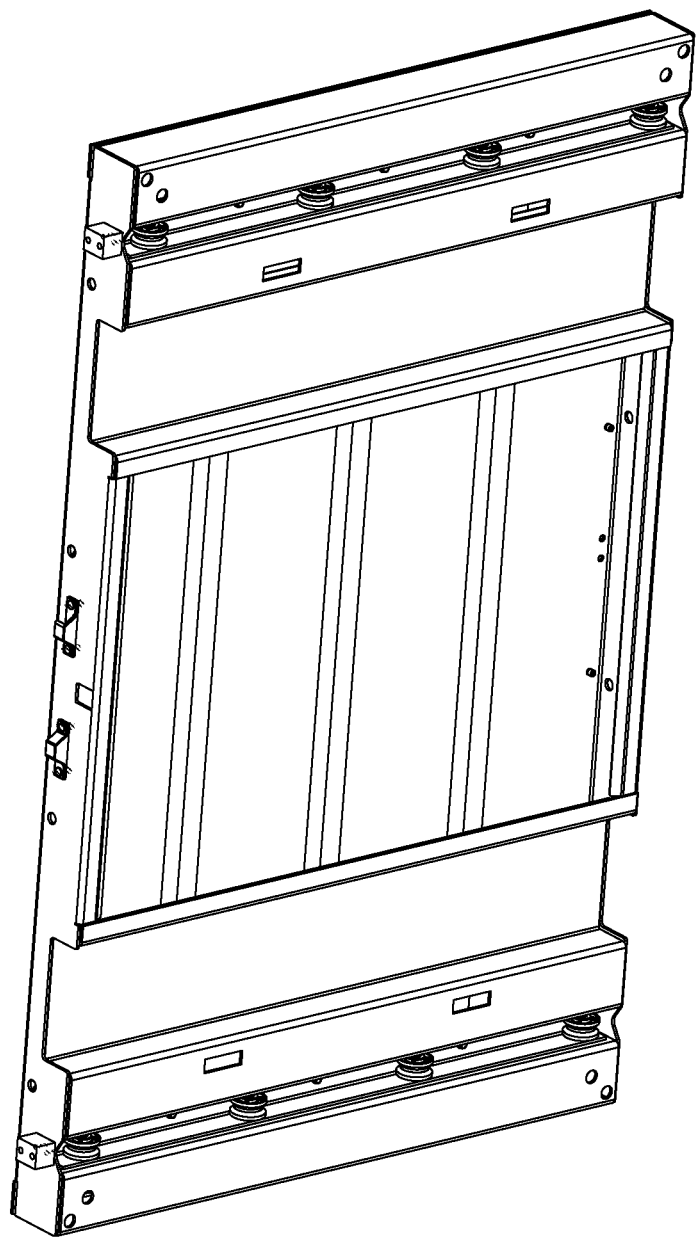
FIG. 27 is a bottom view of a base with two open bottom rectangular spaces and four wheel assemblies attached in each of the open bottom rectangular spaces.
Figure 28:
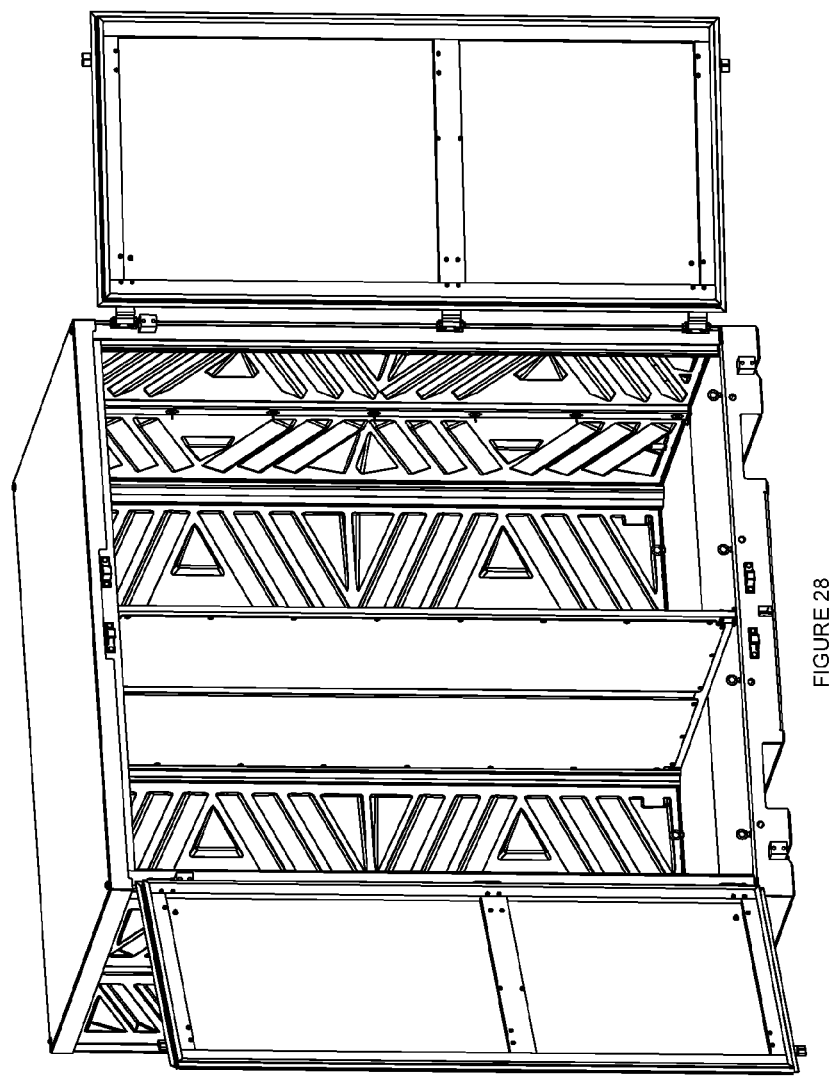
FIG. 28 is a picture of a shipping container with the doors opened.
Figure 29:
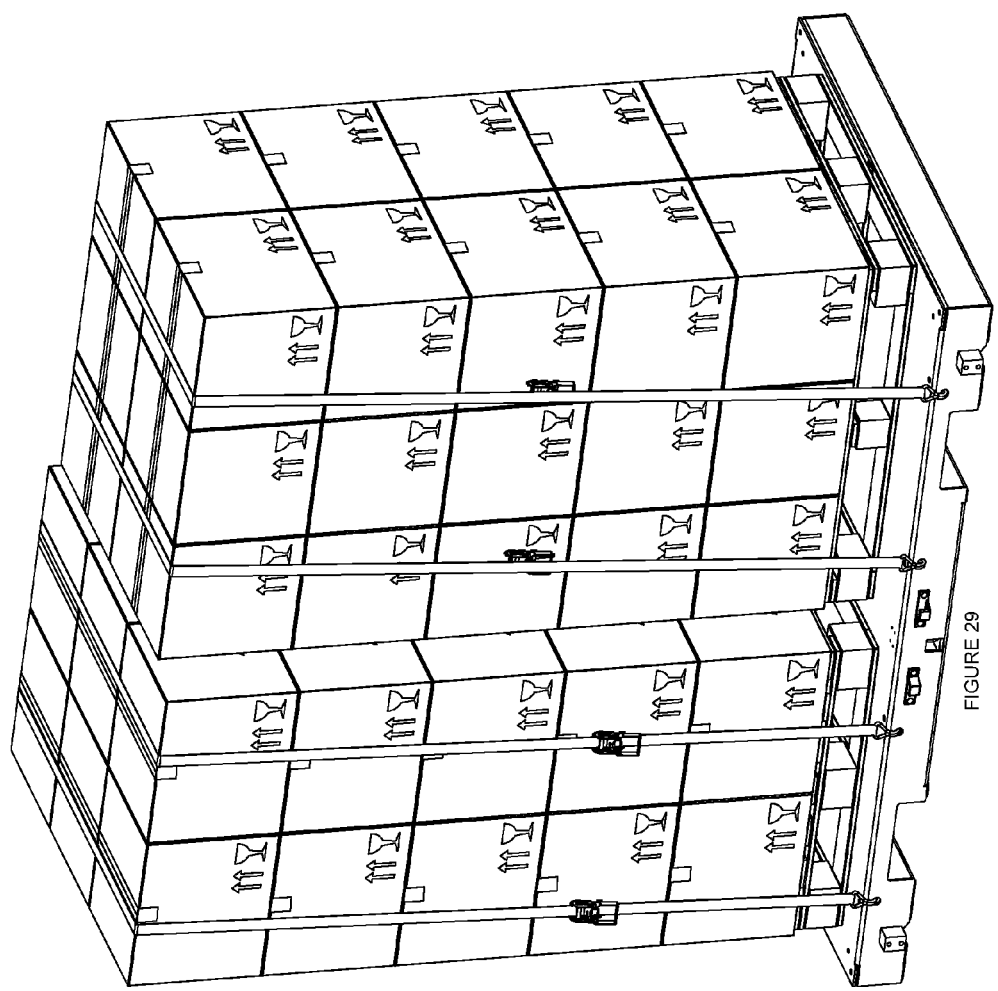
FIG. 29 is a picture of a base with two pallets of freight.
Figure 30:
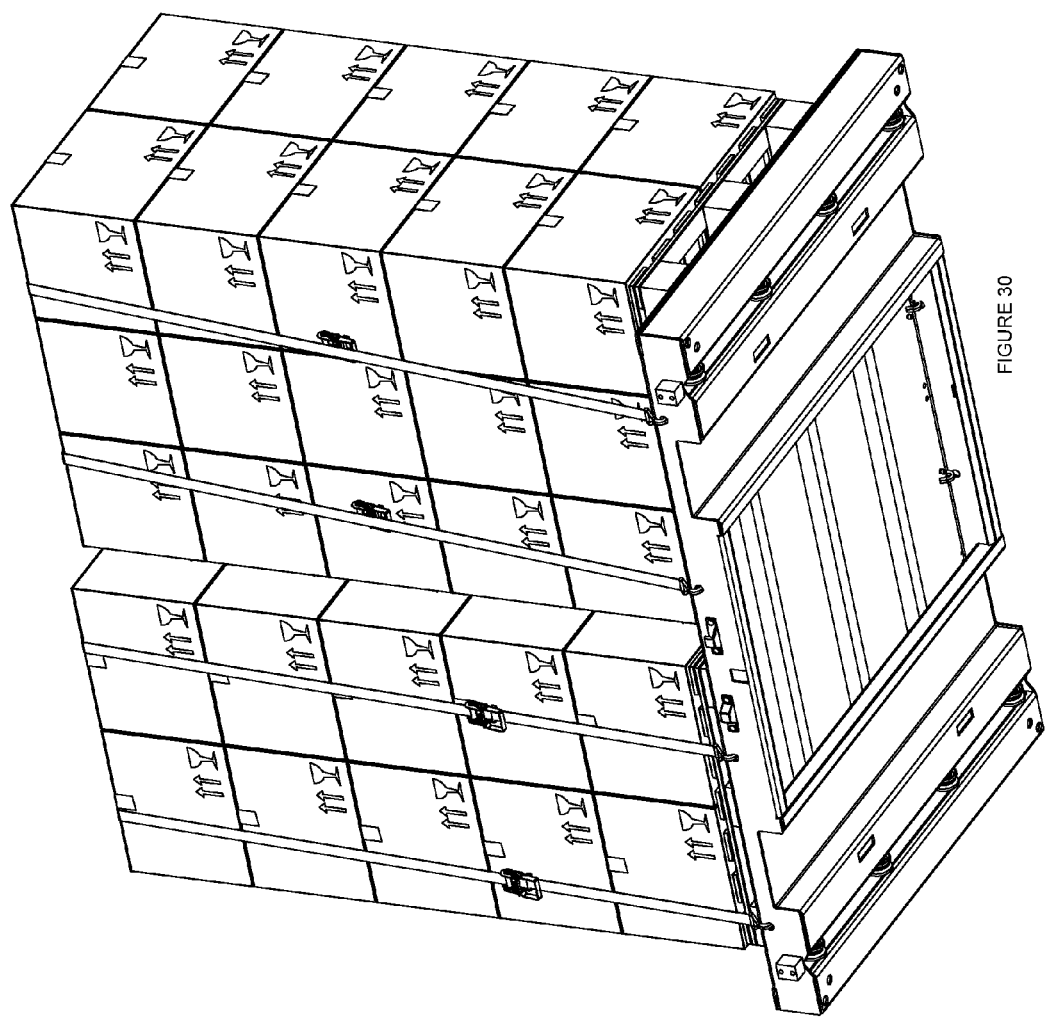
FIG. 30 is a bottom elevational picture of a base with two pallets of freight.
Figure 31:
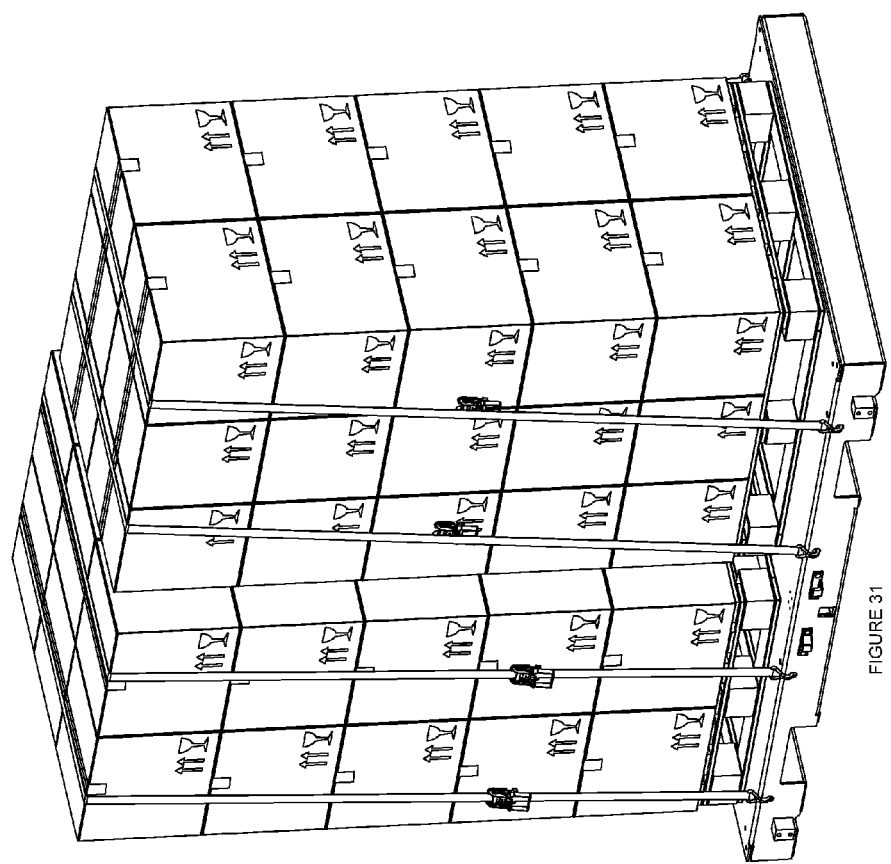
FIGS. 31 and 32 depict a base with pallets of freight.
Figure 32:
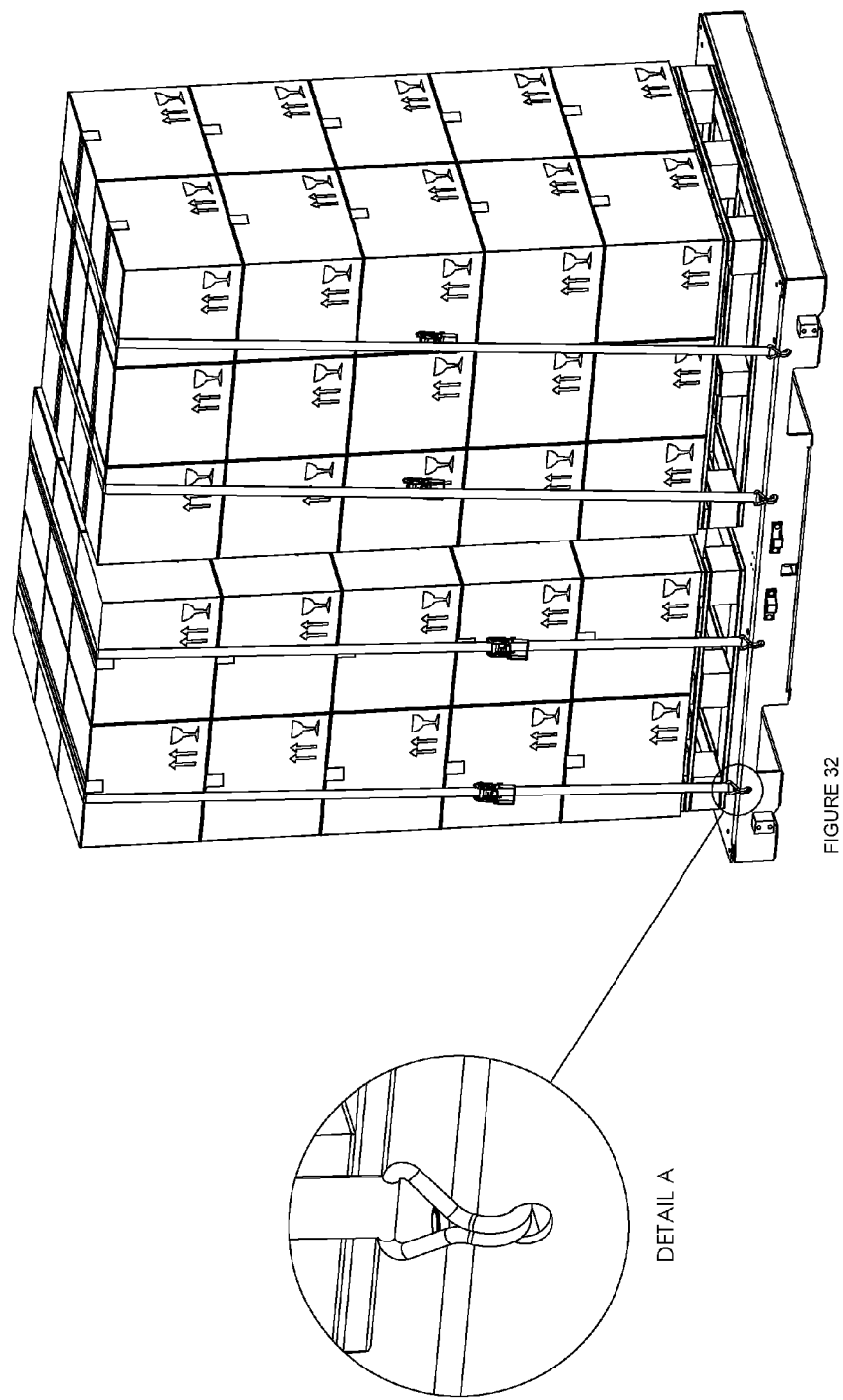
Figure 34:
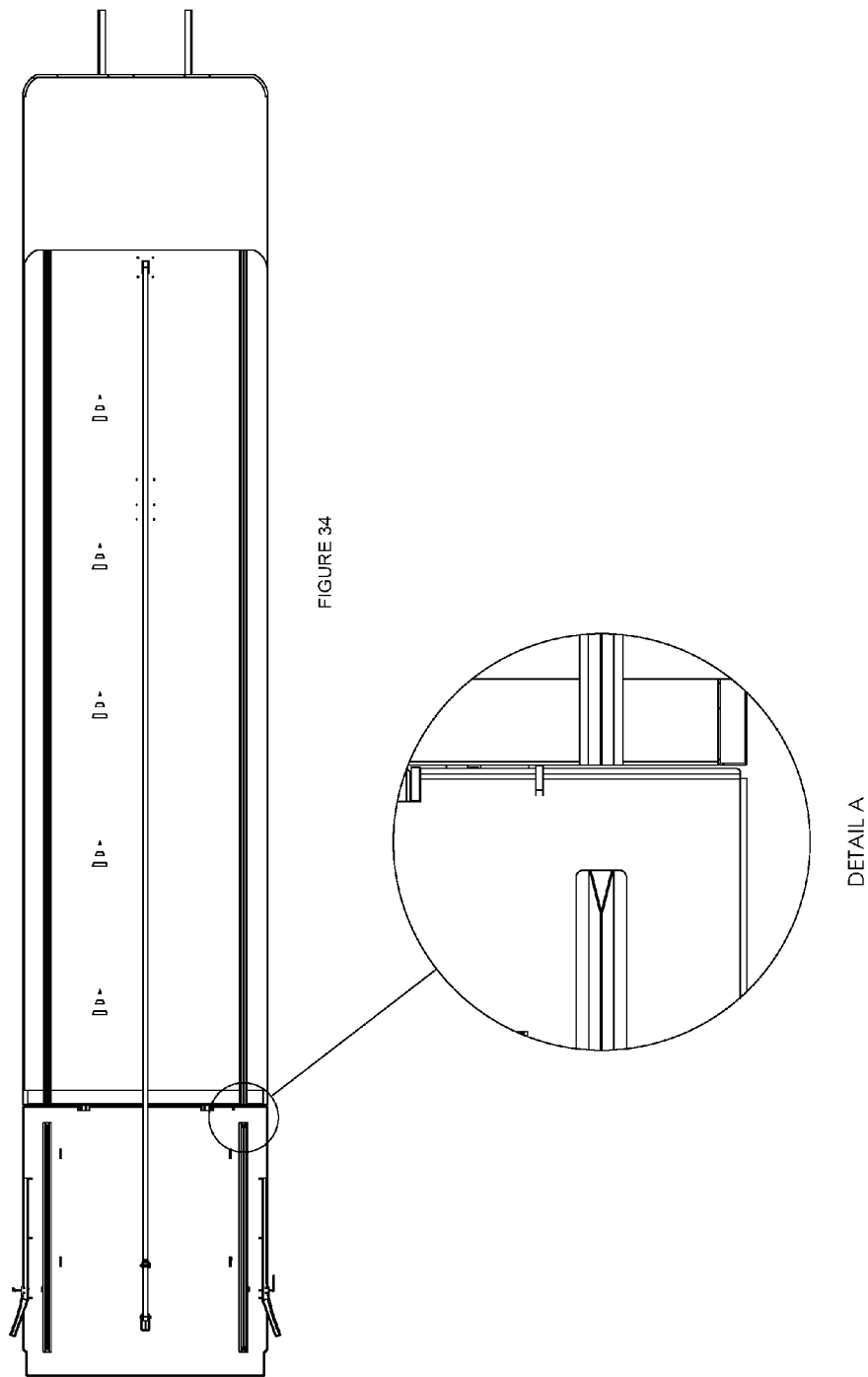
FIG. 34 is a picture of a top view of a lift gate attached to a truck.
Figure 71:
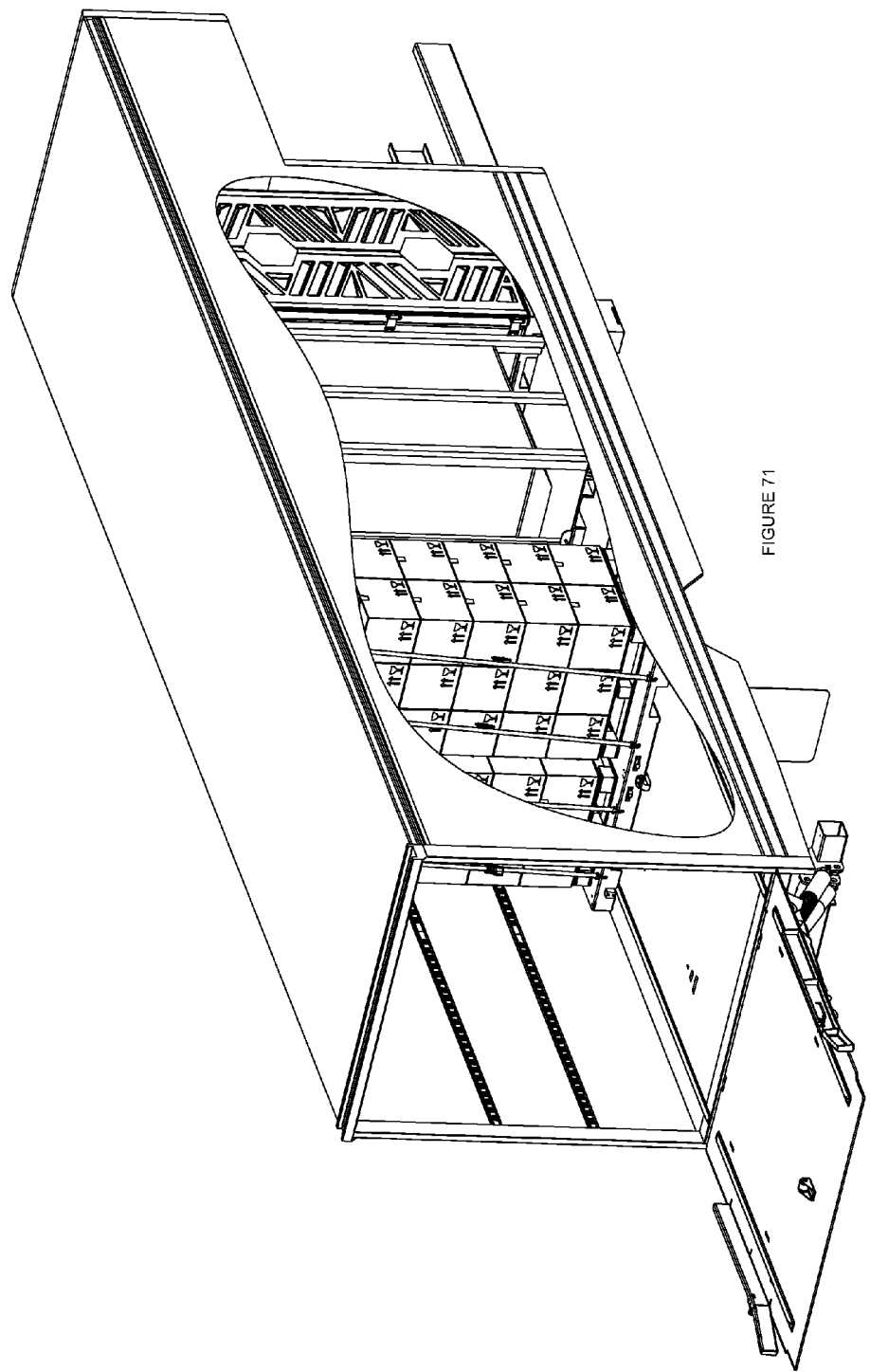
FIG. 71 depicts a truck with a portion of the side removed and shipping containers loaded on the truck.
Figure 72:
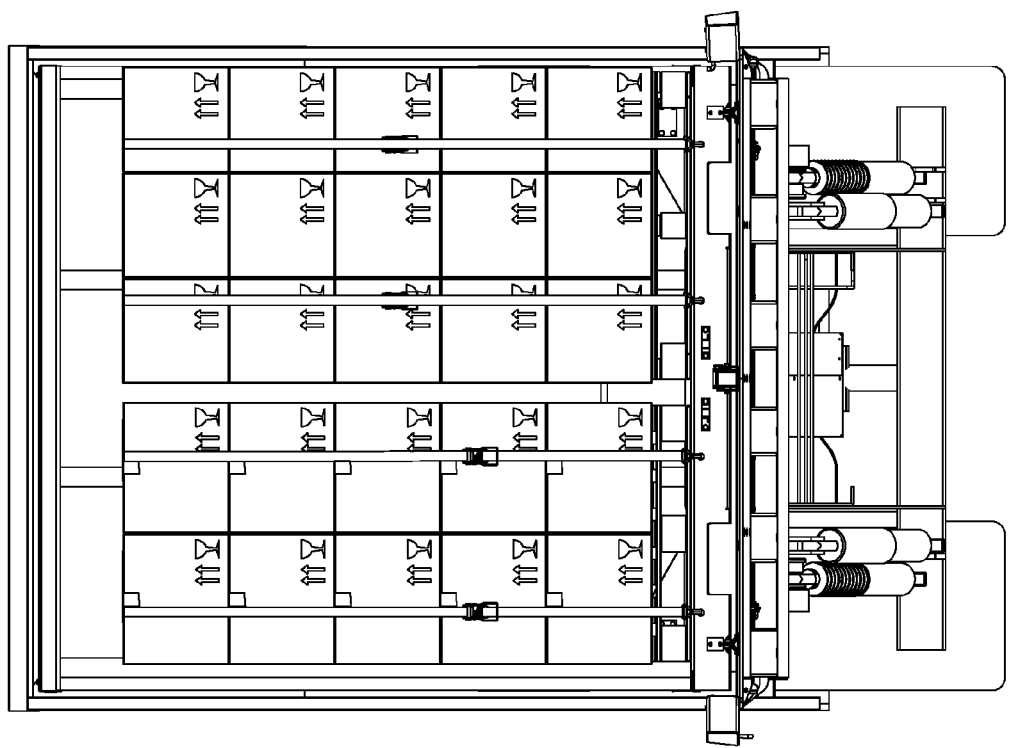
FIG. 72 depicts a rear view of a truck with shipping containers loaded on the truck.

This system is designed to load any number of, by way of example up to ten, transportation modular components in a container, trailer, or rail container. The system is designed to save money in transportation cost across country, or across the globe. The transportation modular components may be used to load household goods and other freight items and commodities. With reference to FIGS. 1-71, the present invention provides a modular shipping apparatus for a transportation container. The apparatus may have at least one base (100 and 6800) for a cargo container which may be placed in a shipping container (for example, a truck). Each base (100) may have at least two open bottom rectangular spaces (e.g. 101 and 102) and at least one wheel assembly (120) attached in each of the at least two open bottom rectangular spaces (e.g. 101 and 102). Each base (100) may have a center portion (122) and a first open bottom channel (124) between the center portion (122) and the left open top rectangular portion (106) and the right open top rectangular portions (108) and a second open bottom channel (127) between the center portion (122) and the right open top rectangular portion (108). Each of the at least two open bottom rectangular spaces (e.g. 101 and 102) are formed by an open top rectangular portion (e.g. 106 and 108) and a substantially open top rectangular portion (e.g. 104 and 110) with an outer side (e.g. 126 and 128) and an inner side (e.g. 130 and 132), the outer side (e.g. 126 and 128) having a greater height than the inner side (e.g. 130 and 132) and a lip (e.g. 134 and 136) extending towards the center portion (122). Each of the at least one wheel assemblies (120) may be an open bottom rectangle having a left side (2540), a right side (142) and a top side (144) with at least two wheels (146) rotatably attached to the left side (2540) and the right side (142) and the top side (144) attached to one of the at least two open bottom rectangular spaces (e.g. 101 and 102). There may be at least two tracks (e.g. 5300 and 5302) attached to a bottom interior of a shipping container (5304), wherein at least a portion of each of the at least one wheel assemblies (120) slides along one of the at least two tracks (e.g. 5300 and 5302). There may be at least one support (140) on top of the at least two open bottom rectangular spaces (e.g. 101 and 102) and retained by the lip (e.g. 134 and 136) extending towards the center portion (122) of two opposed substantially open top rectangular portions (104 and 110). As shown in FIG. 23, the support (140) may also be supported on top of the first open bottom channel (124) and the second open bottom channel (127). In this way, the load on base is distributed and failure of the base is prevented. There may be a cover (142) on top of the lips (e.g. 134 and 136) that covers and provides a flat surface. The cover (142) may have a first opening (2346) and a second opening (2348) to allow the first open bottom channel (124) and the second open bottom channel (127) to remain uncovered. There may be holes (e.g. 150 and 152) to accommodate tie downs for the cargo and to prevent the load from moving. There may be a square tube (154) that runs parallel to the first opening (2346) and the second opening (2348) to provide additional distribution of the load and support. As shown in FIG. 25, there may be a bumper (2500), a keeper (2502), an fitting (2506) and a pulley opening (2504). (2506) is a fitting used to allow the eye bolt to be screwed to base. The eye bolt is used to tie down cargo that is on a pallet.

Figure 38:
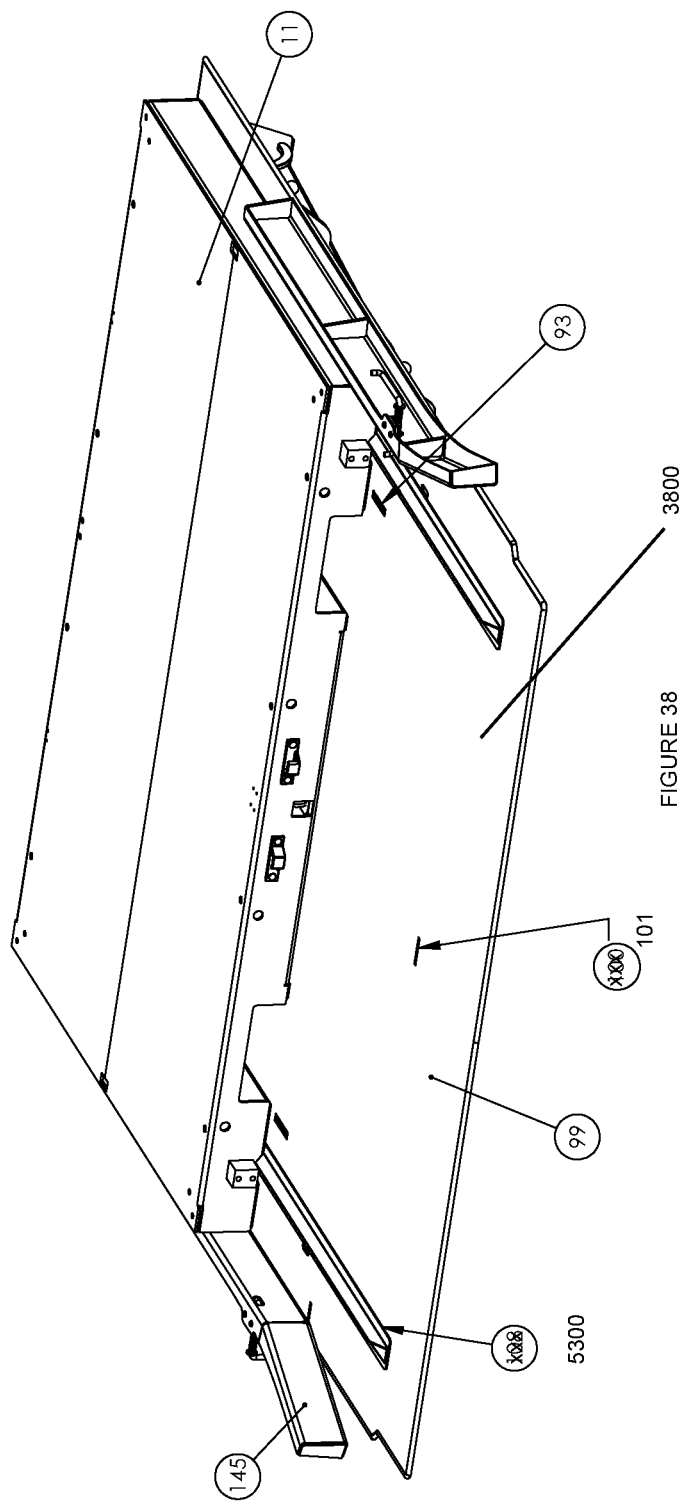
FIG. 38 depicts a base attached to a lift gate.
Figure 42:
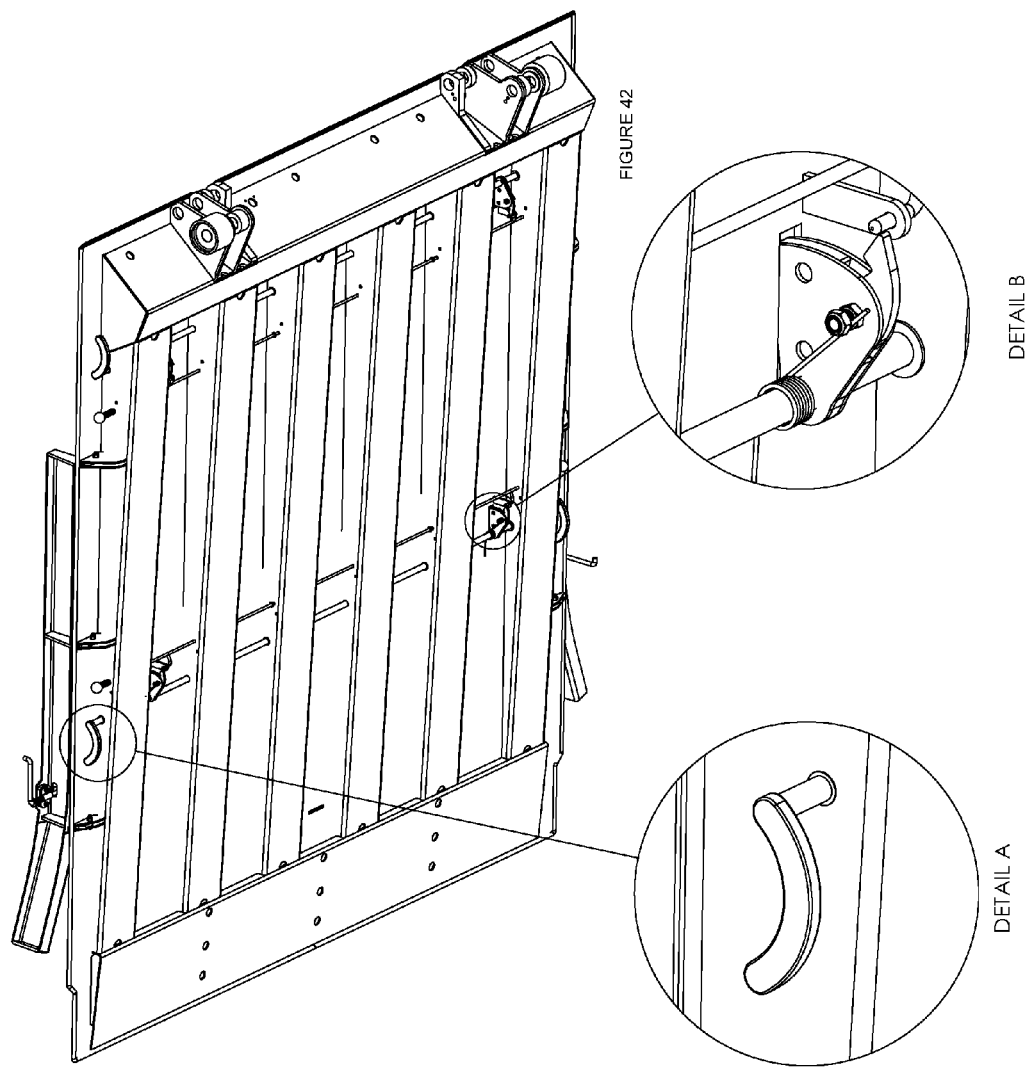
FIG. 42 depicts the underside of a liftgate.
Figure 48:
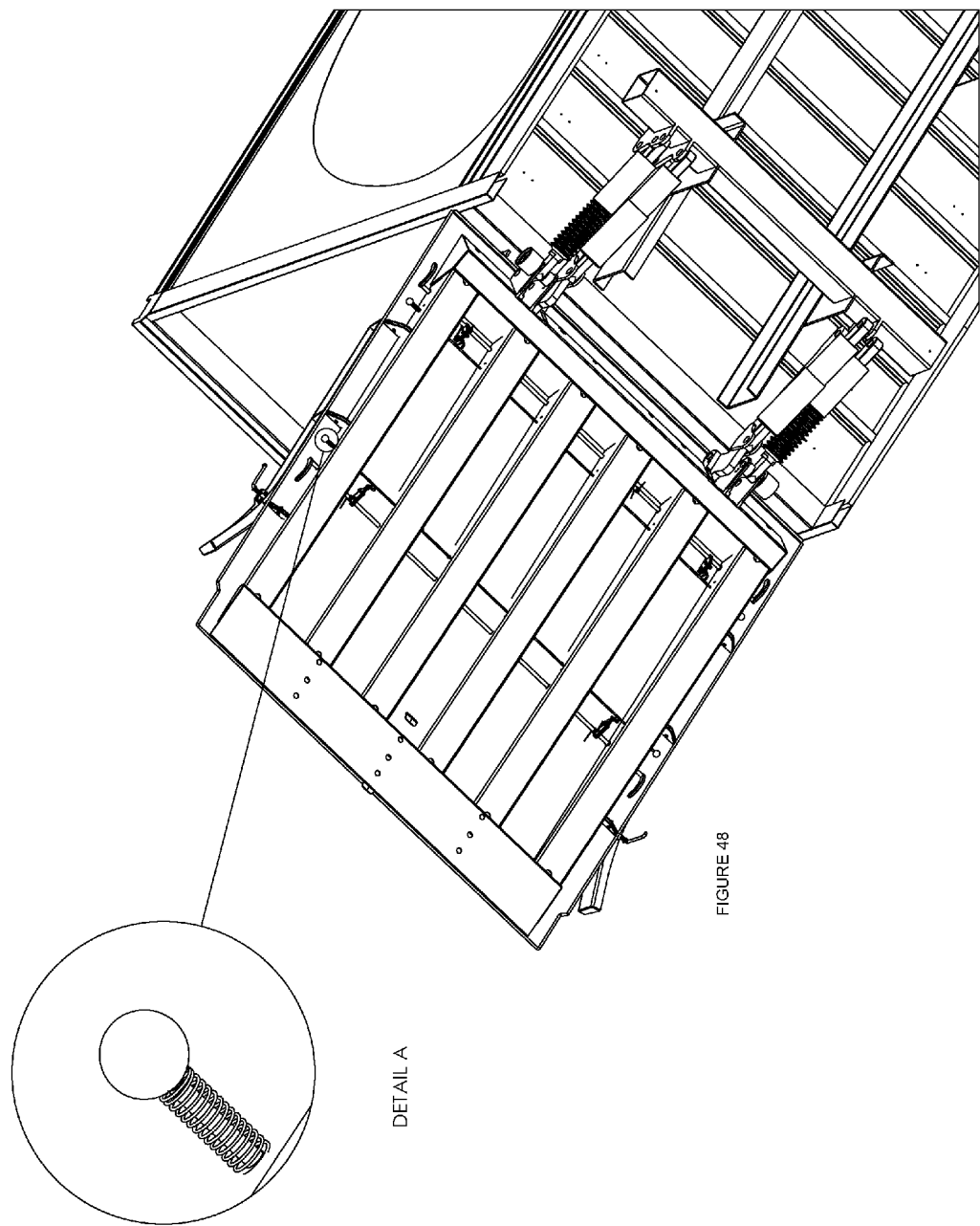
FIGS. 48-49 depict the underside of a liftgate.
Figure 49:
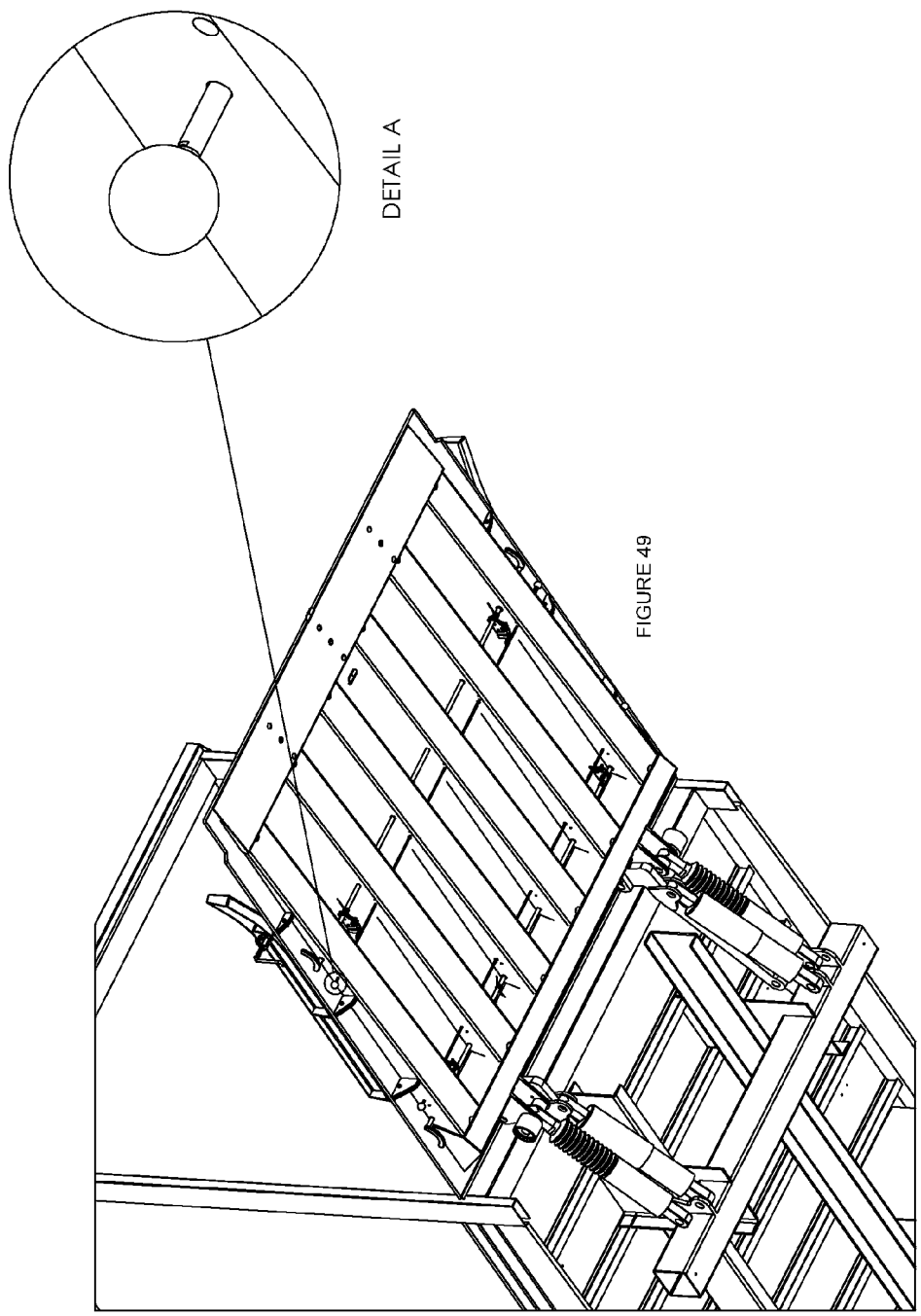
Figure 50:
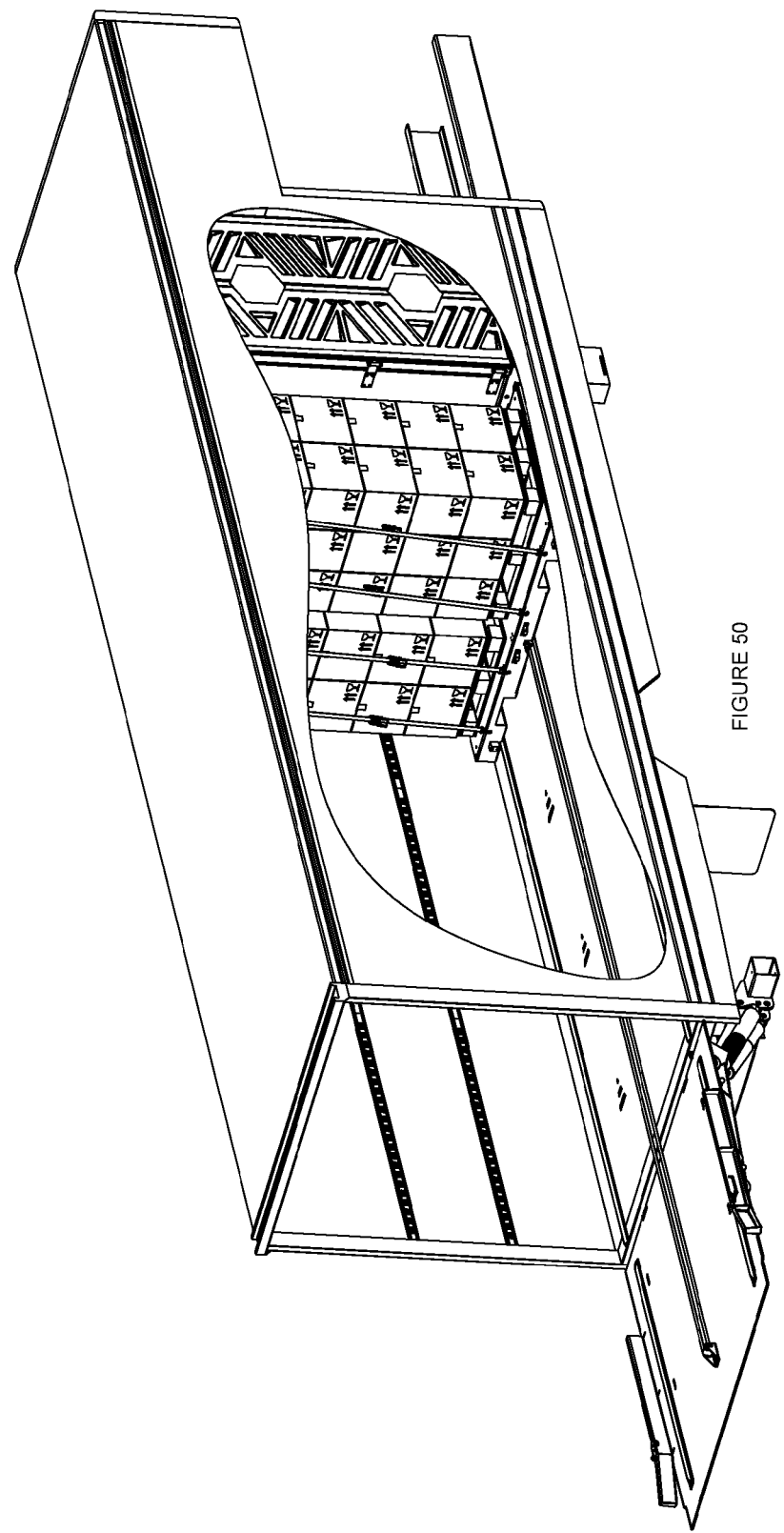
FIGS. 50-53 depict a truck with a portion of the side removed and show a shipping containers being loaded into the truck.
Figure 51:
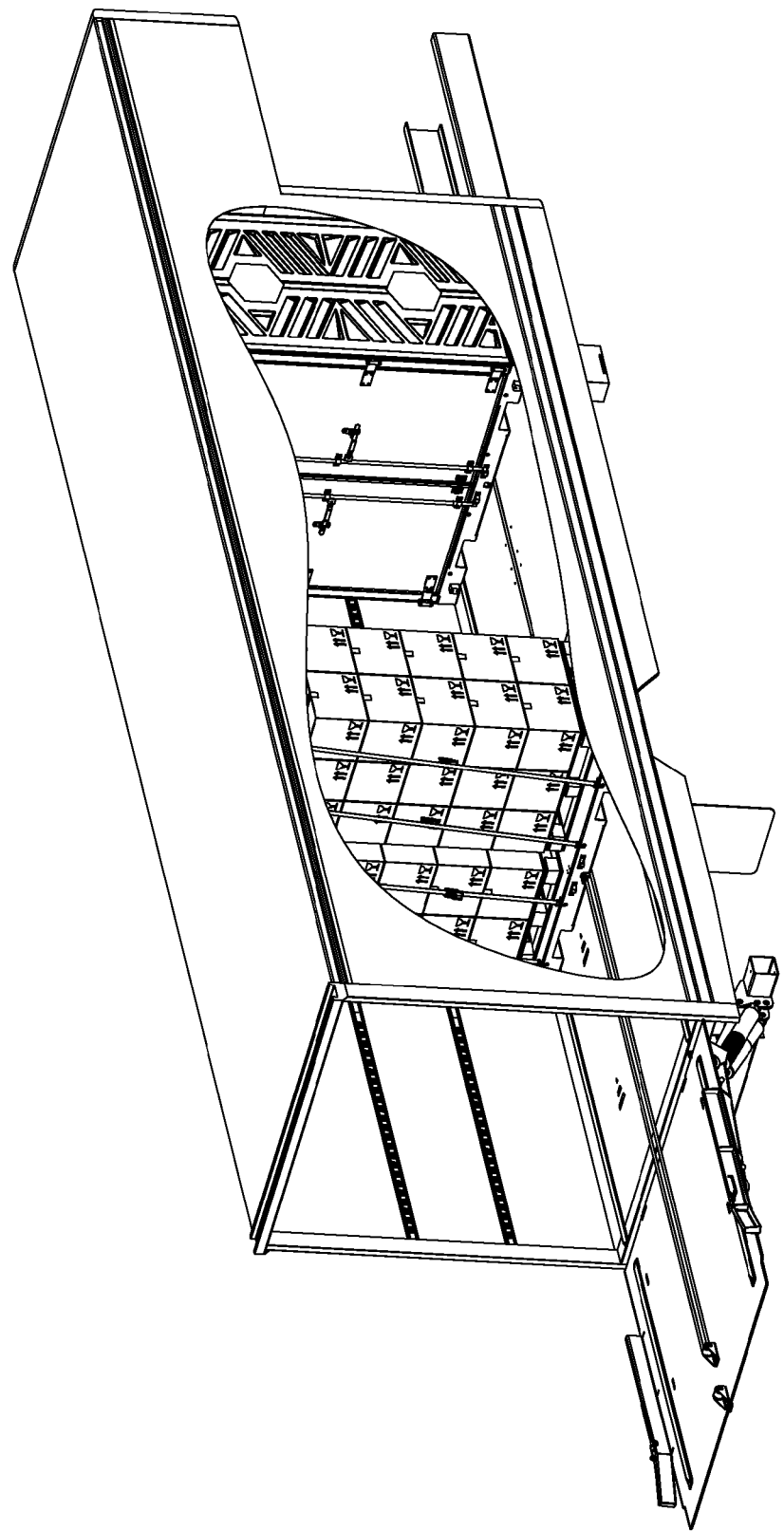
Figure 52:
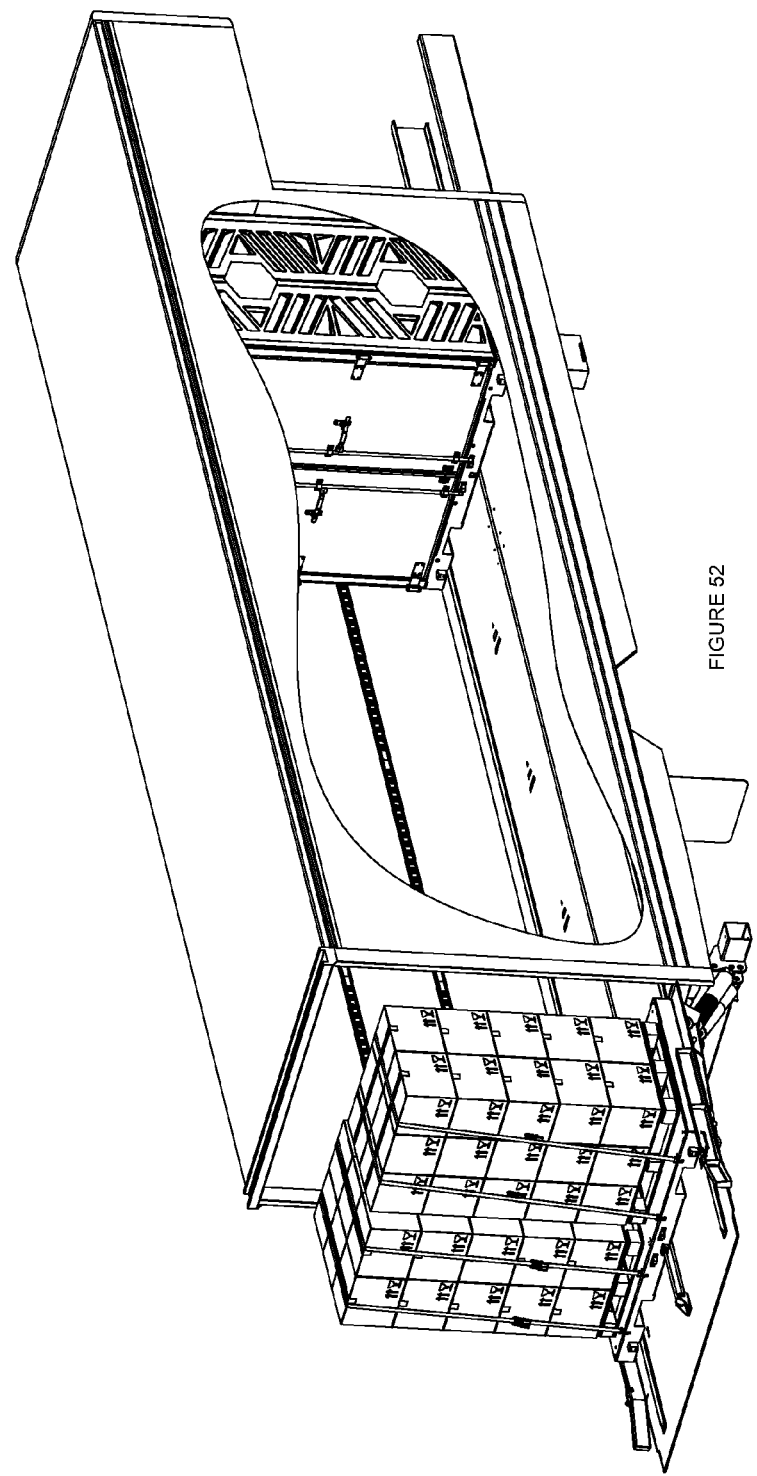
Figure 53:
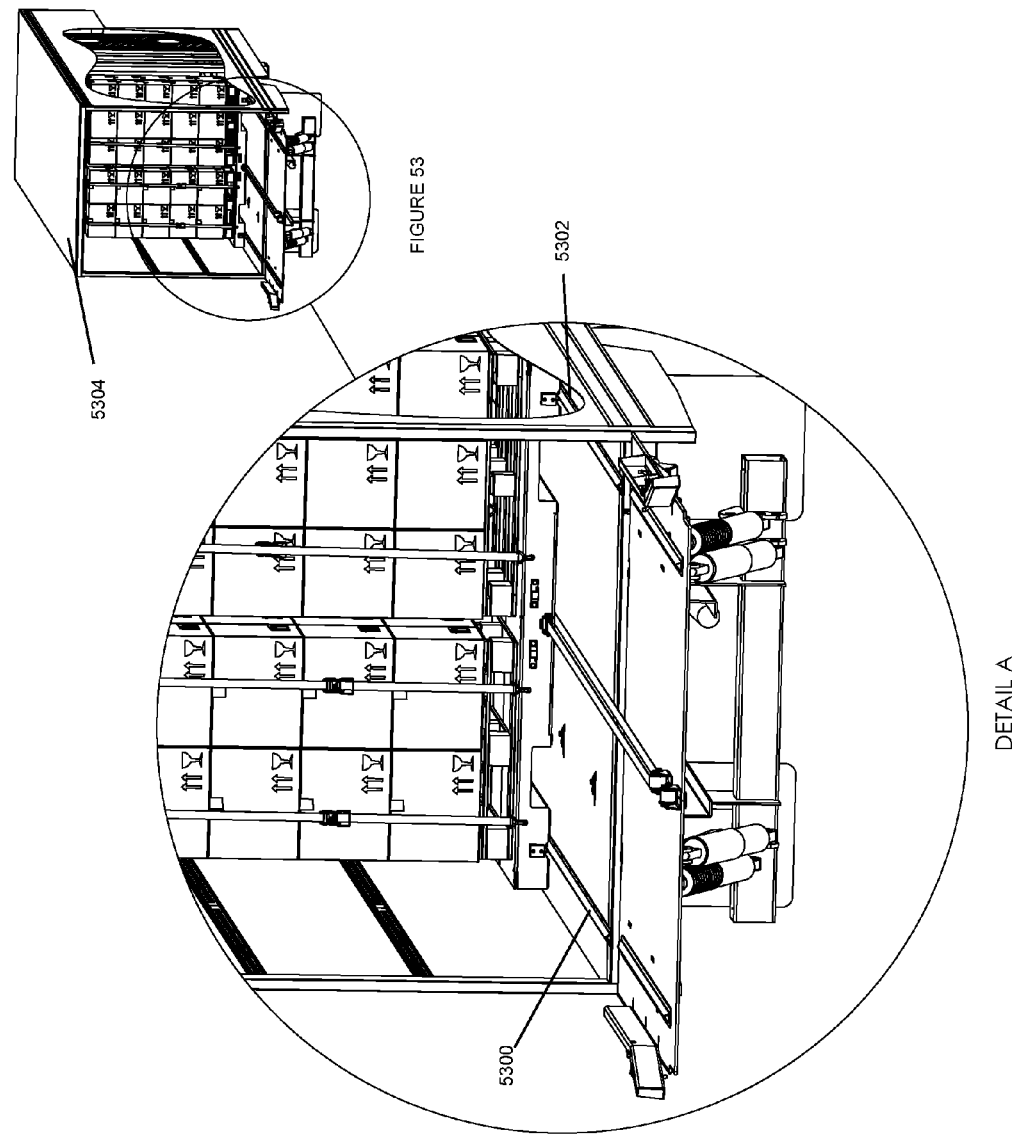
Figure 54:
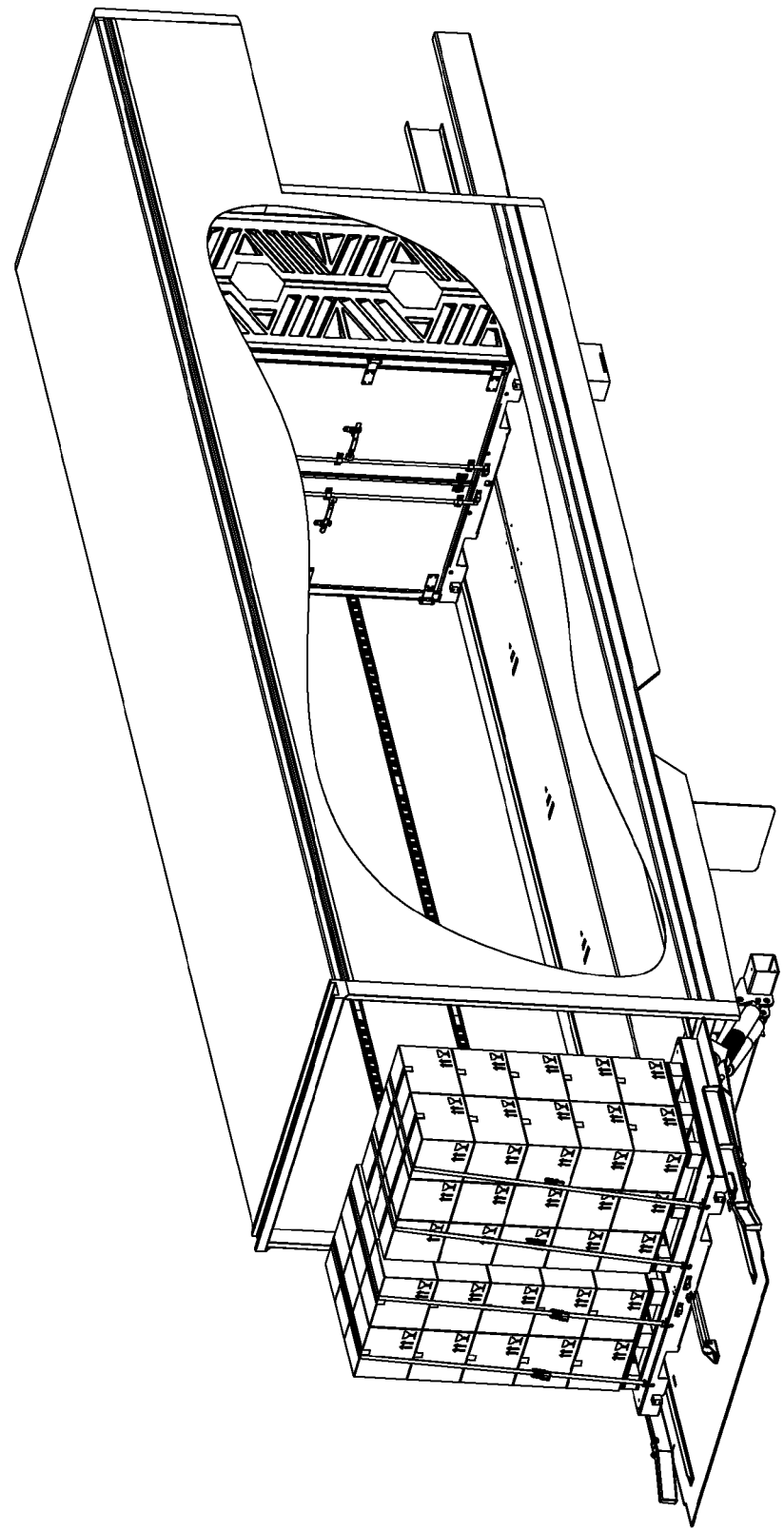
FIG. 54-65 depict a truck with a portion of the side removed and a pulley system.
Figure 55:
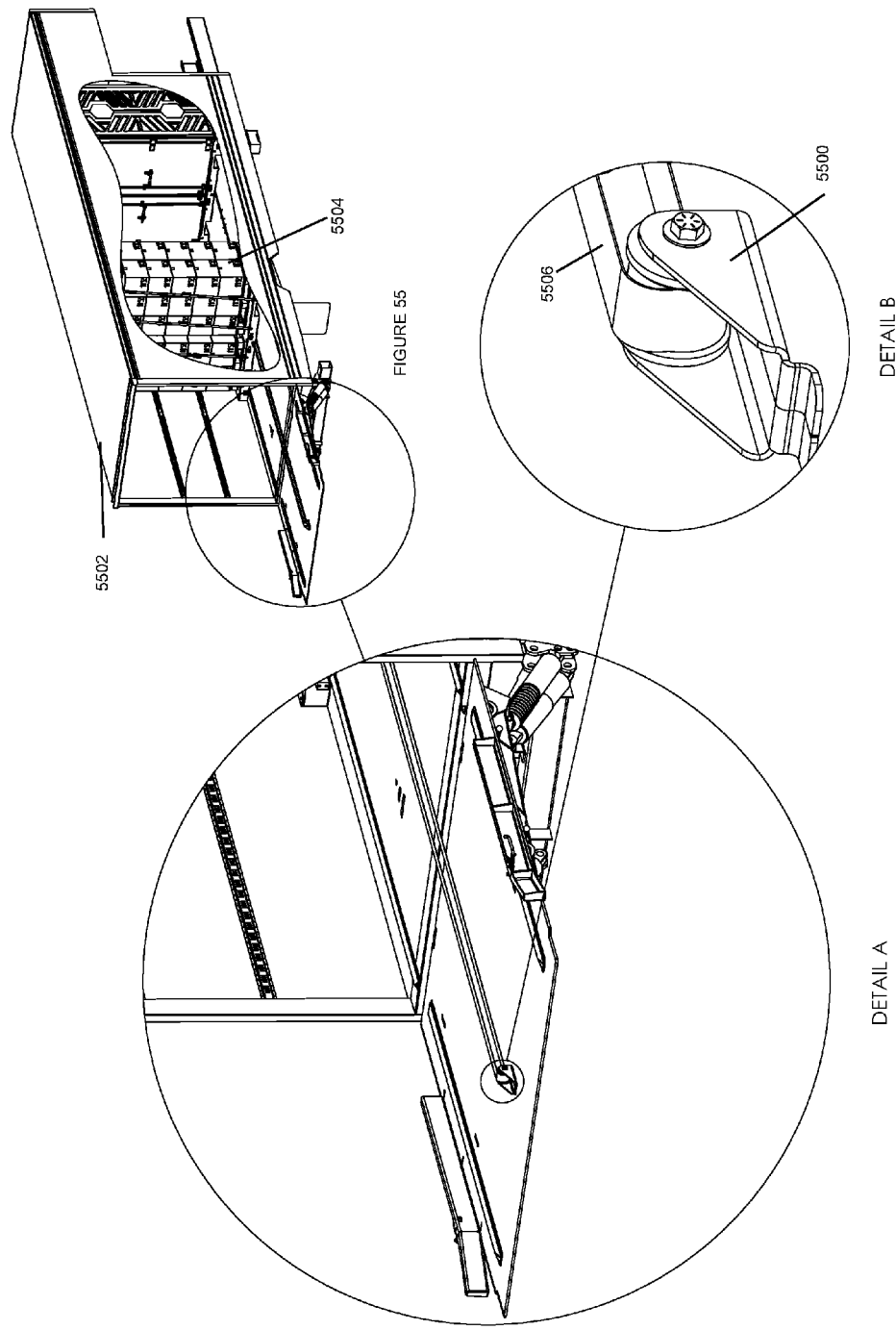
Figure 56:
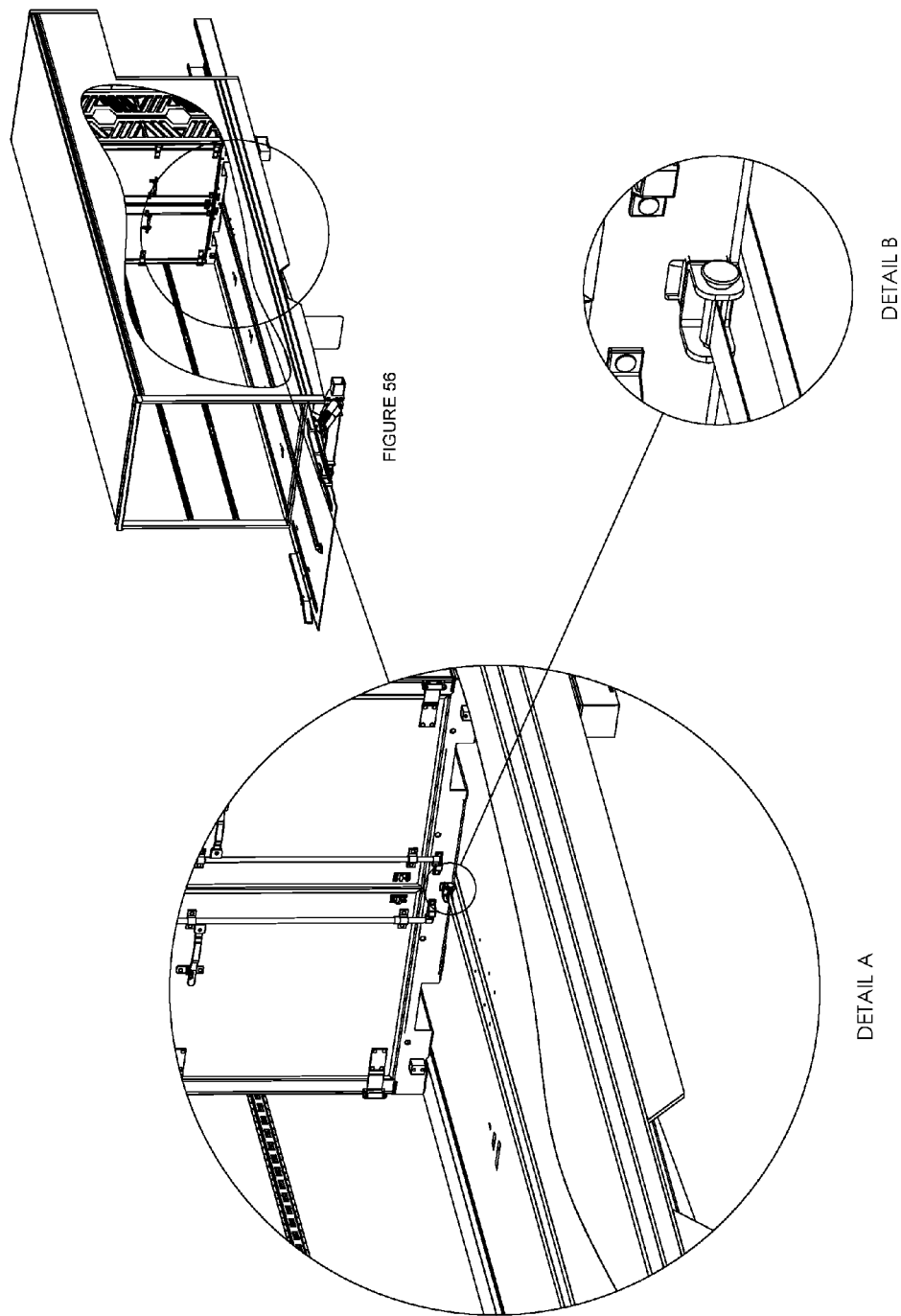
Figure 57:
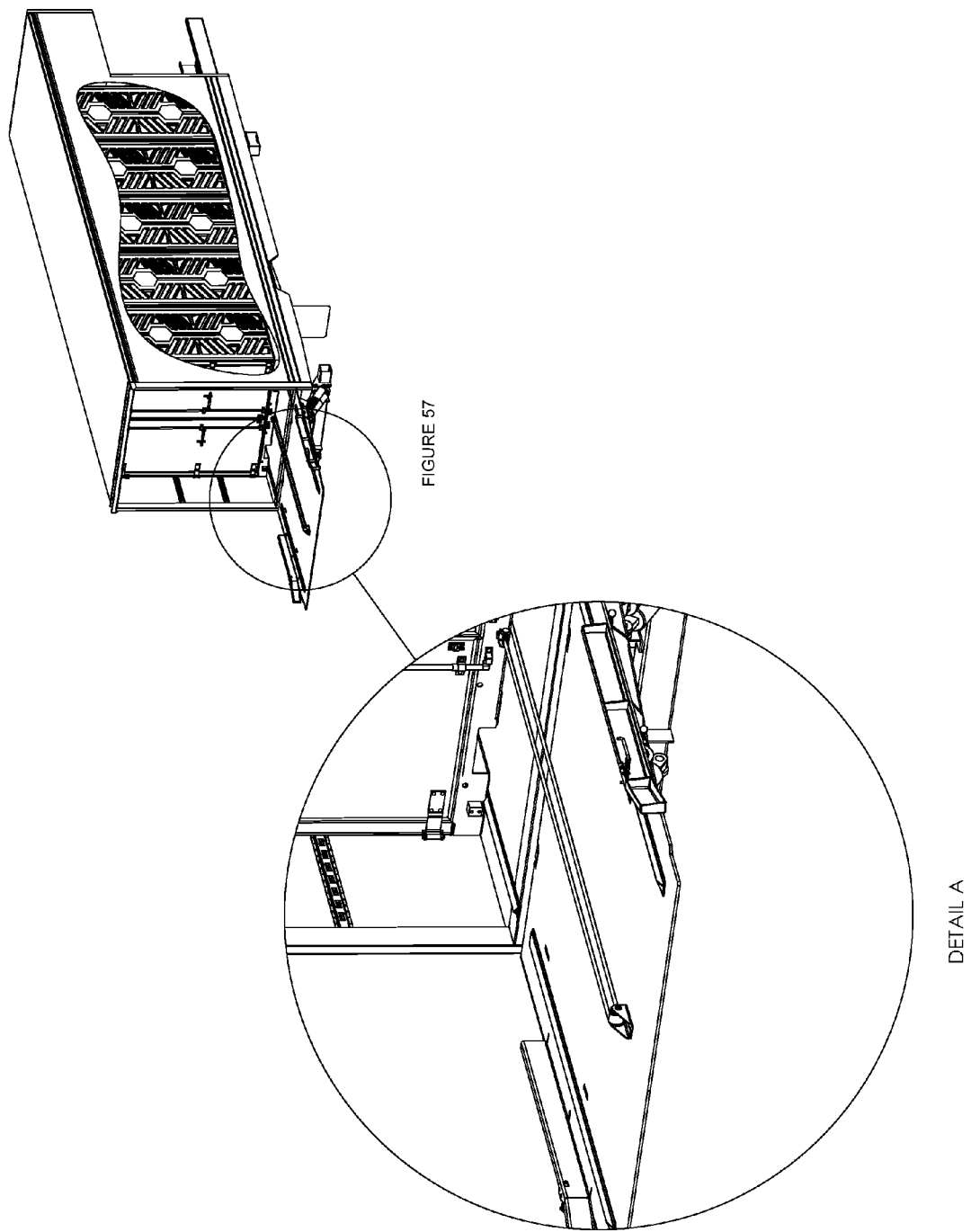
Figure 58:
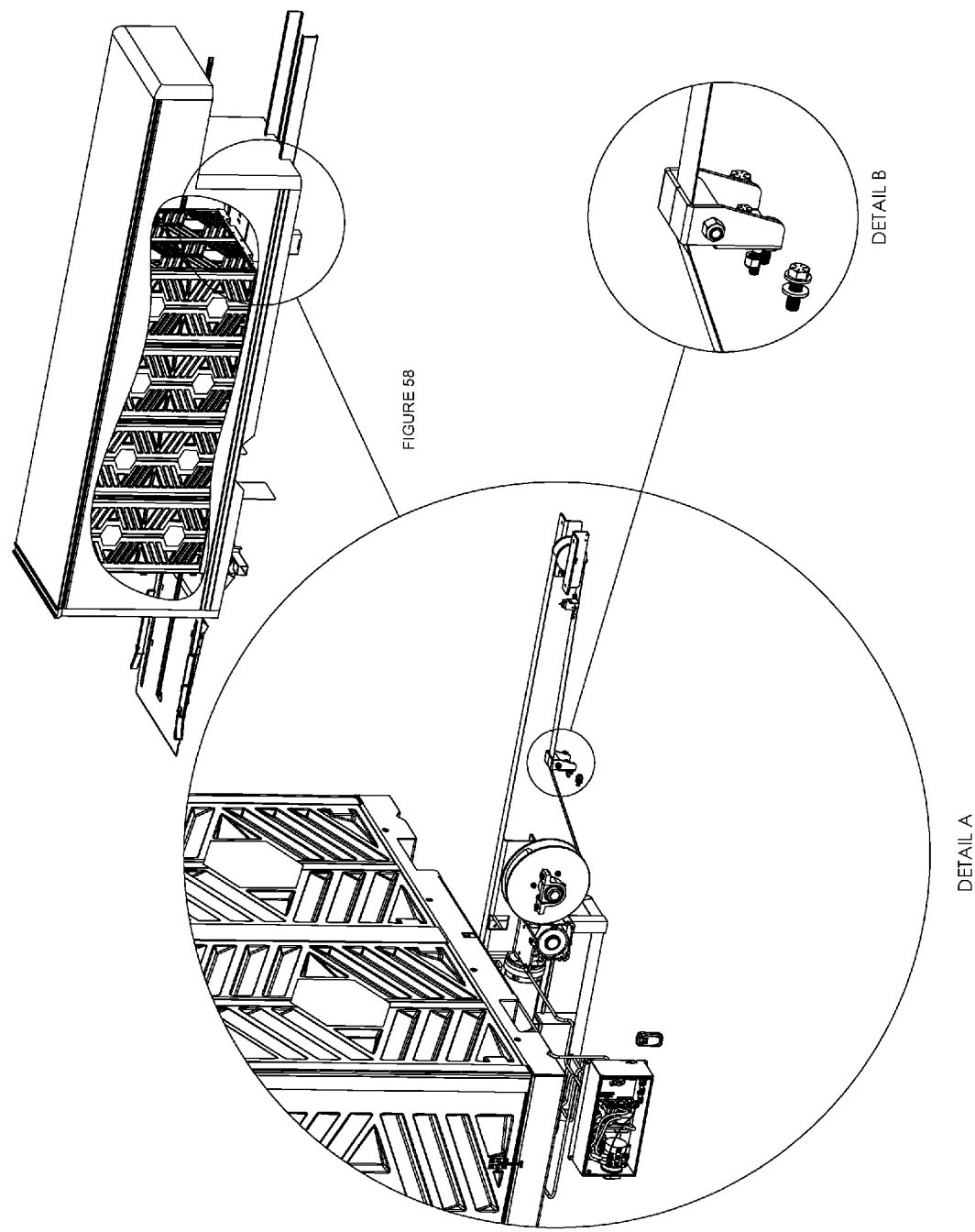
Figure 59:
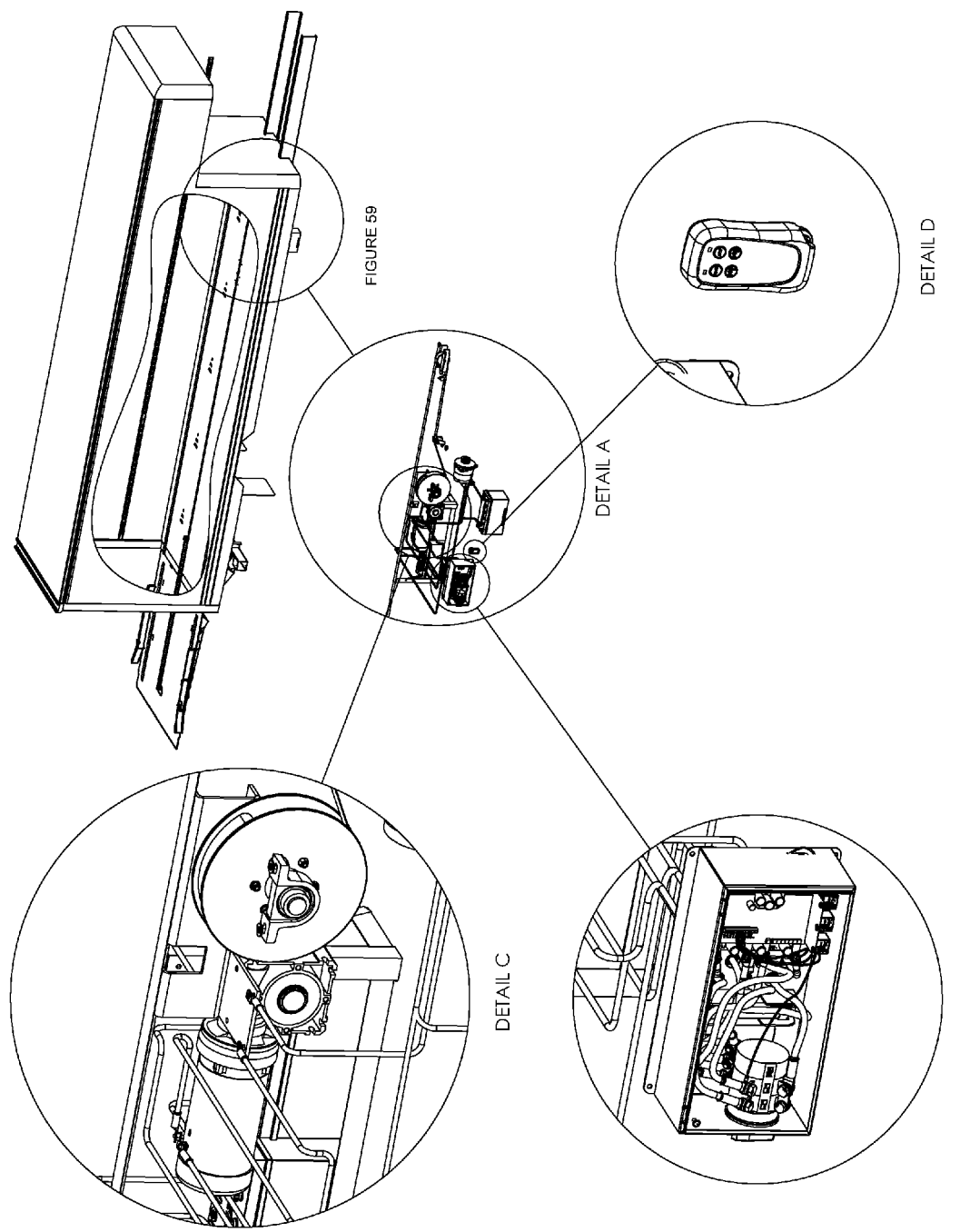
Figure 60:
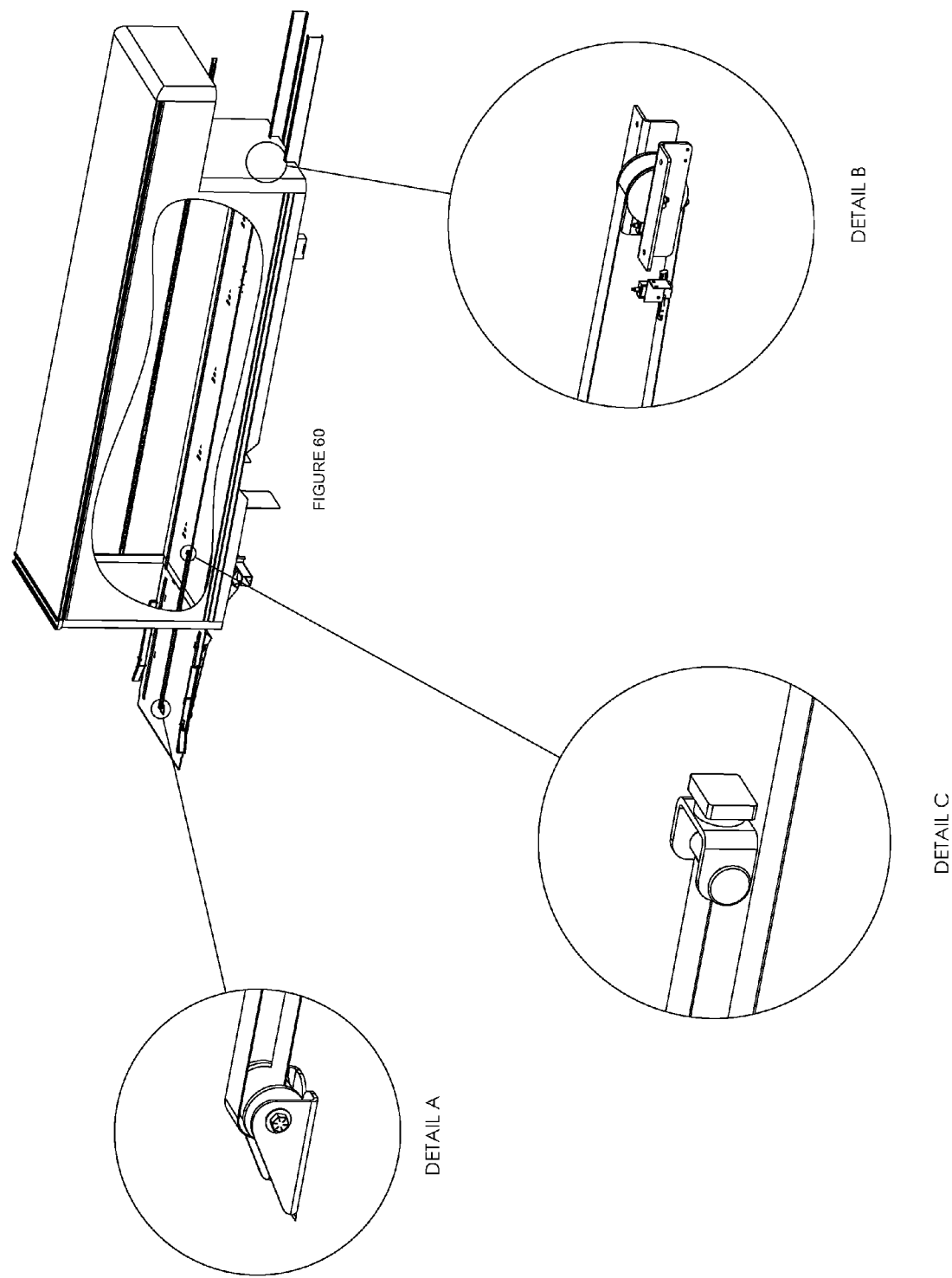
Figure 61:
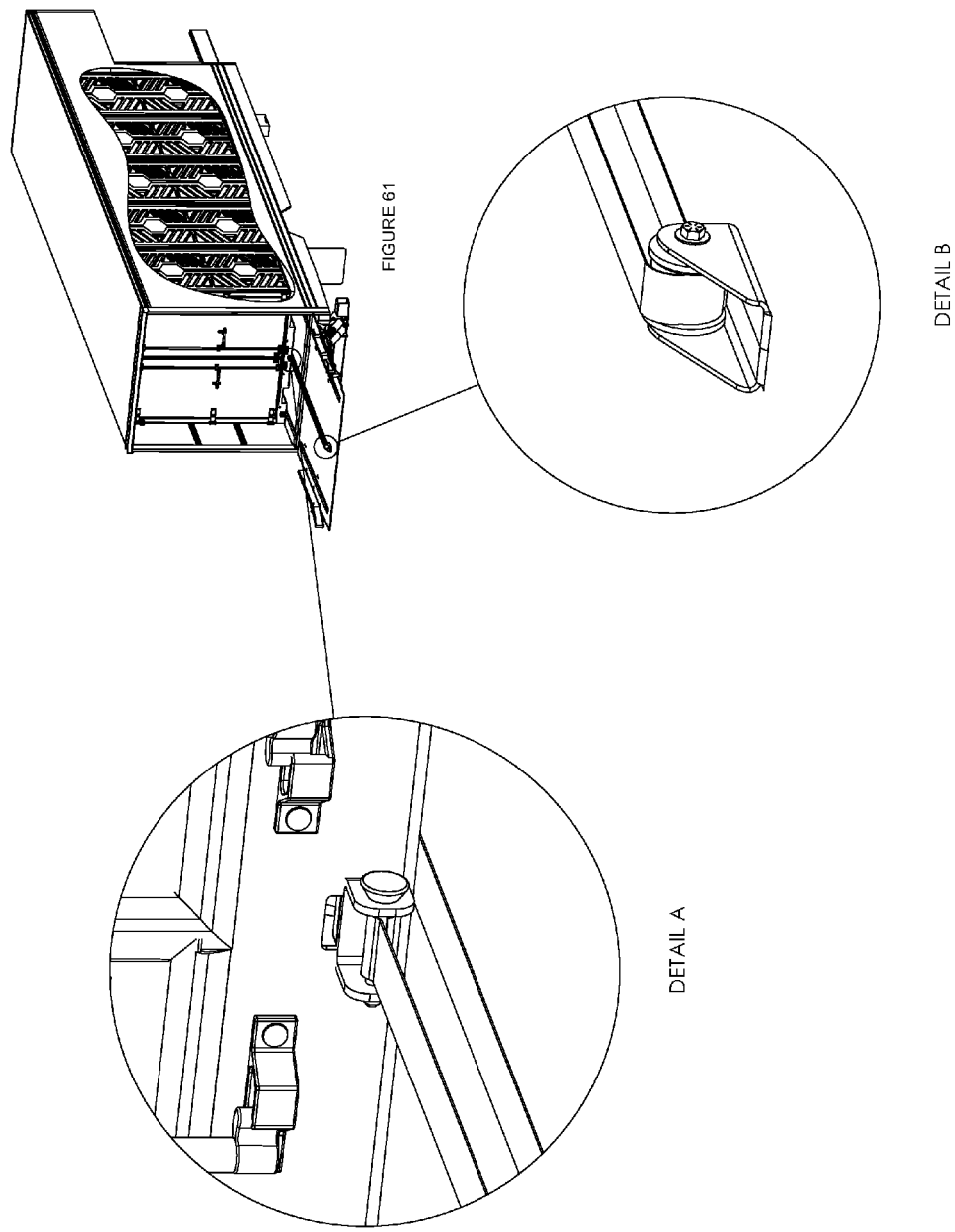
Figure 62:
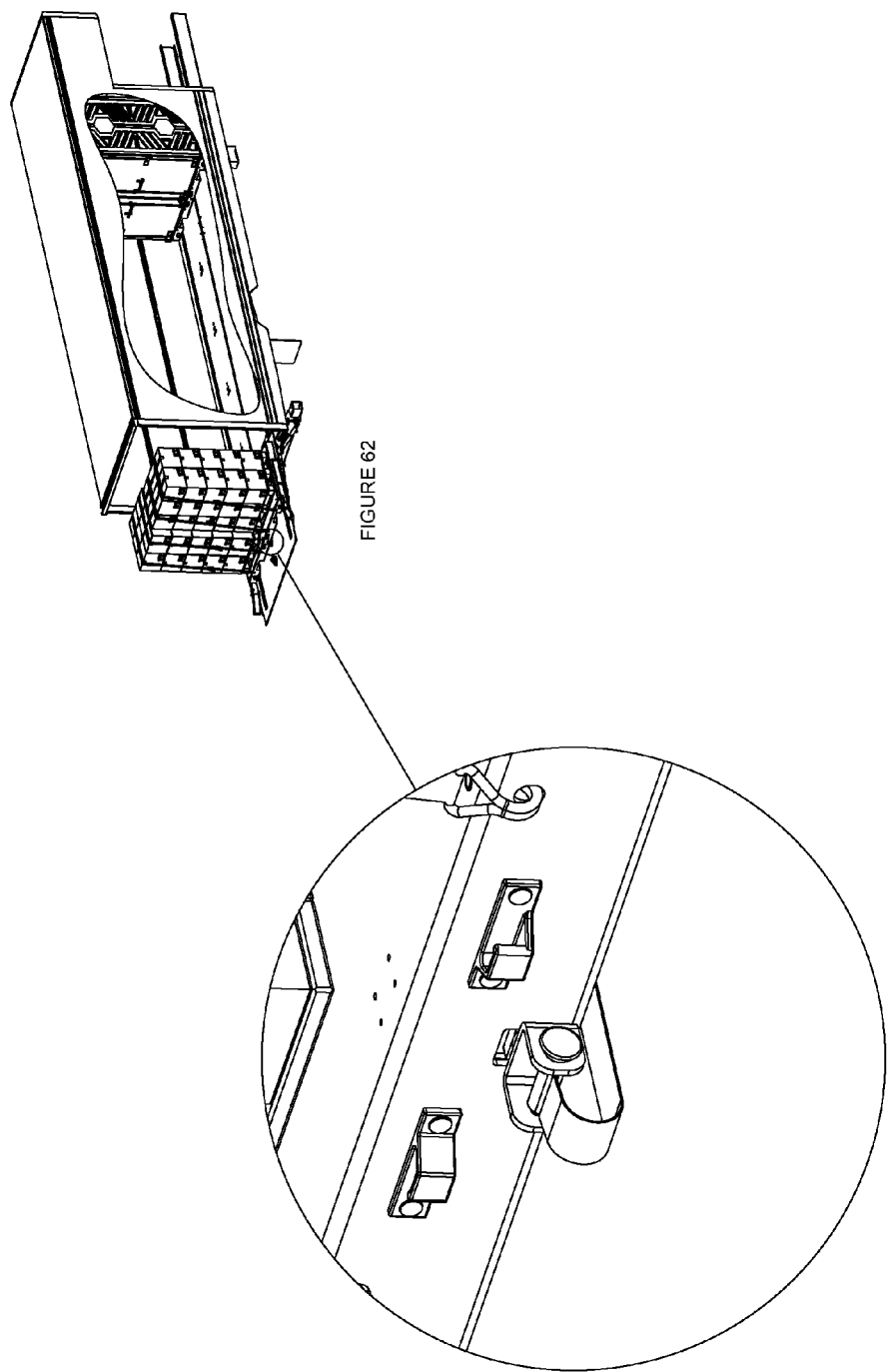
Figure 63:
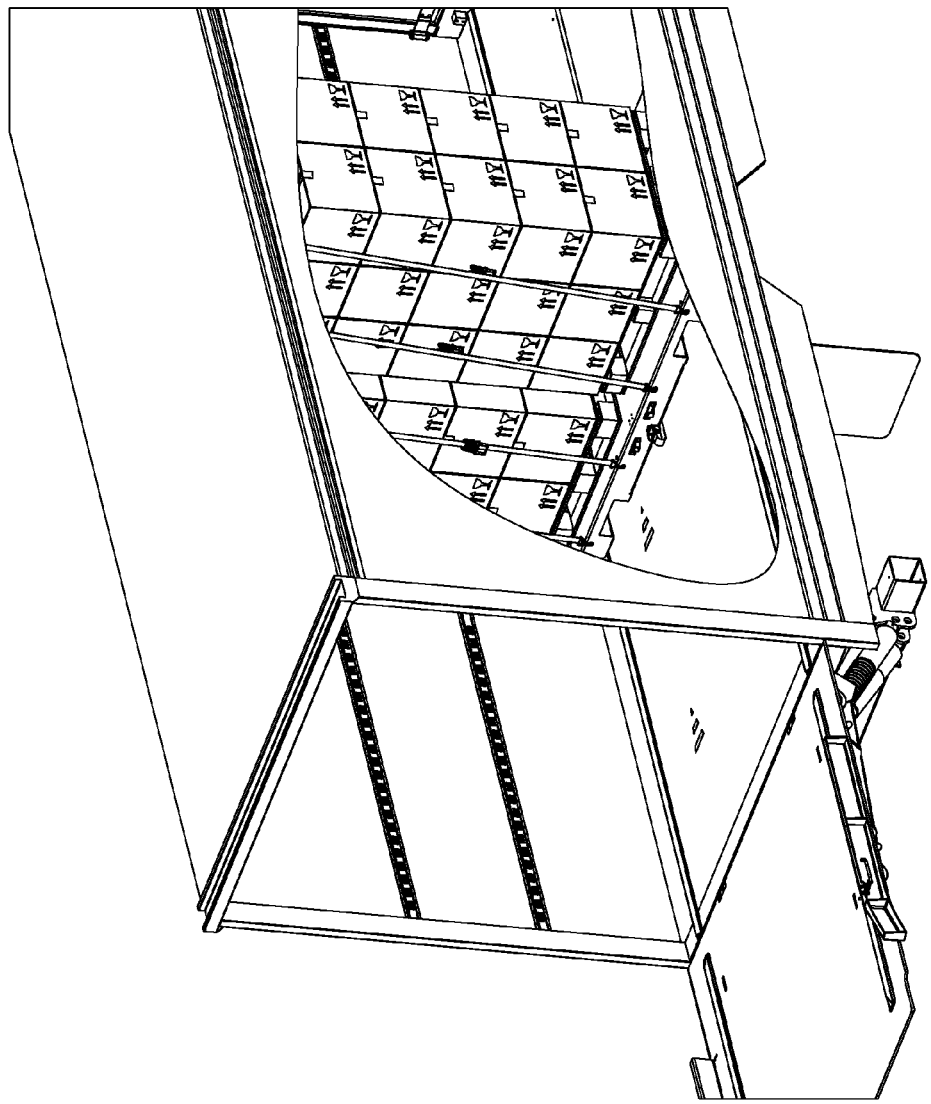
Figure 64:
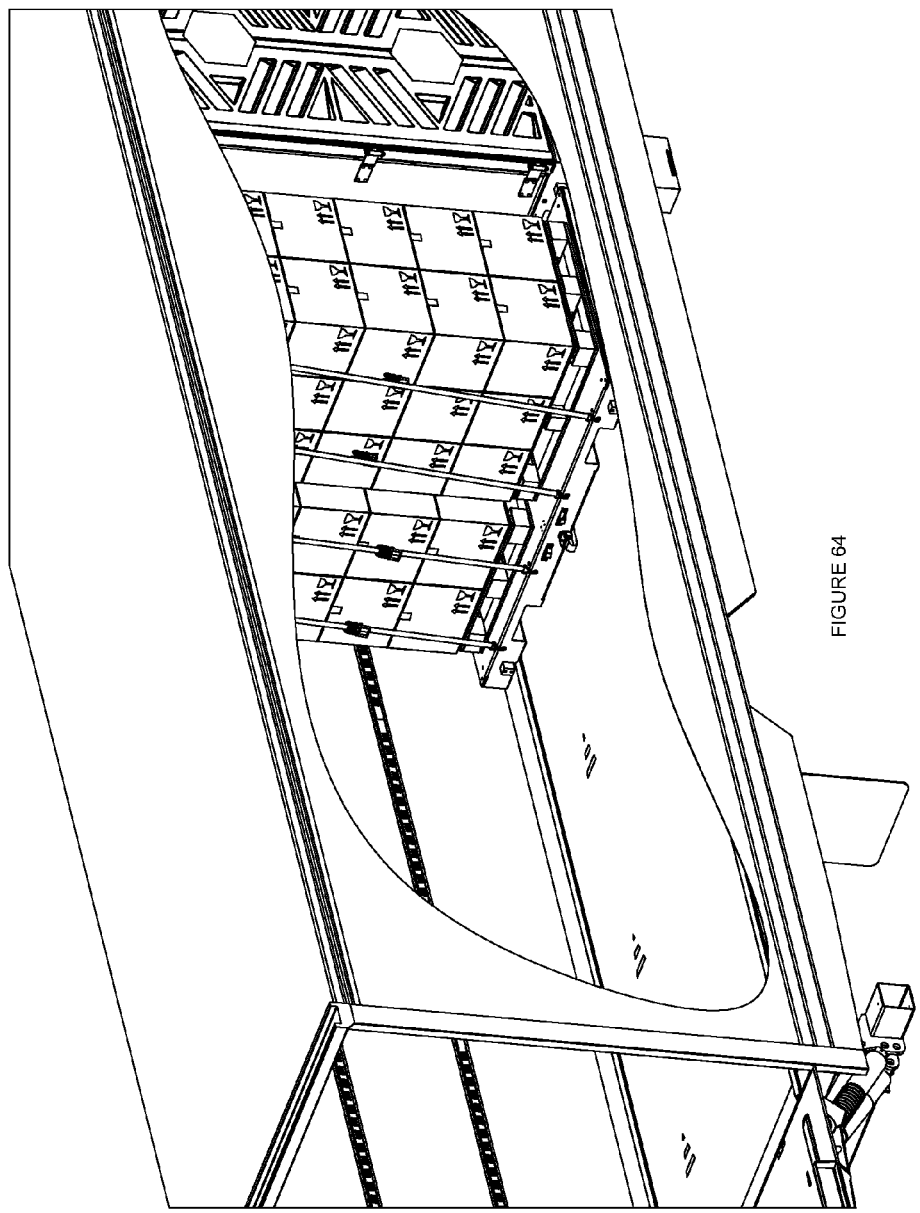
Figure 65:
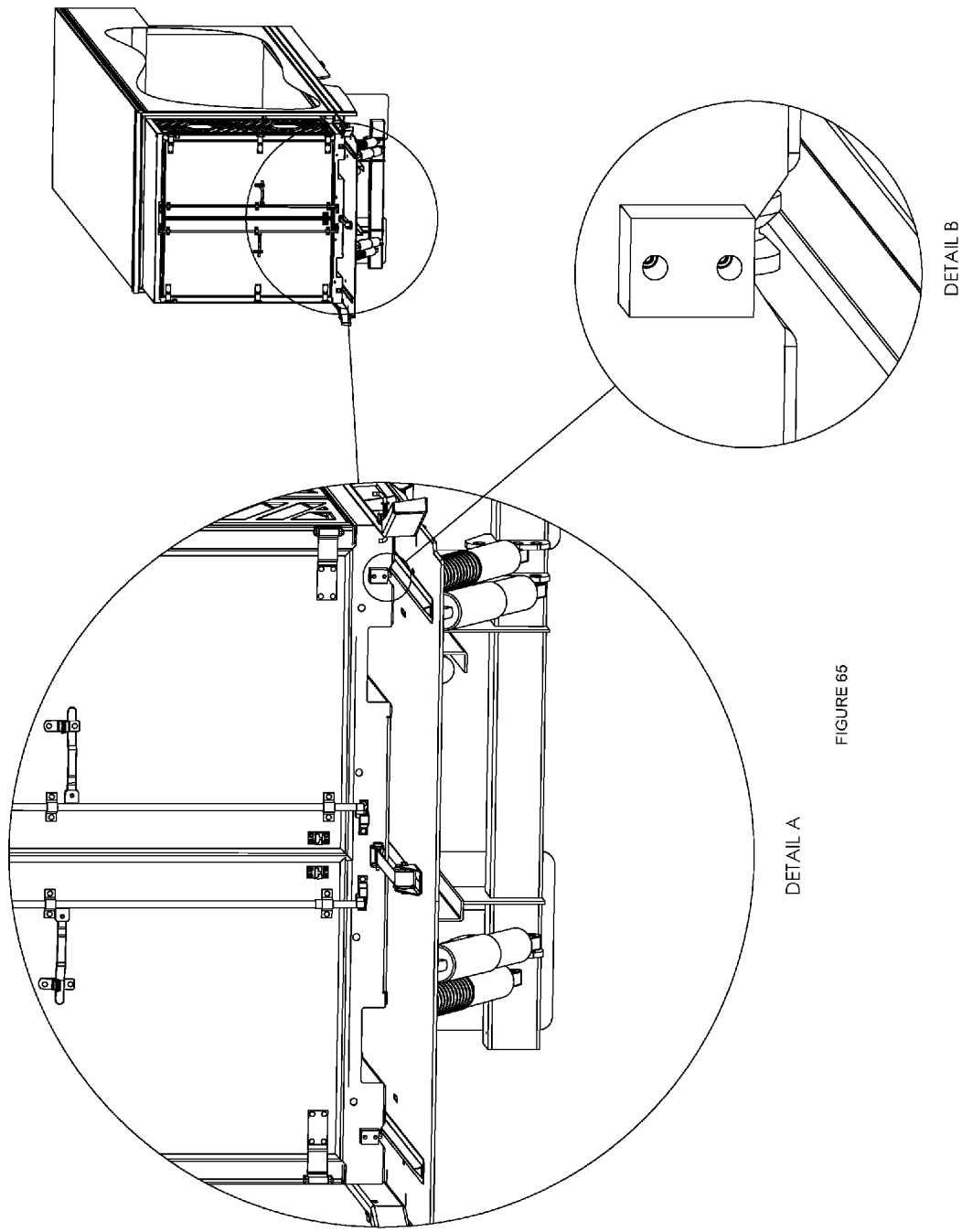
Figure 66:
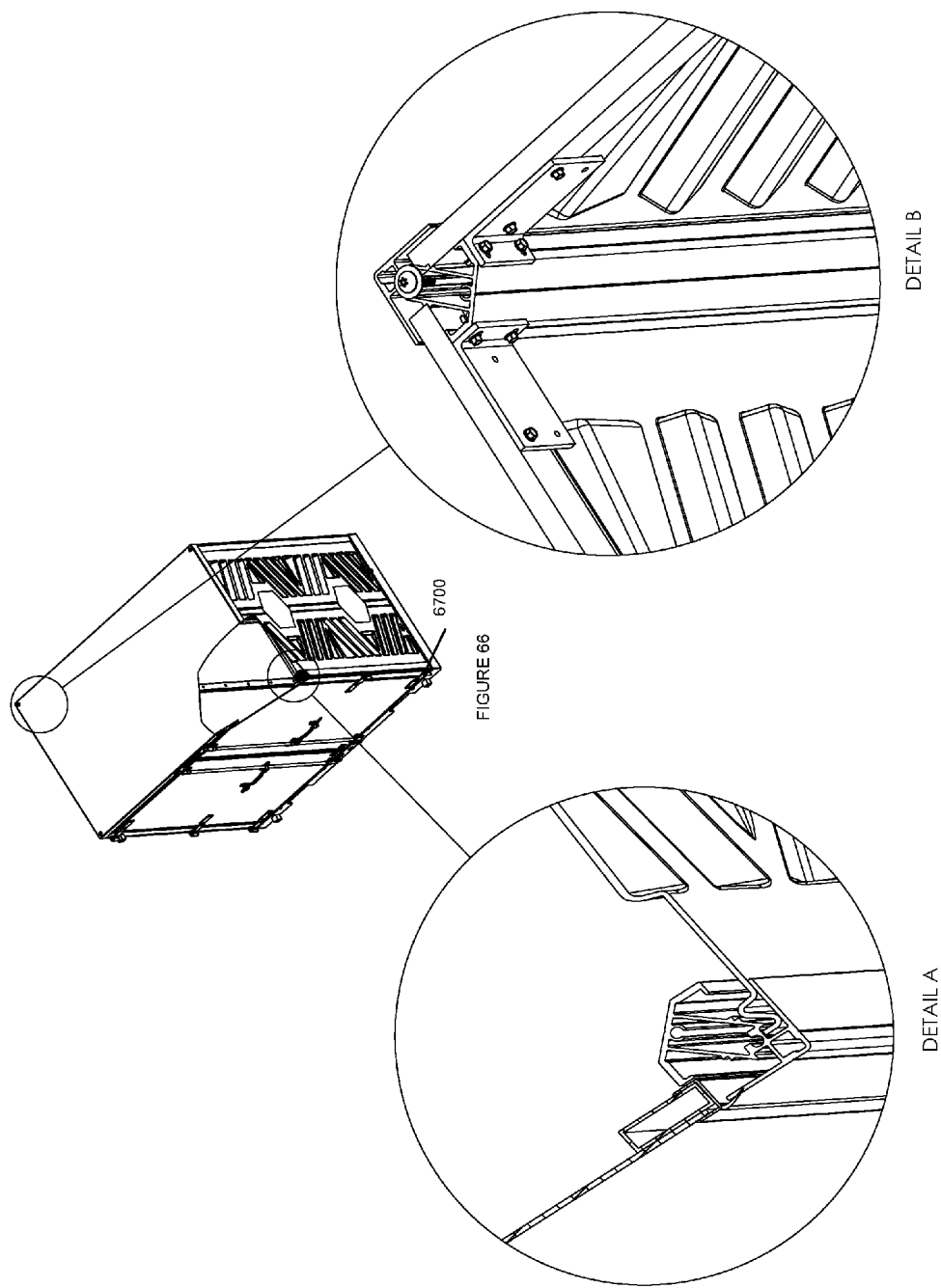
FIG. 66 is a top view with portions removed depicting end frame supports.

There may also be upside side down V shaped cutouts (e.g. 2508 and 2510) along a front portion of the cover (142) to allow the base to slide along tracks. As shown in FIGS. 50-64, the pulley system assembly attached to the bottom interior of the shipping container and aligned with a center portion opening (pulley opening (2504)) along a middle front portion of the center portion opening in the base, wherein a portion of the pulley system assembly threads the center portion opening. As shown in FIG. 55, there may be a pulley end (5500) and a strap that is wrapped around the pulley end and drags the base with the cargo (5504) out of the shipping container (5502). According to one embodiment, the pulley system utilizes a nylon strap but it is also envisioned, by way of example, that many other things could be used, such as a Steel Cable, rope or chain. The first open bottom channel (124) and second open bottom channel (127) may be sized to receive a portion of a lifting device. For example, they may be sized to receive the fork portion of a fork lift. The present invention envisions using many different types of lifting devices. The base and the panels generally form a cargo cube that is (1) 60"×96"×107"; (2) 72"×96"×107"; OR 96"×96"×107." This is by example only and it may be any size. FIG. 38 depicts a liftgate (3800) with a base (100) attached to it. There are guides (145) used to align the container during loading so the wheels hit the tracks correctly and used to fit the roller (5500) when unloading containers. FIG. 56, Detail B depicts a piece used to attach the pulley strap to base. FIG. 62, Detail A shows the configuration when loading container/cargo. FIG. 42, Detail A depicts a lever used to lift or lower the stoppers. FIG. 48, detail A is used to lock the stoppers in place.

Figure 3:
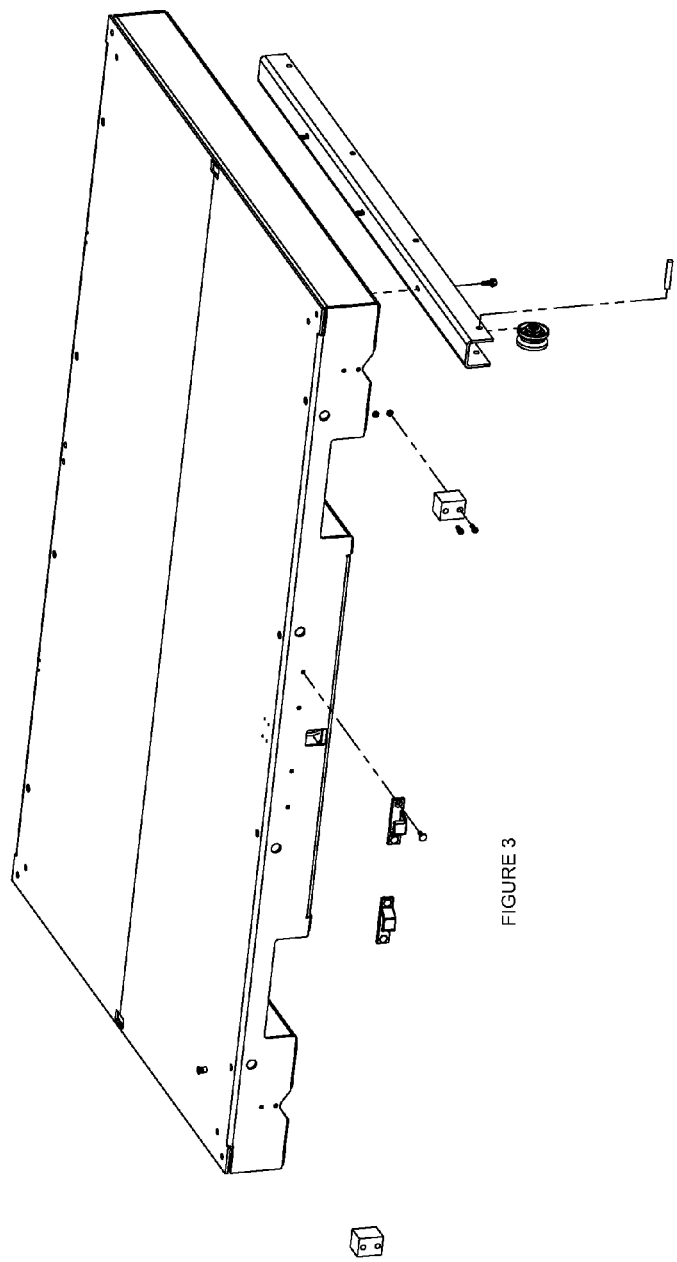
FIG. 3 is a picture of the base with a wheel assembly and also depicting the bumper and keeper.
Figure 4:
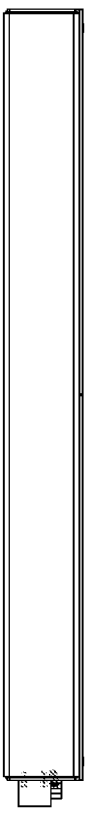
FIG. 4 is a picture of a side of the base.
Figure 5:
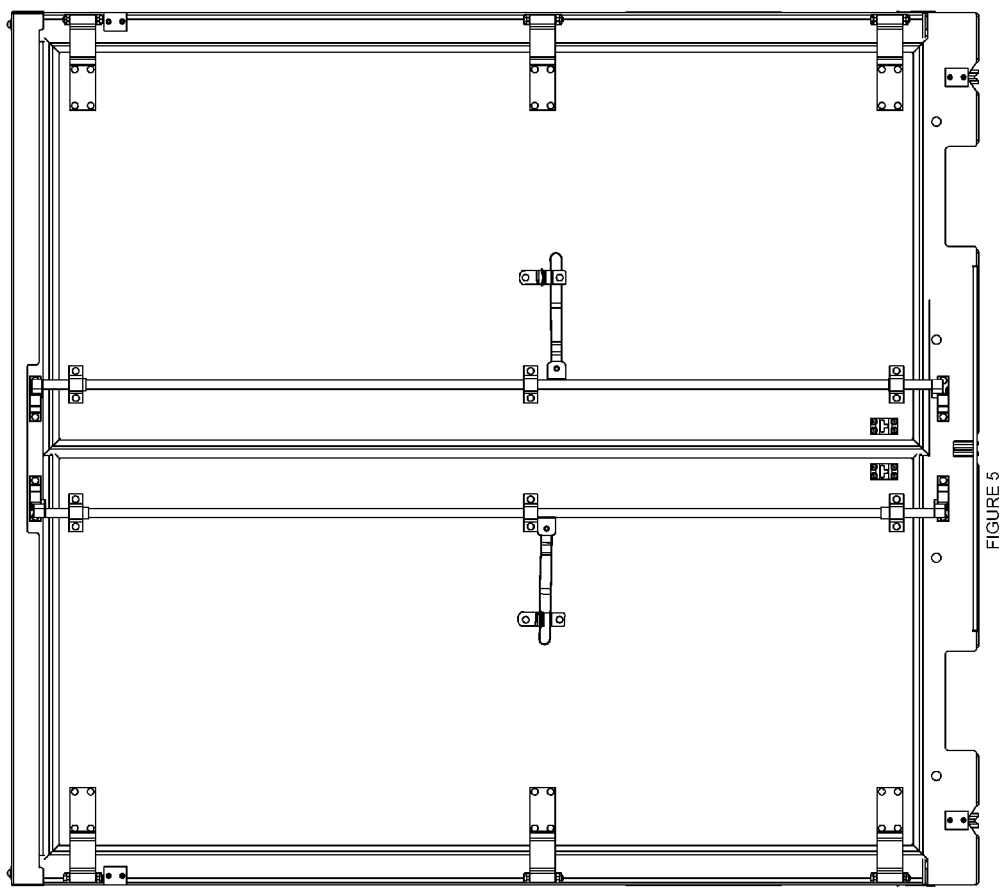
FIG. 5 is a picture of a cargo container mounted on a base.
Figure 6:
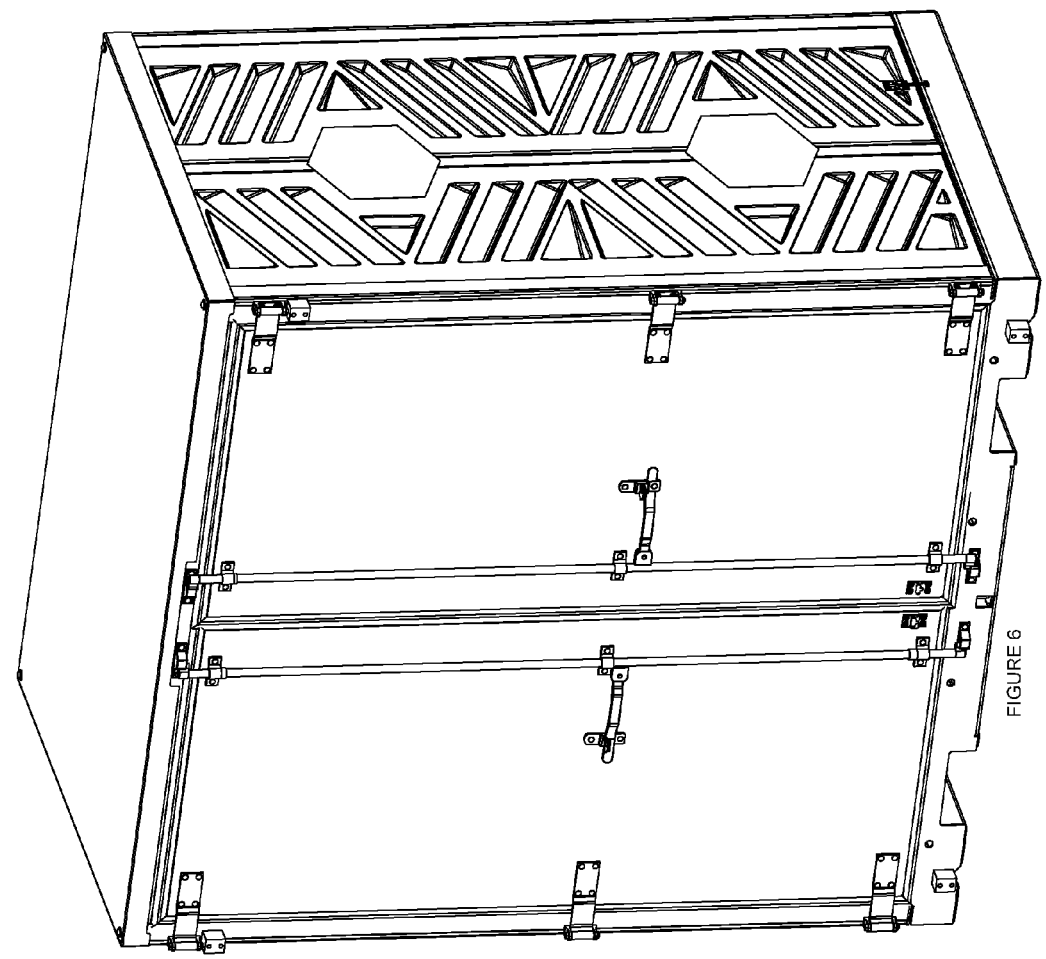
FIG. 6 is a picture of a cargo container mounted on a base.
Figure 7:
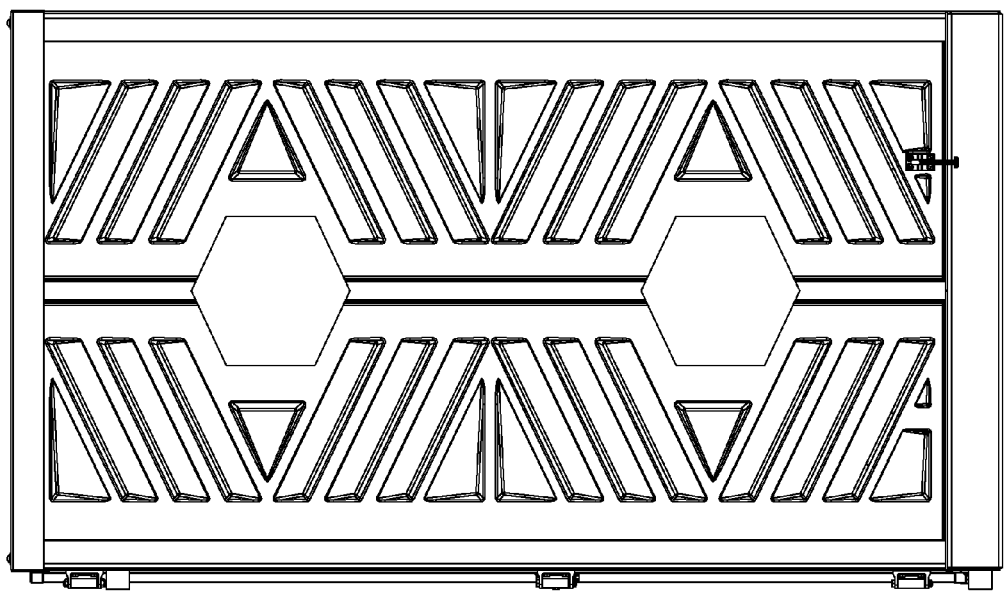
FIG. 7 is a picture of the side of the cargo container.
Figure 8:
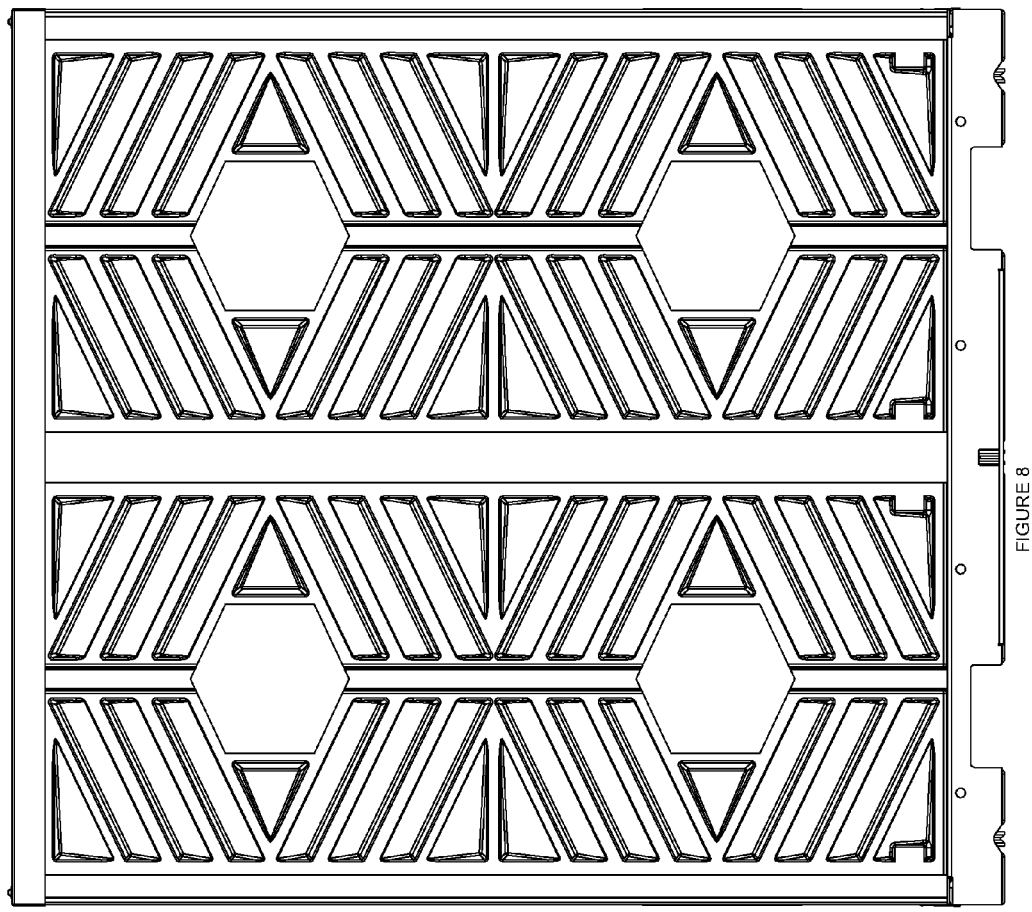
FIG. 8 represents a picture a back view of the cargo container.
Figure 9:
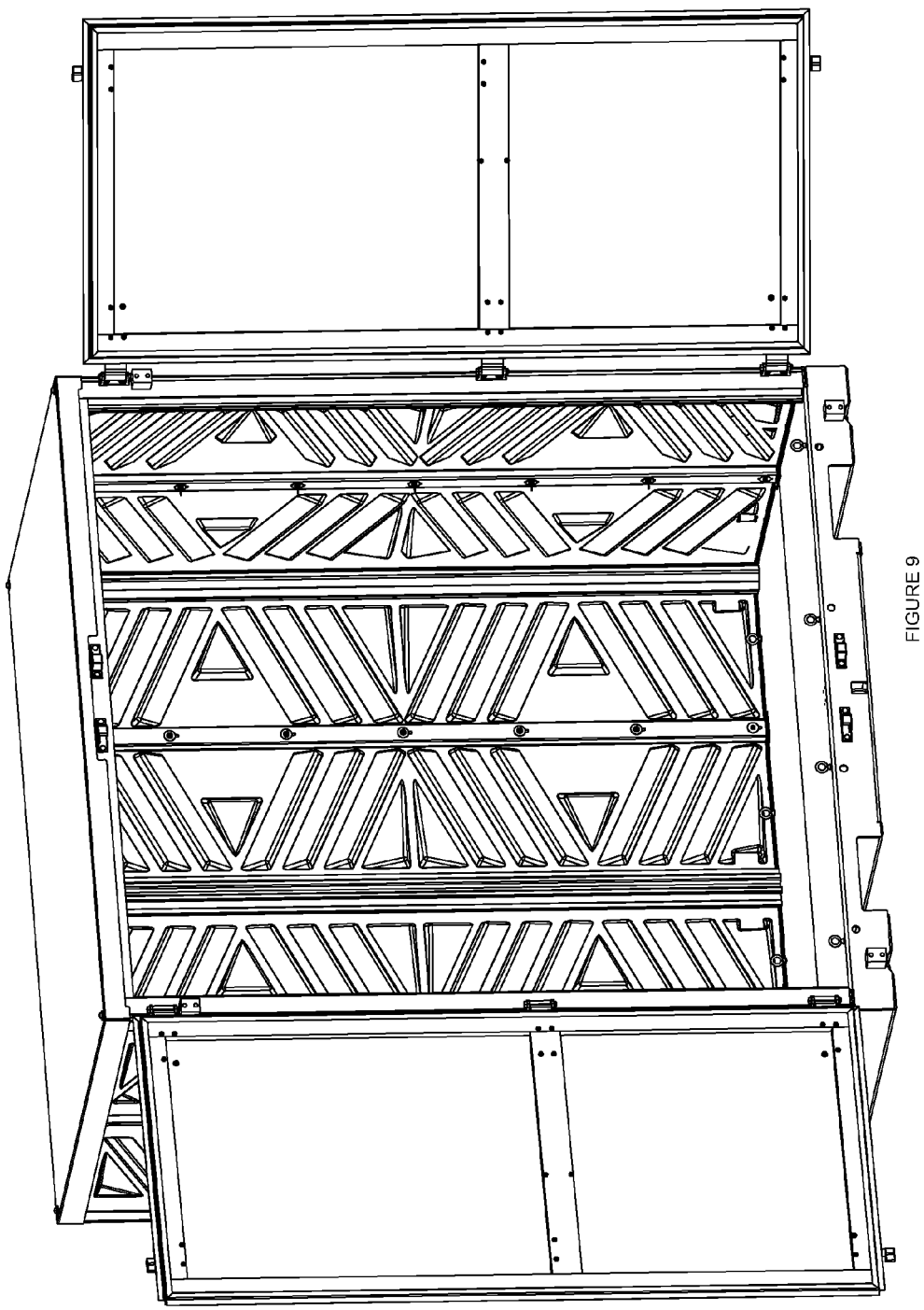
FIG. 9 is a picture of a cargo container with open doors.
Figure 10:
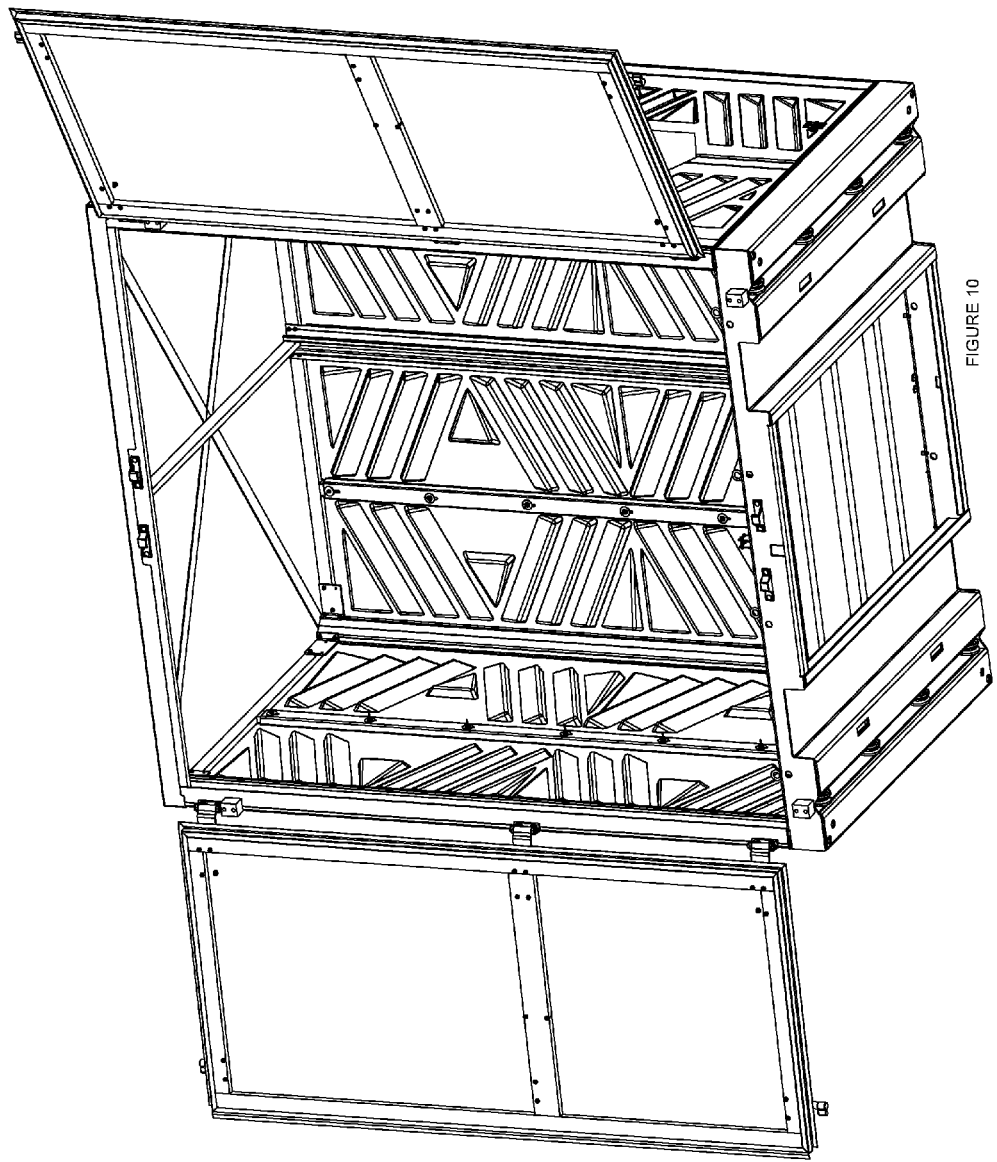
FIG. 10 is a picture of the open cargo container box at an angle showing the base.
Figure 11:
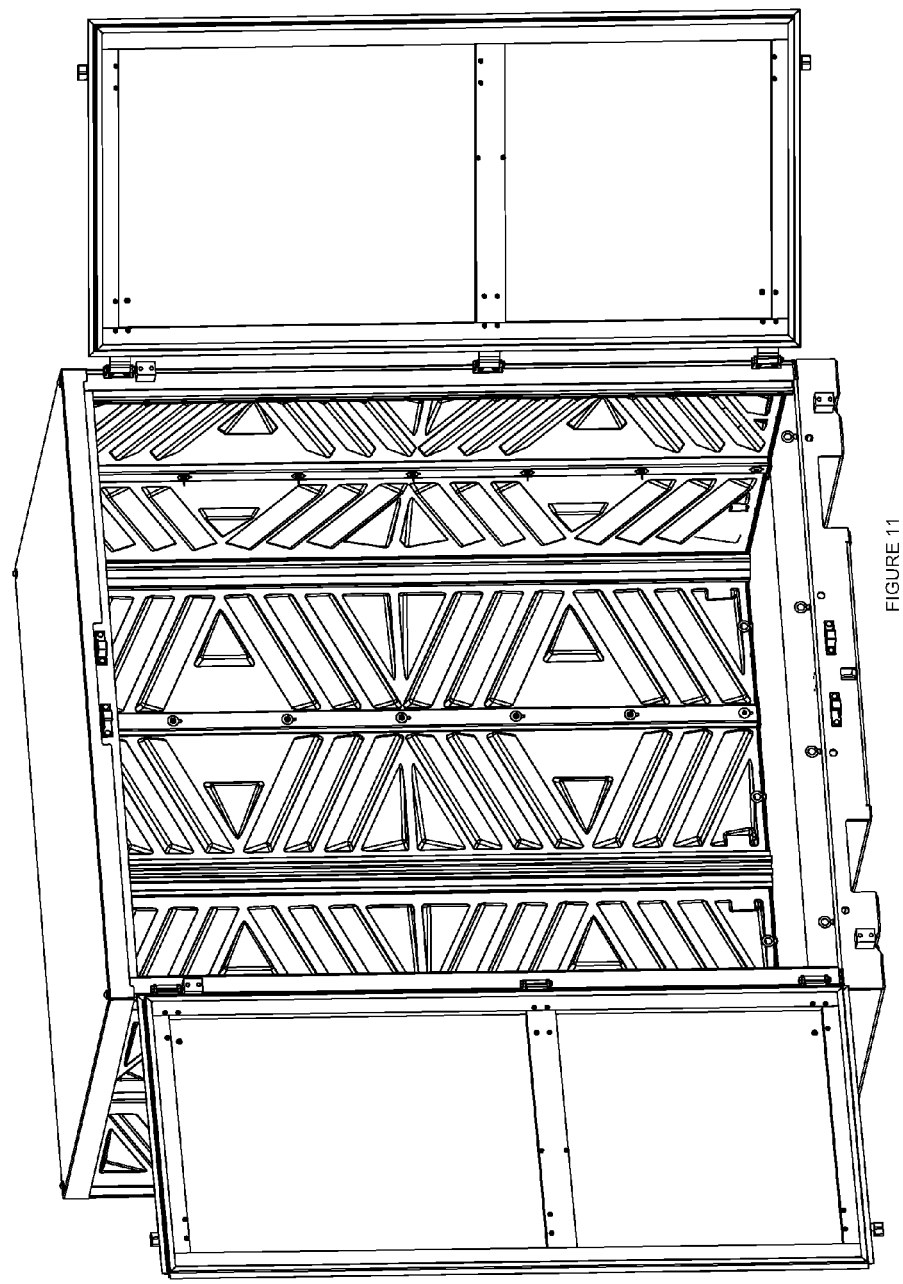
FIG. 11 is a picture of a cargo container box at an angle also depicting the base.
Figure 12:
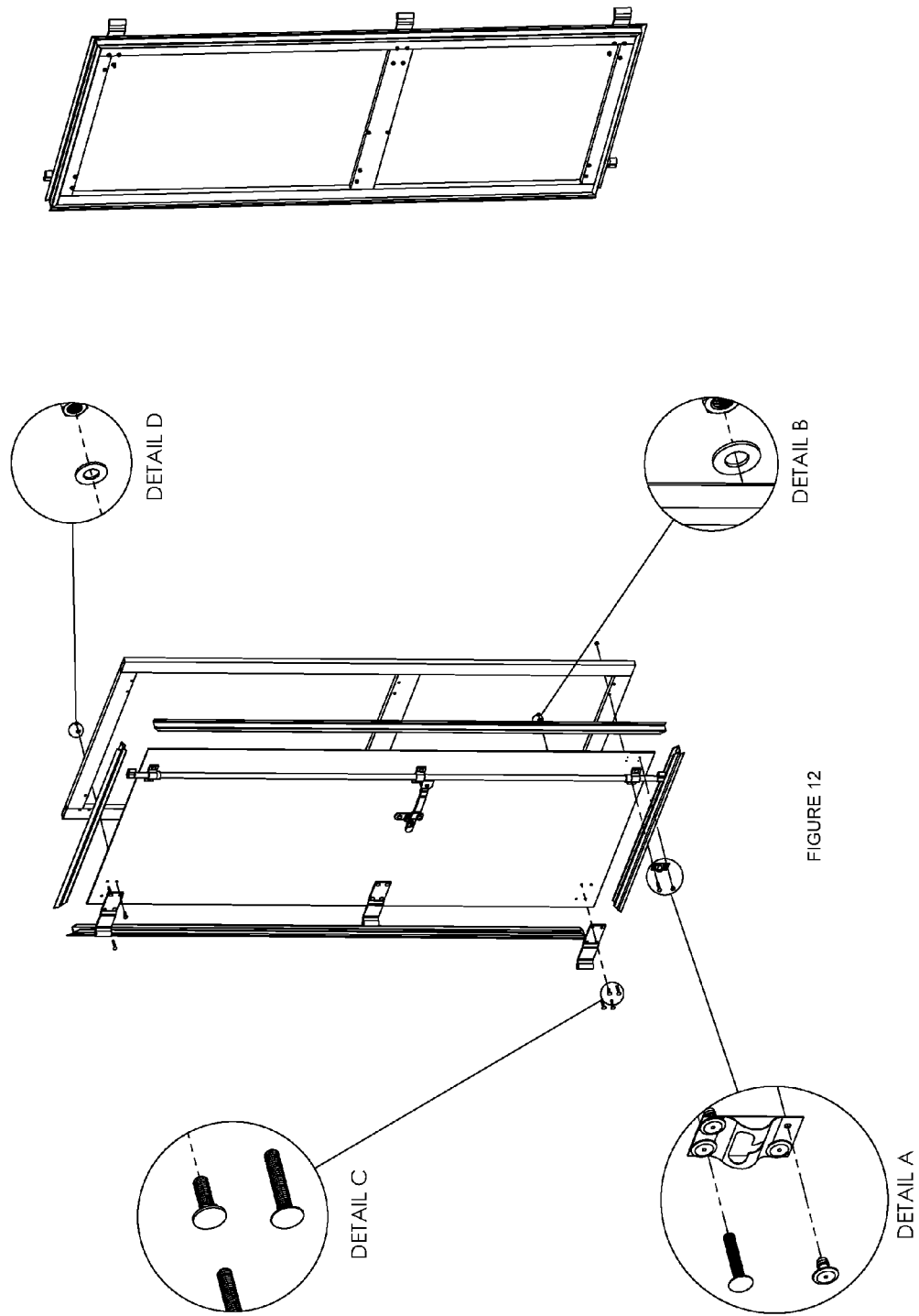
FIG. 12 depicts a door of a cargo container.
Figure 13:
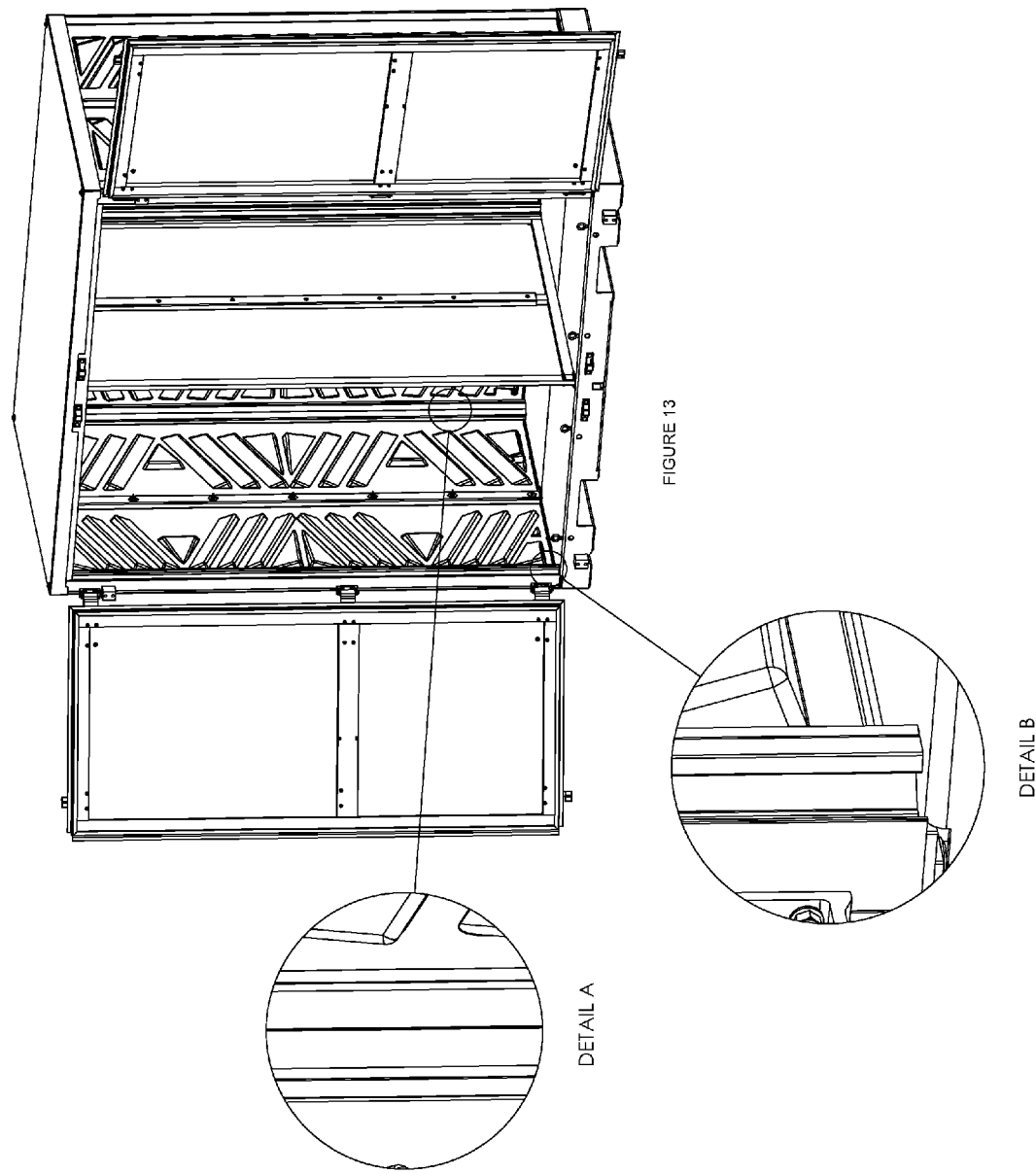
FIG. 13 is a picture of the cargo container with a base and an interior partition wall.
Figure 14:
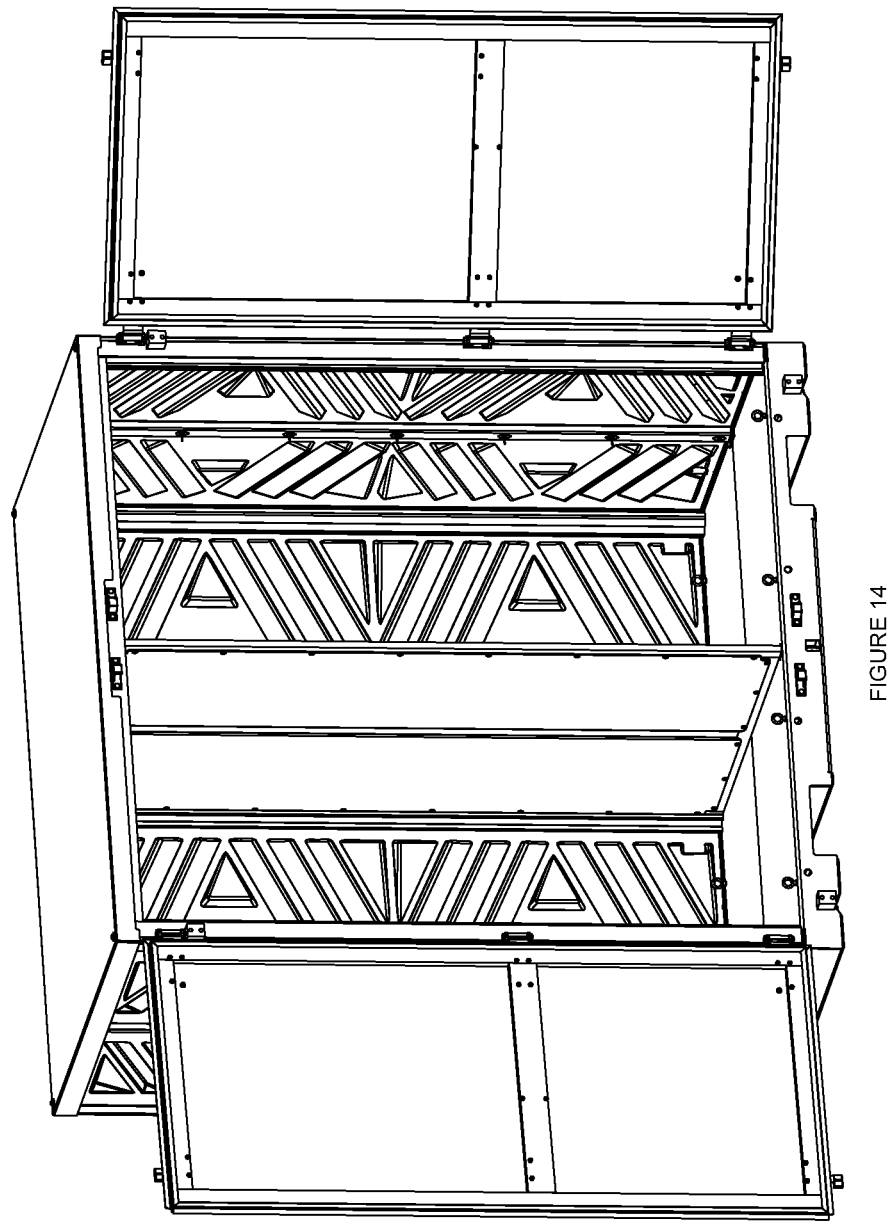
FIG. 14 is a picture of the cargo container with a base and an interior partition wall.
Figure 18:
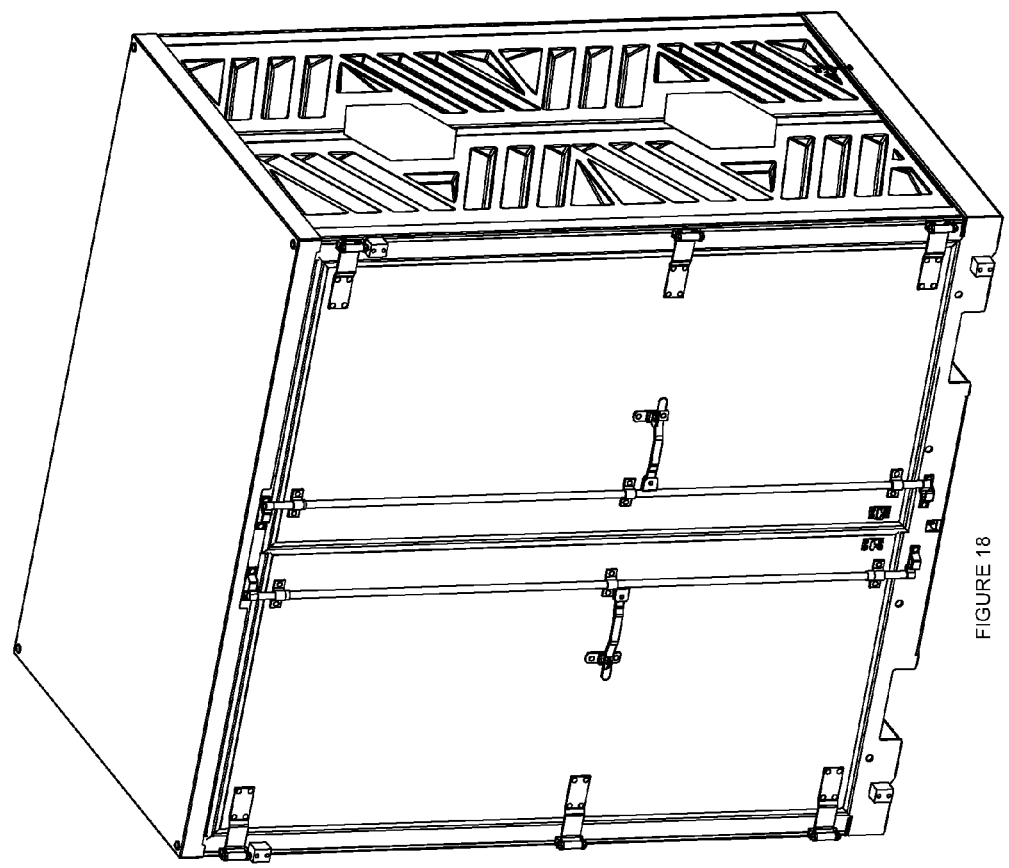
FIG. 18 is a front view of a shipping container and a base.
Figure 19:
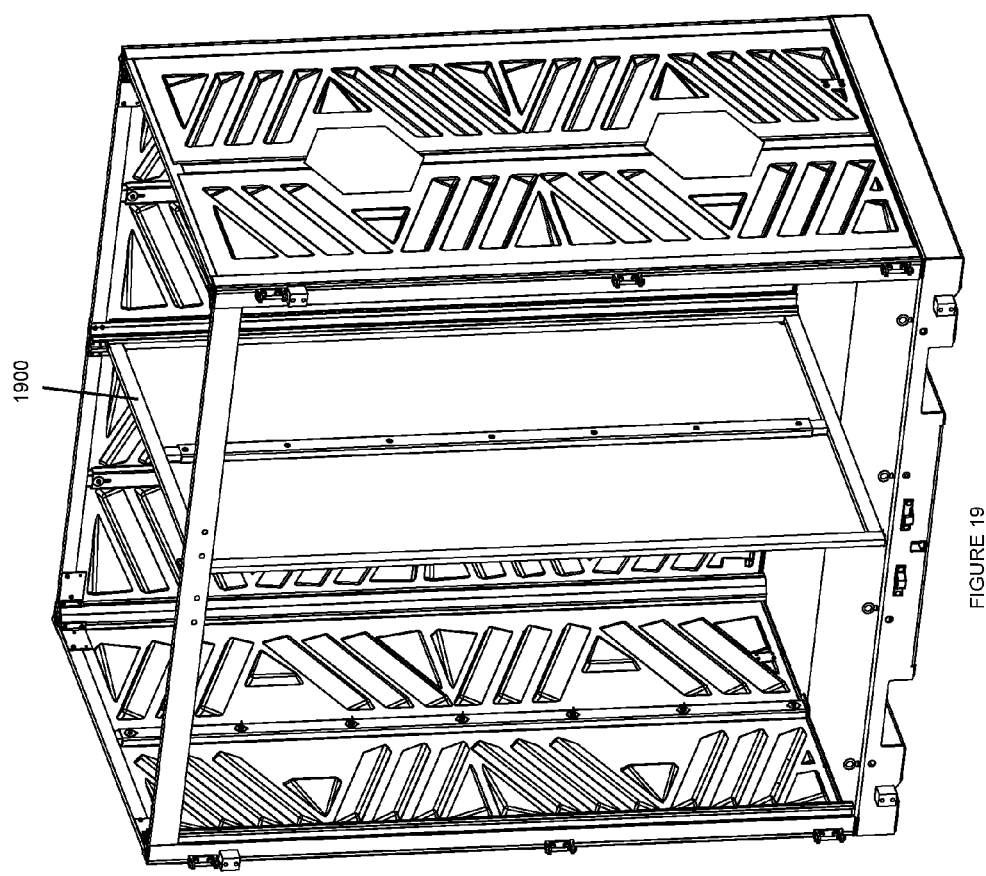
FIG. 19 is a front view of a shipping container and a base with the doors removed and the top removed.
Figure 20:
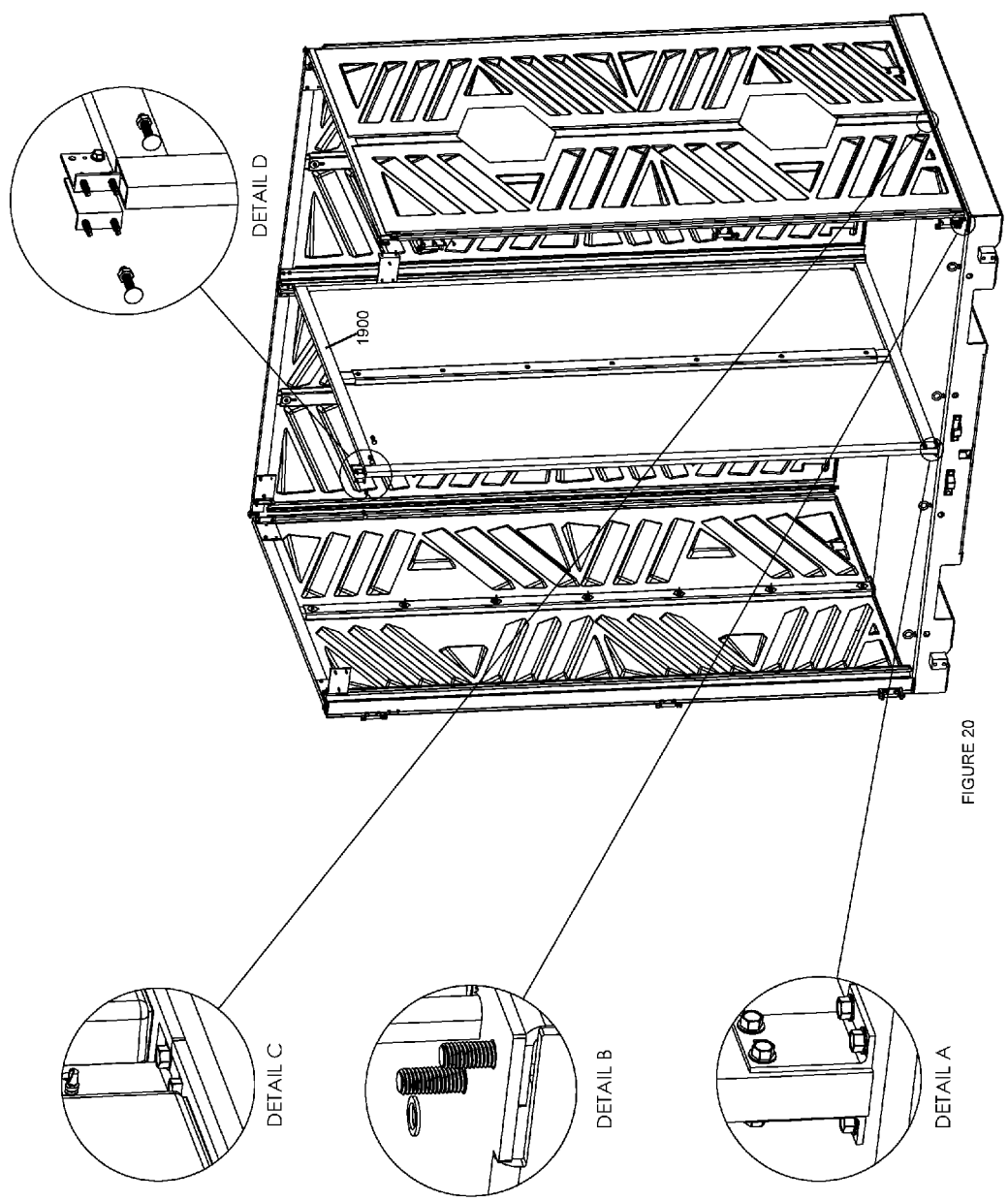
FIG. 20 is a front view of a shipping container and a base with the doors removed and the top removed.
Figure 21:
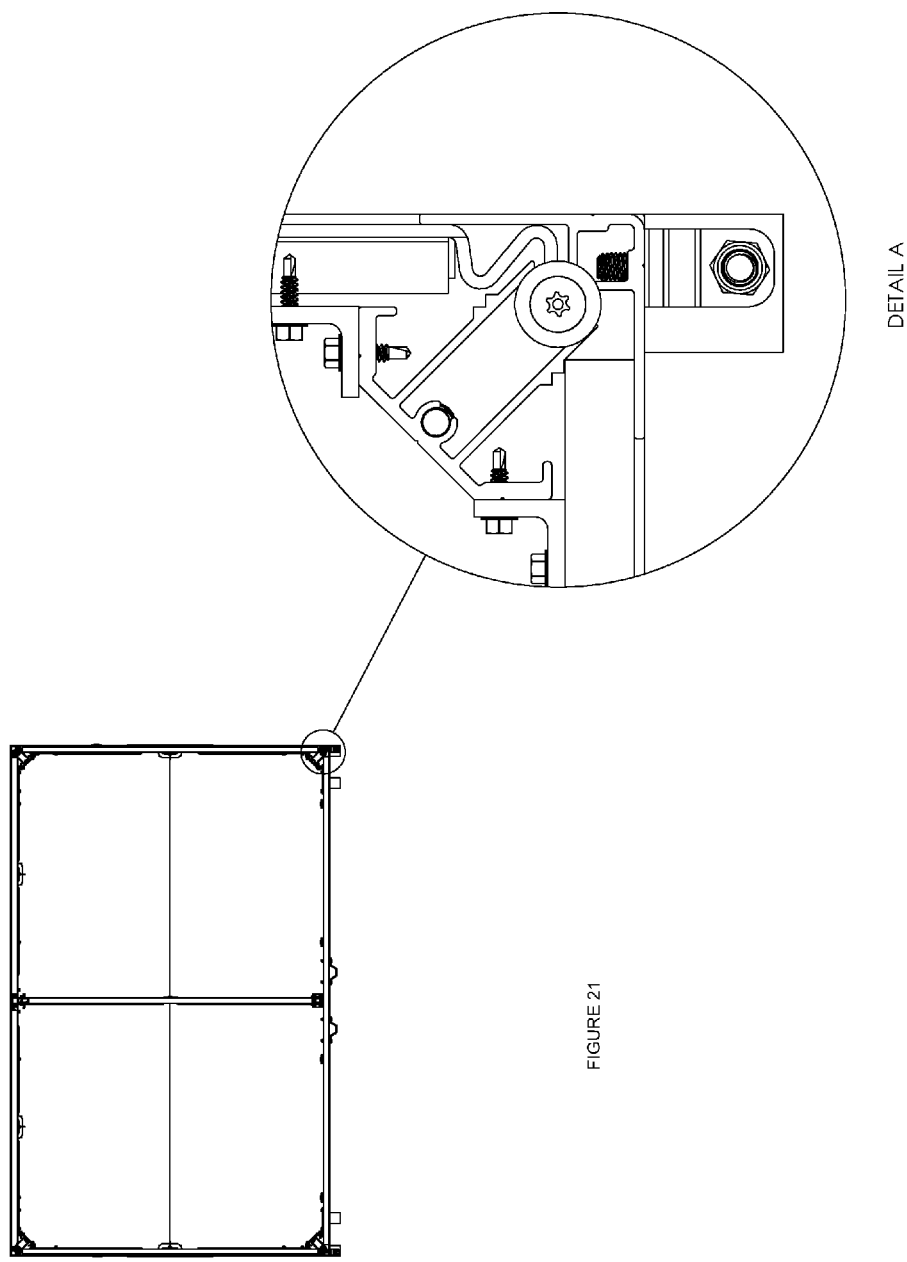
FIG. 21 depicts a top view of the shipping container with Detail A showing one of the end frame supports also referred to as corner posts.
Figure 22:
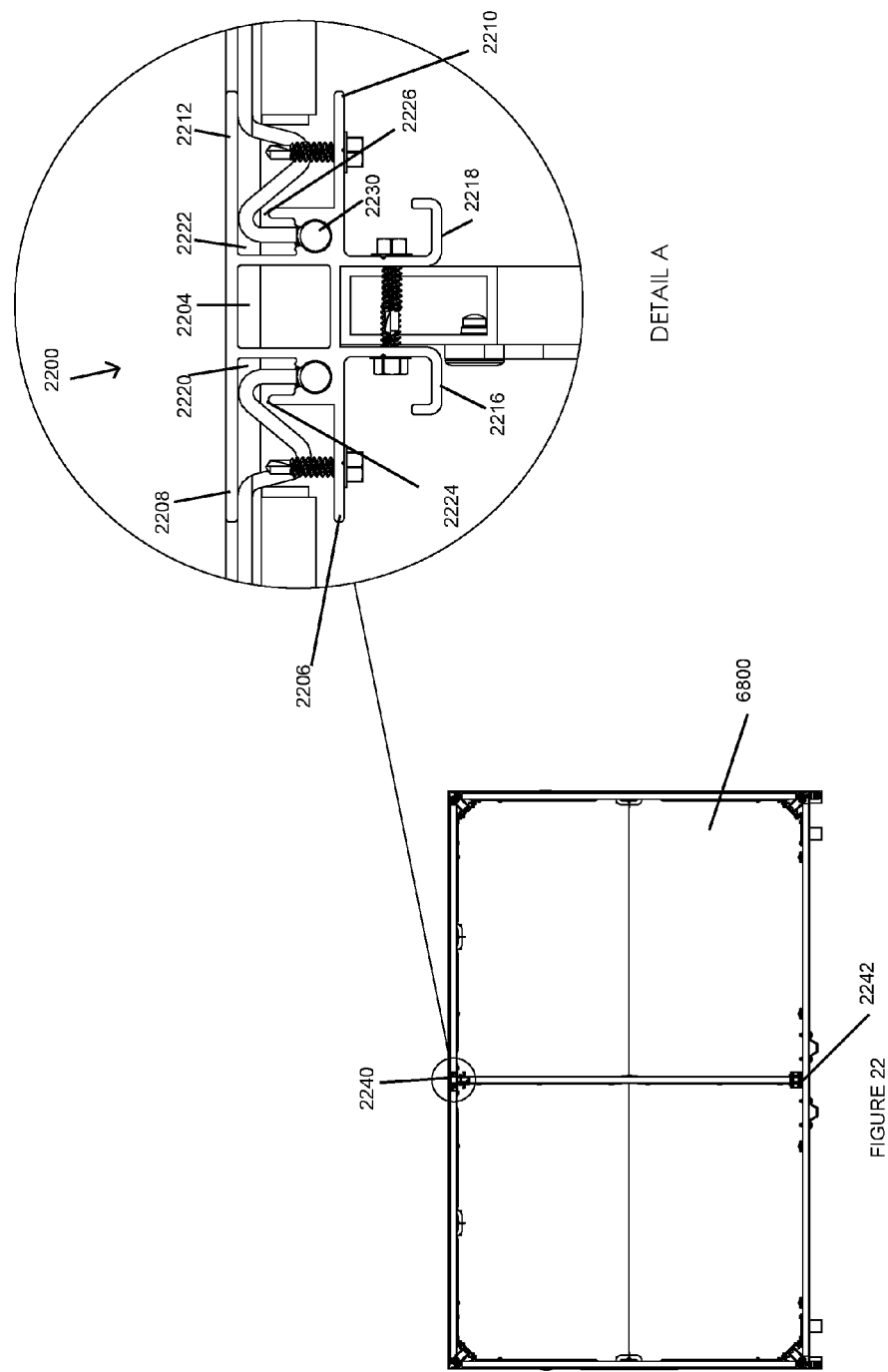
FIG. 22 depicts a top view of the shipping container with Detail A showing a center support also referred to as rear center post.
Figure 67:
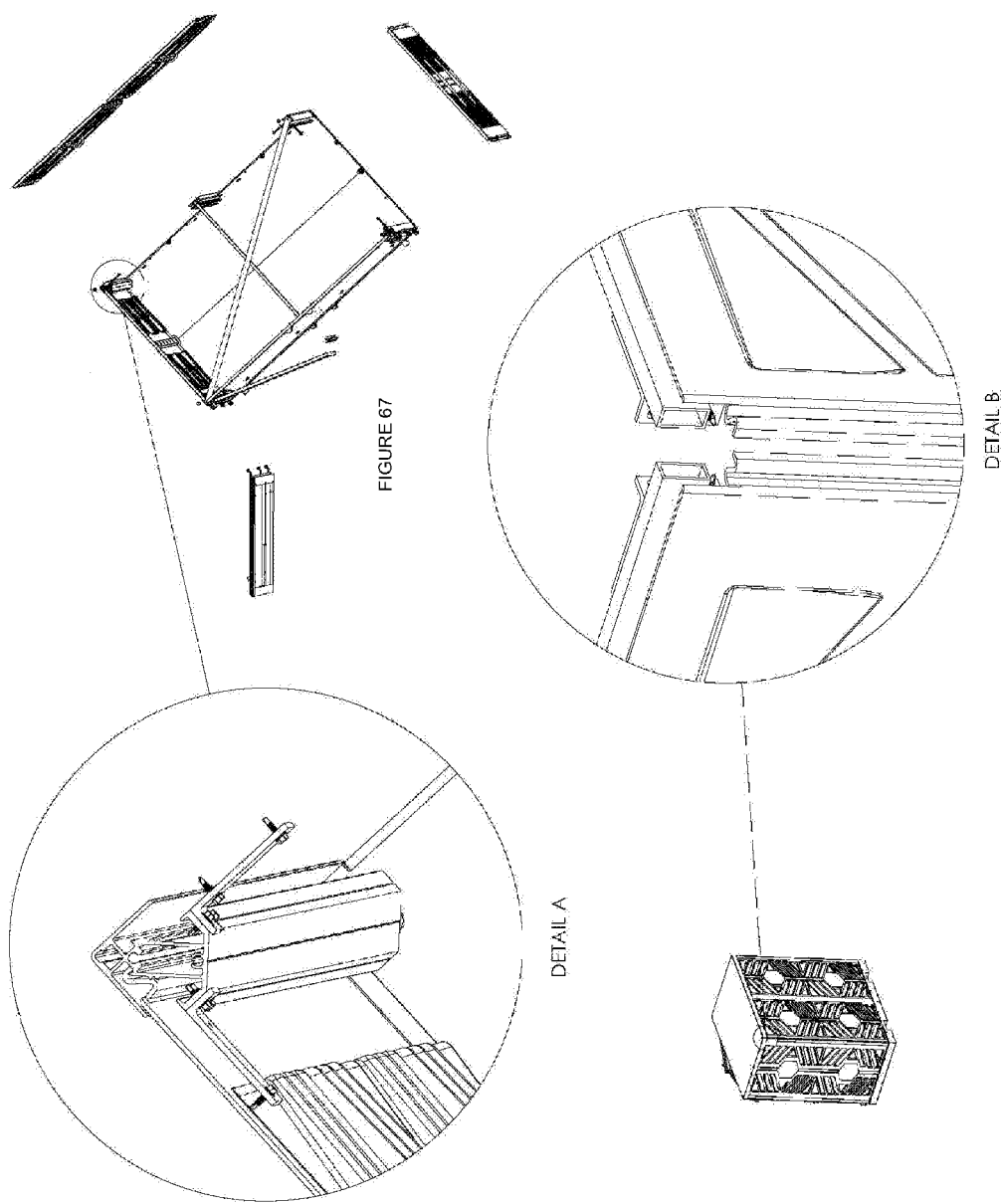
FIG. 67 is a top view with the top removed depicting end frame supports and FIG. 68 is the same view of 67 with numbering.
Figure 68:
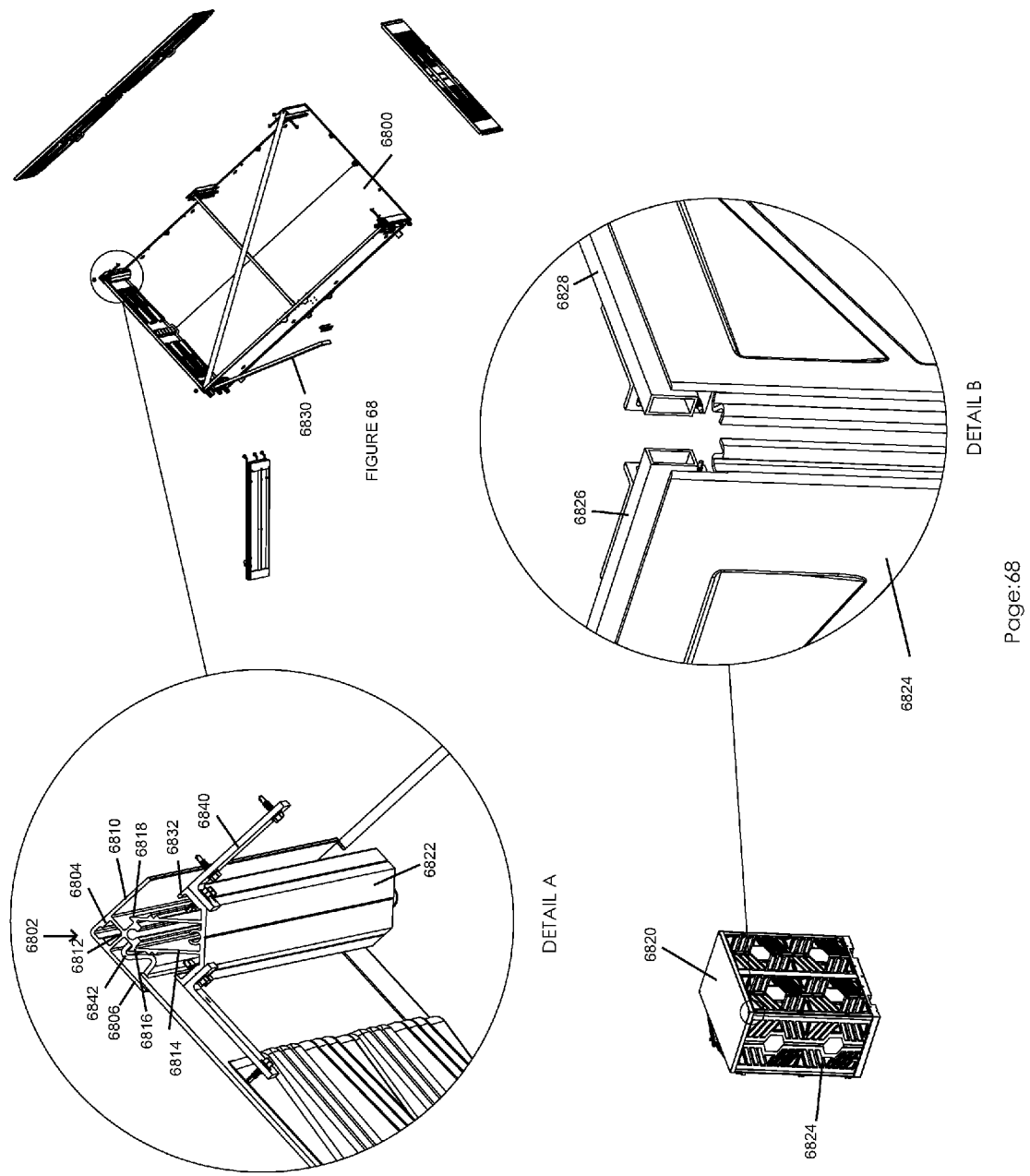
Figure 69:
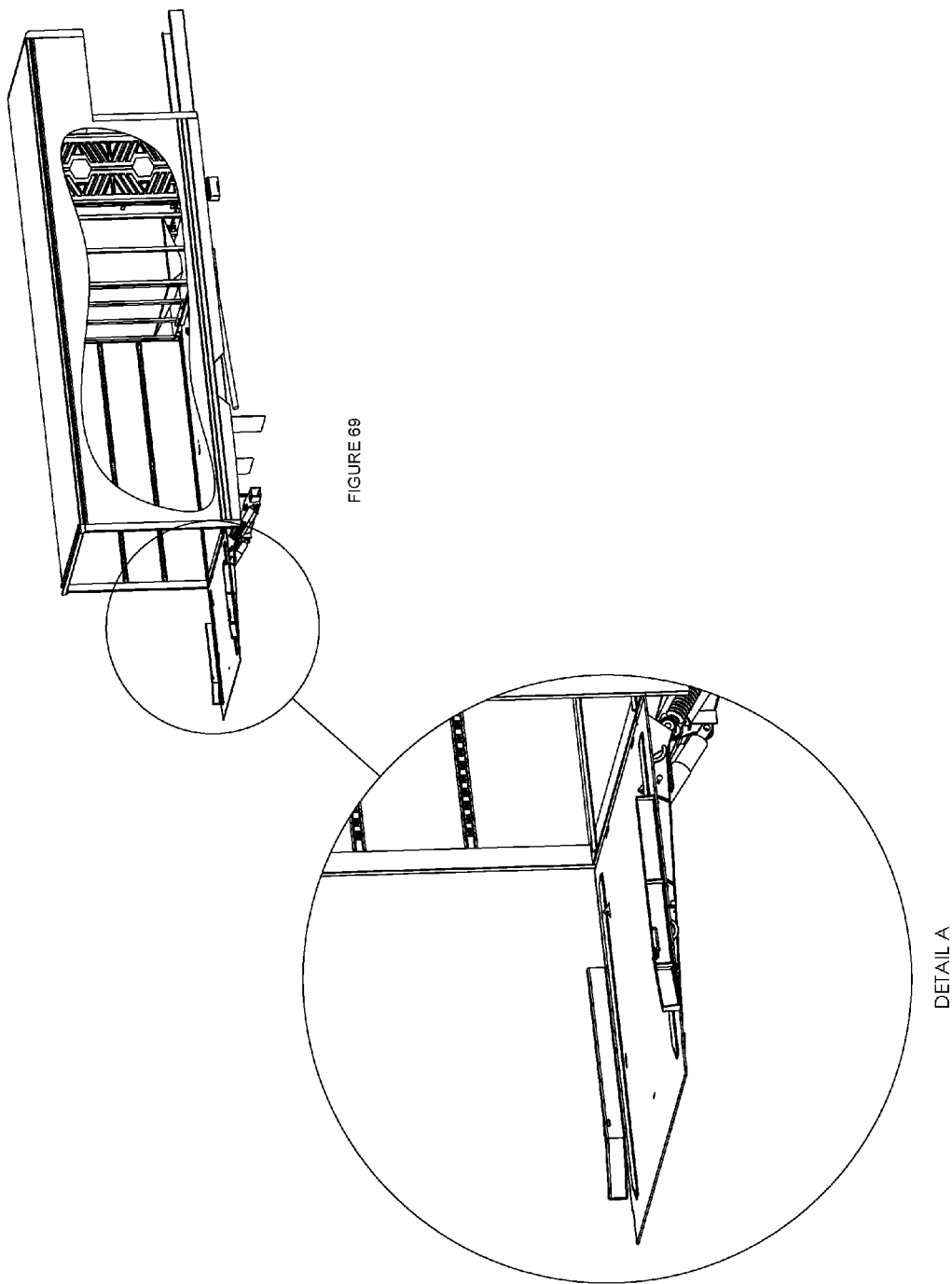
FIG. 69 depicts a truck with a portion of the side removed and shipping containers loaded on the truck.

As shown in FIGS. 67 and 68, the cargo container system may have a base (6800); at least four end frame supports (6802) attached substantially perpendicular to the base, wherein each of the end frame supports (6802) has a substantially closed square portion (6804) with four sides and having outer extensions (6806 and 6810) extending from two of the four sides and an additional support (6814) extending from the junction (6812) of the remaining two of the four sides of the substantially closed square portion (6804), wherein the additional support (6814) has two substantially L-shaped portions (6816 and 6818) that are substantially parallel to the outer extensions (6806 and 6810) and each of the at least four end frame supports having a corner support (6822) that is substantially parallel to the junction (6812); at least three panels (e.g. 6824), wherein each of the panels (6824) has two S-shaped ends (6842) and at least one of the two S-shaped ends (6842) is interposed between one of the two substantially L-Shaped portions (e.g. 6816 and 6818) that are substantially parallel to the outer extensions (6806 and 6810); at least three rectangular frames (e.g. 6826 and 6828), each of the at least four rectangular frames being removably attached to a corner support (6822); a top (6820) attached to the at least three rectangular frames; at least one door (6830), each at least one door attached by at least one hinge (6700) to one of the outer extensions (e.g. 6806 and 6810) of one of the at least four closed end frame supports (6802). The two S-shaped ends may be shorter than a side portion of the panel (e.g. 6824). As shown in Detail B of FIG. 68, the at least three rectangular frames (e.g. 6826 and 6828) may extend above the corner support and the at least three panels (e.g. 6824). There may also be a ratchet extension (6832) extending from the corner support (6822). There may be a female threaded hole, for receipt of a corresponding screw, between the two substantially L-shaped portions (6816 and 6818) that are substantially parallel to the outer extensions (6806 and 6810) and a brace having a hole at a first end and a hole at a second end, wherein a first screw is inserted through the hole at a first end and into a female threaded hole of one of the at least four end frame supports (6802) and a second screw is inserted through the hole at the second end and into a female threaded hole of another one of the at least four end frame supports. Each of the corners of the base (6800) may have an end frame support. As shown in FIG. 22, there may be at least one center support (2200) attached to the base (6800) between two of the at least four end frame supports, wherein the center support (2200) has a closed square center portion (2204) with four sides and four corners and center extensions (2206, 2208, 2210 and 2212) extending from each of the four corners of the closed square center portion (2204), two partially open rectangular portions (2220 and 2222) each between two center extensions (e.g. 2220 is between 2208 and 2206; 2222 is between 2212 and 2210) and having an opening (e.g. 2224 and 2226) on a side away from the closed square center portion (2204) for the receipt of one of the two S-shaped ends (6842 of one of the panels. There may be two substantially L-shaped portions (2216 and 2218) that each extend from one of the four corners and are substantially perpendicular to the center extensions, wherein the two substantially L-Shaped portions are faced in opposing directions. There may be a partition having a top, bottom, a first side (2240) and a second side (2242), wherein one of the first side (2240) and the second side (2242) is between and supported in an upright position by the two substantially L-shaped portions (2216 and 2218). The two substantially L-shaped portions (2216 and 2218) may also be used for tie down straps. There may be a center support female threaded hole (2230) for receipt of a corresponding screw in at least one of the two partially open rectangular portions and a brace having a hole at a first end and a hole at a second end, wherein a first screw is inserted through the hole at a first end and into a center support female threaded hole (2230) and a second screw is inserted through the hole at the second end and into a female threaded hole of another center support. As shown in FIGS. 17, 19 and 20, there may be a header support (1900) attached to the at least one center support (2200) at an end opposite the base and below the top (1700) and in communication with the top (1700). This configuration allows the base to be easily moved with little effort.

Figure 43:
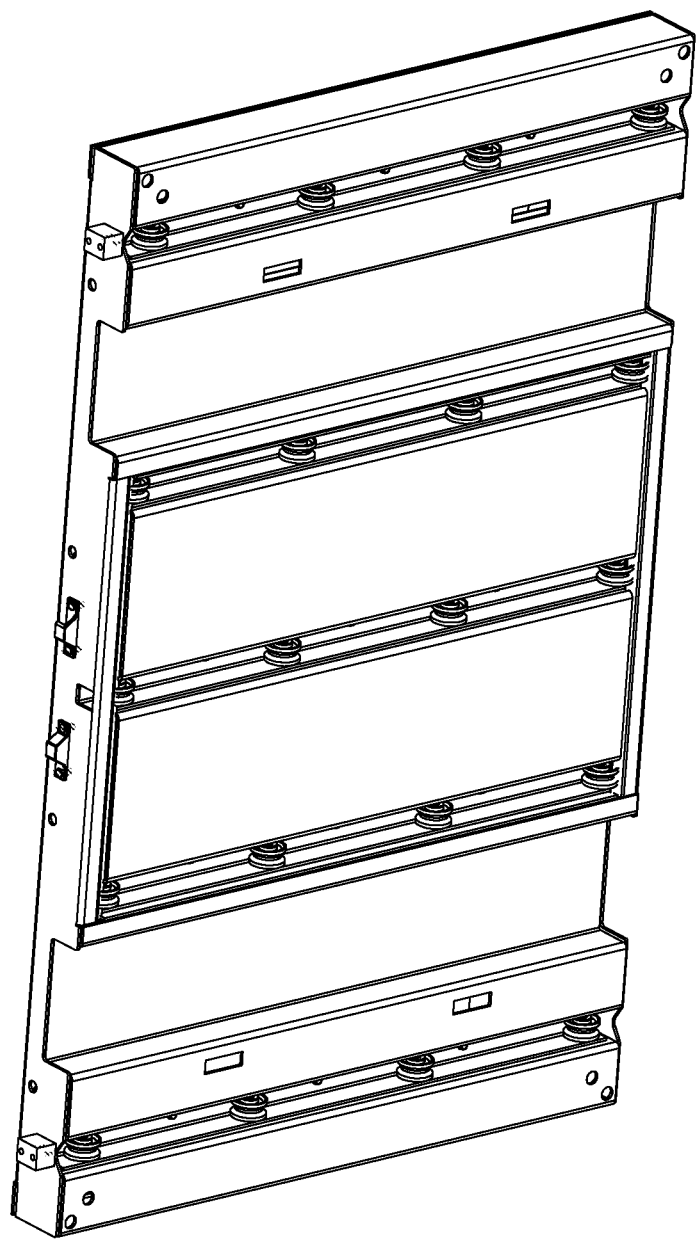
FIG. 43 is a bottom view of a base with additional wheel assemblies.
Figure 44:
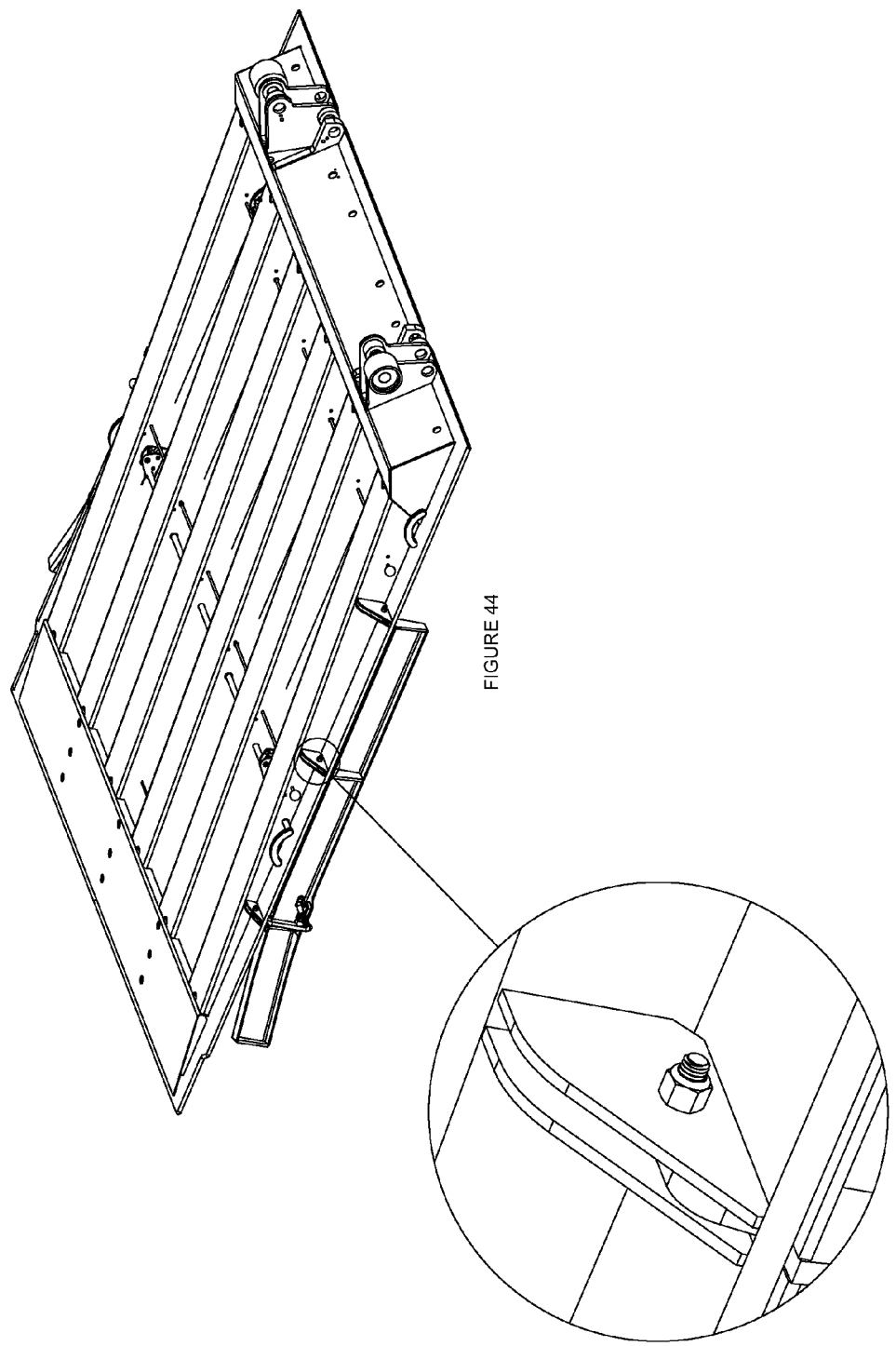
FIGS. 44-45 depict the underside of a liftgate.
Figure 45:
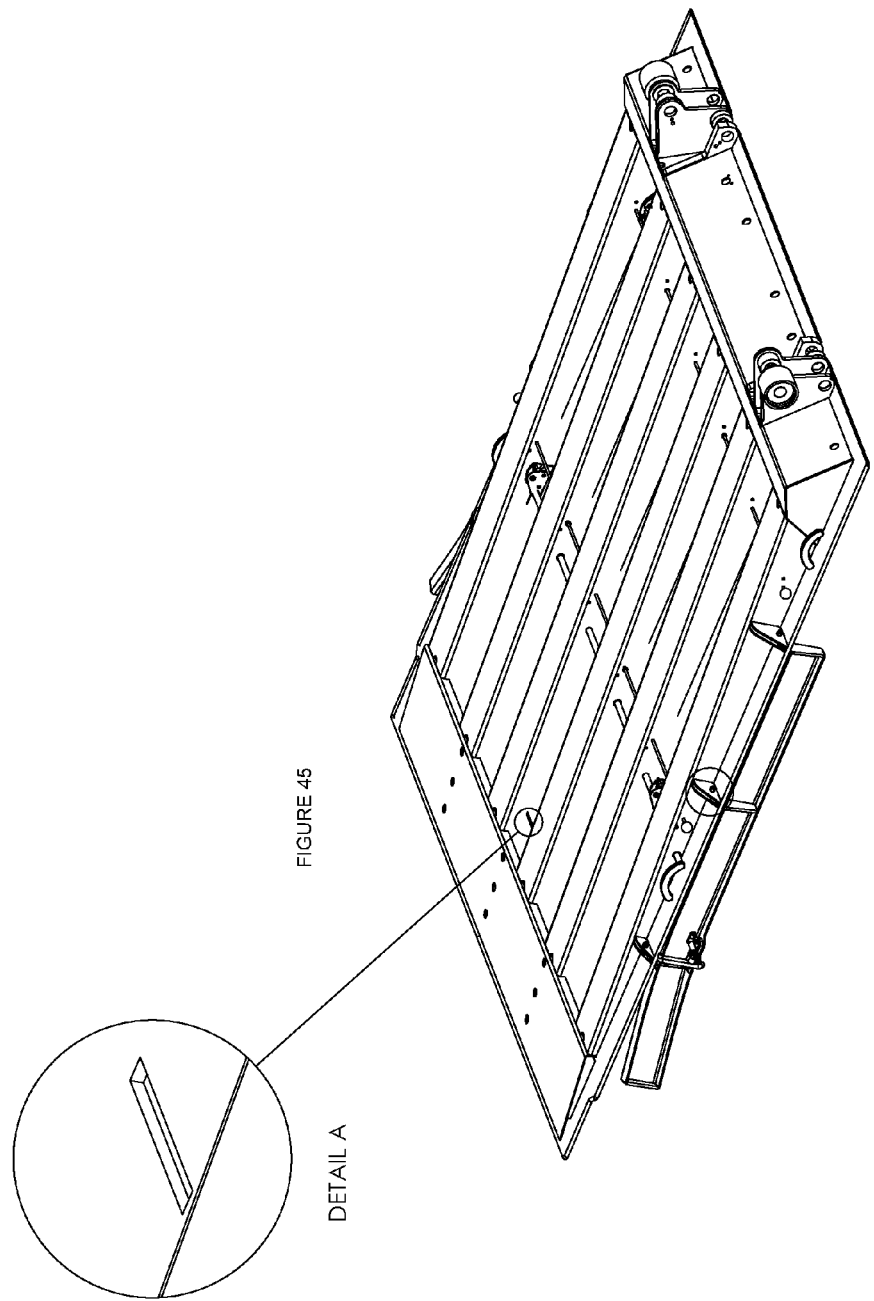
Figure 46:
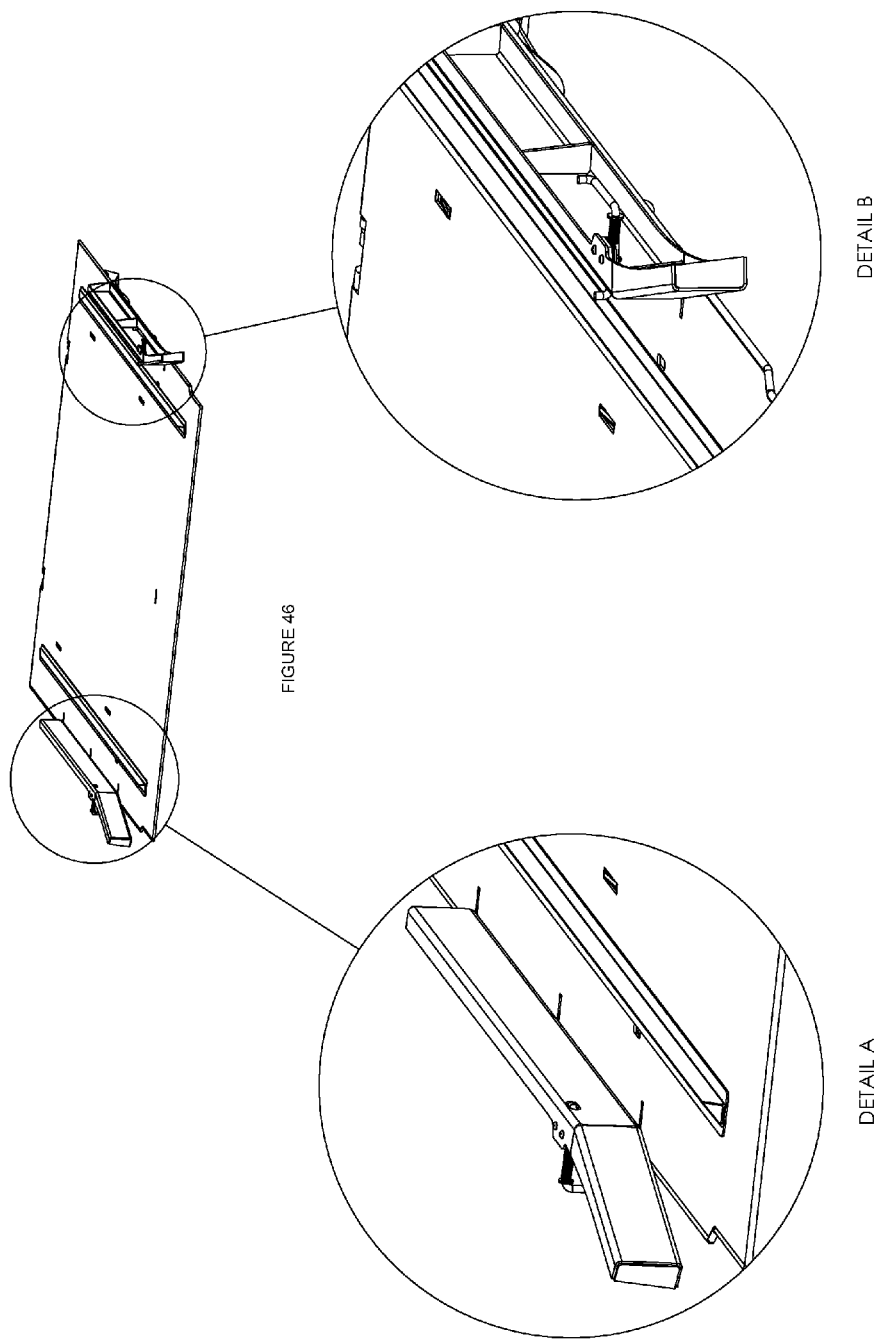
FIGS. 46-47 depict the top side of a liftgate.
Figure 47:
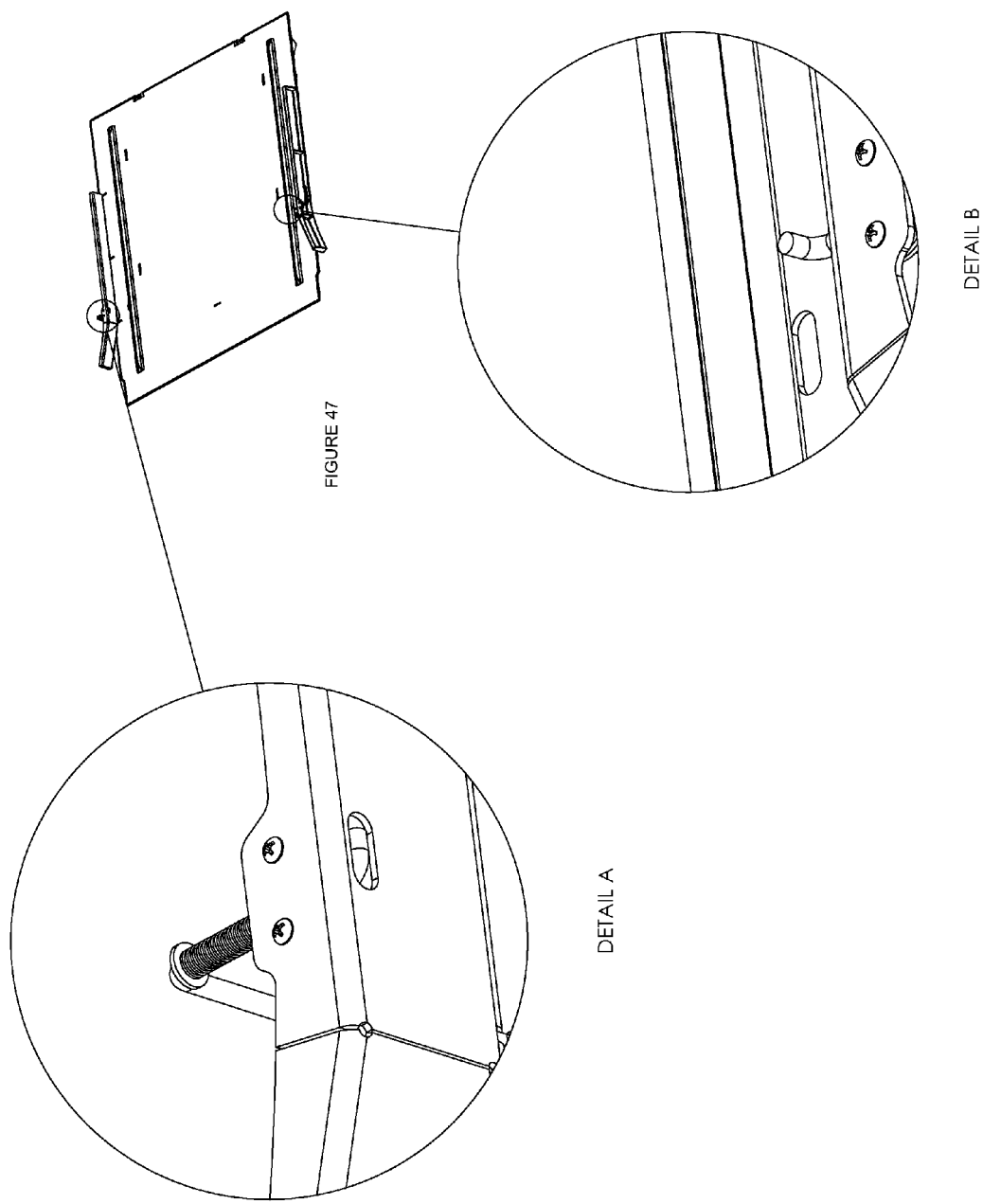
Figure 73:
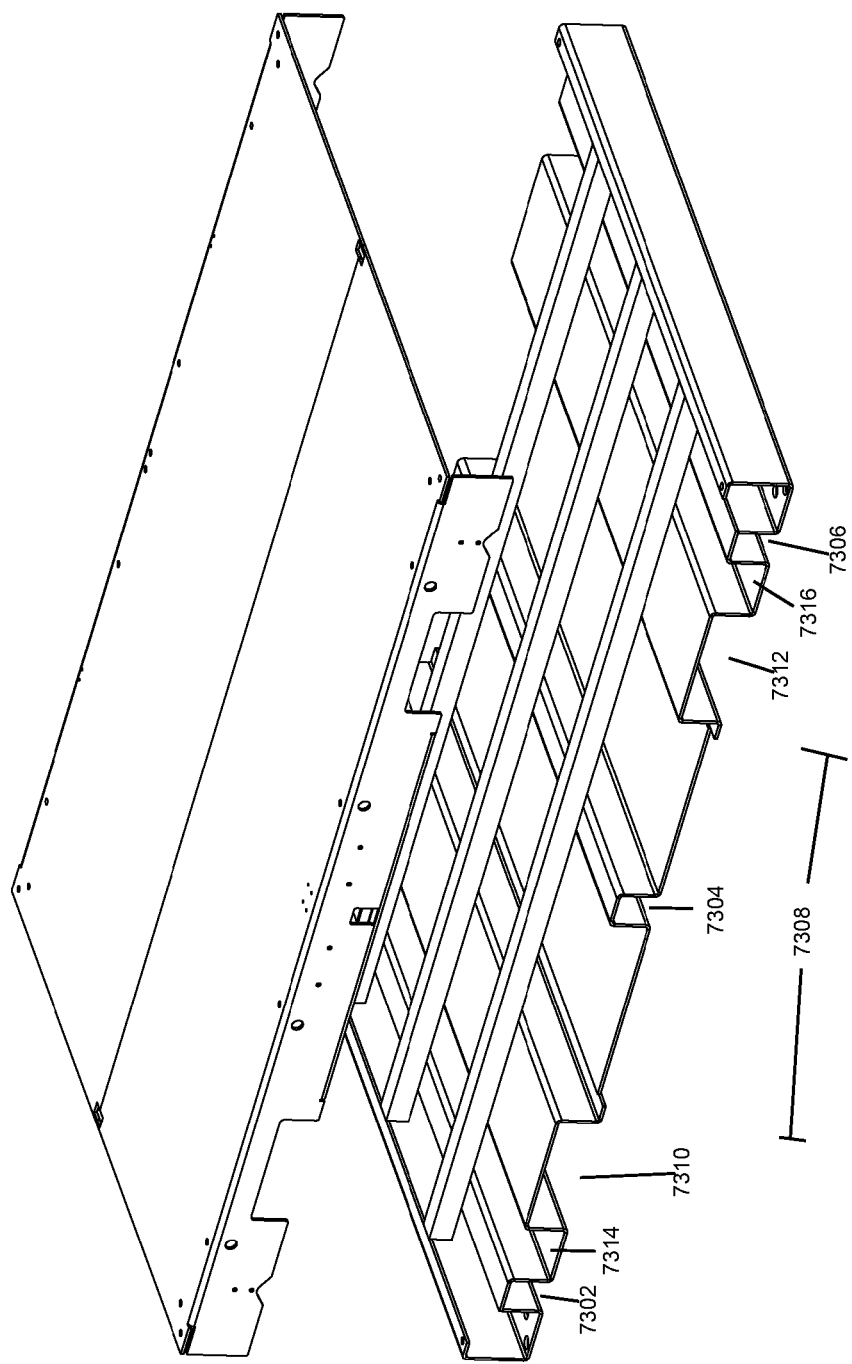
FIG. 73 depicts an exploded view of a base according to the present invention.

As shown in FIG. 73, the base may have any number of open bottom rectangular spaces (e.g. 7302, 7304 and 7306)

and at least one wheel assembly is attached in each of the open bottom rectangular spaces. The base may have a center portion (7308) and a first open bottom channel (7310) between the center portion (7308) and a left open top rectangular portion (7314) and a second open bottom channel (7312) between the center portion (7308) and a right open top rectangular portions (7316). FIG. 43 depicts a base with five open bottom rectangular spaces and at least one wheel assembly attached is each of the open bottom rectangular spaces.

Figure 35:
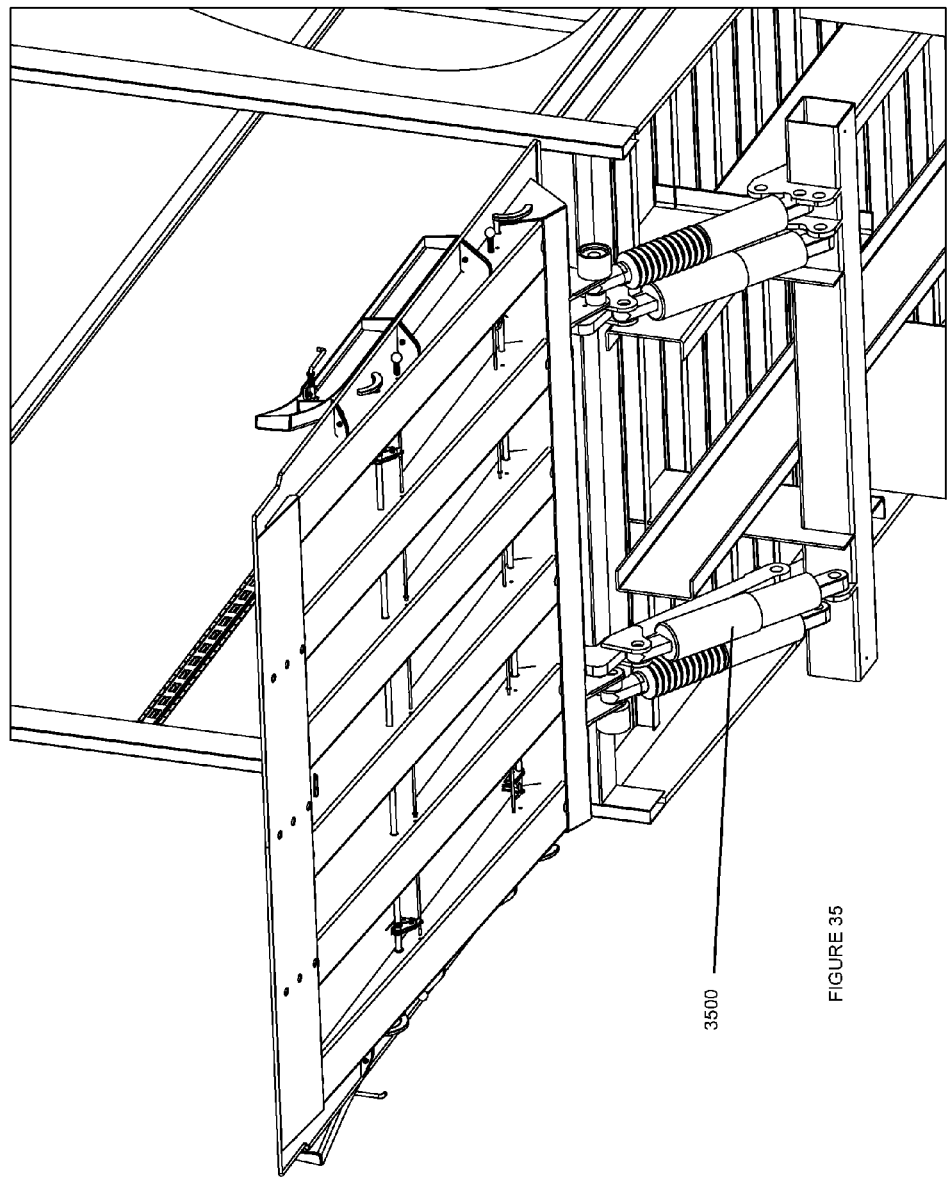
FIG. 35 is a picture of an underside of a lift gate.
Figure 36:
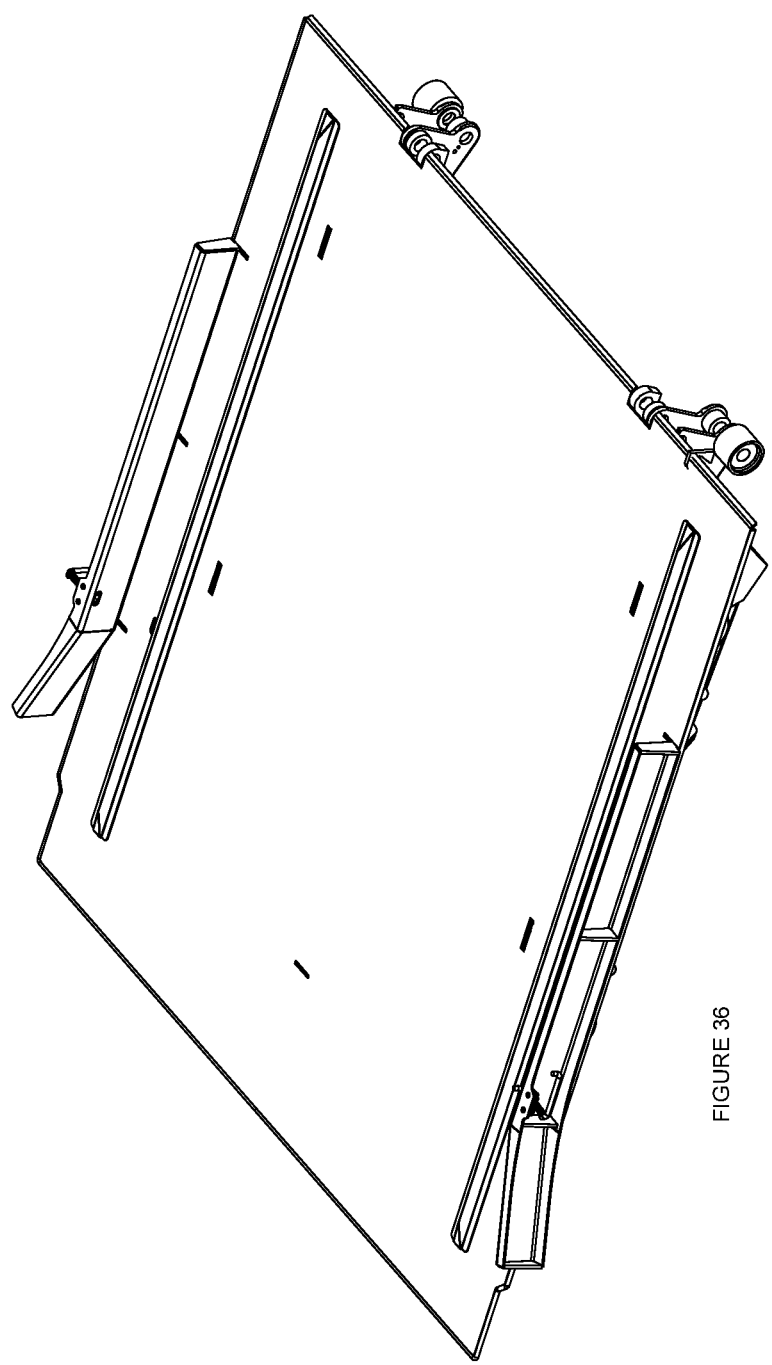
FIGS. 36-37 depict a liftgate.
Figure 37:
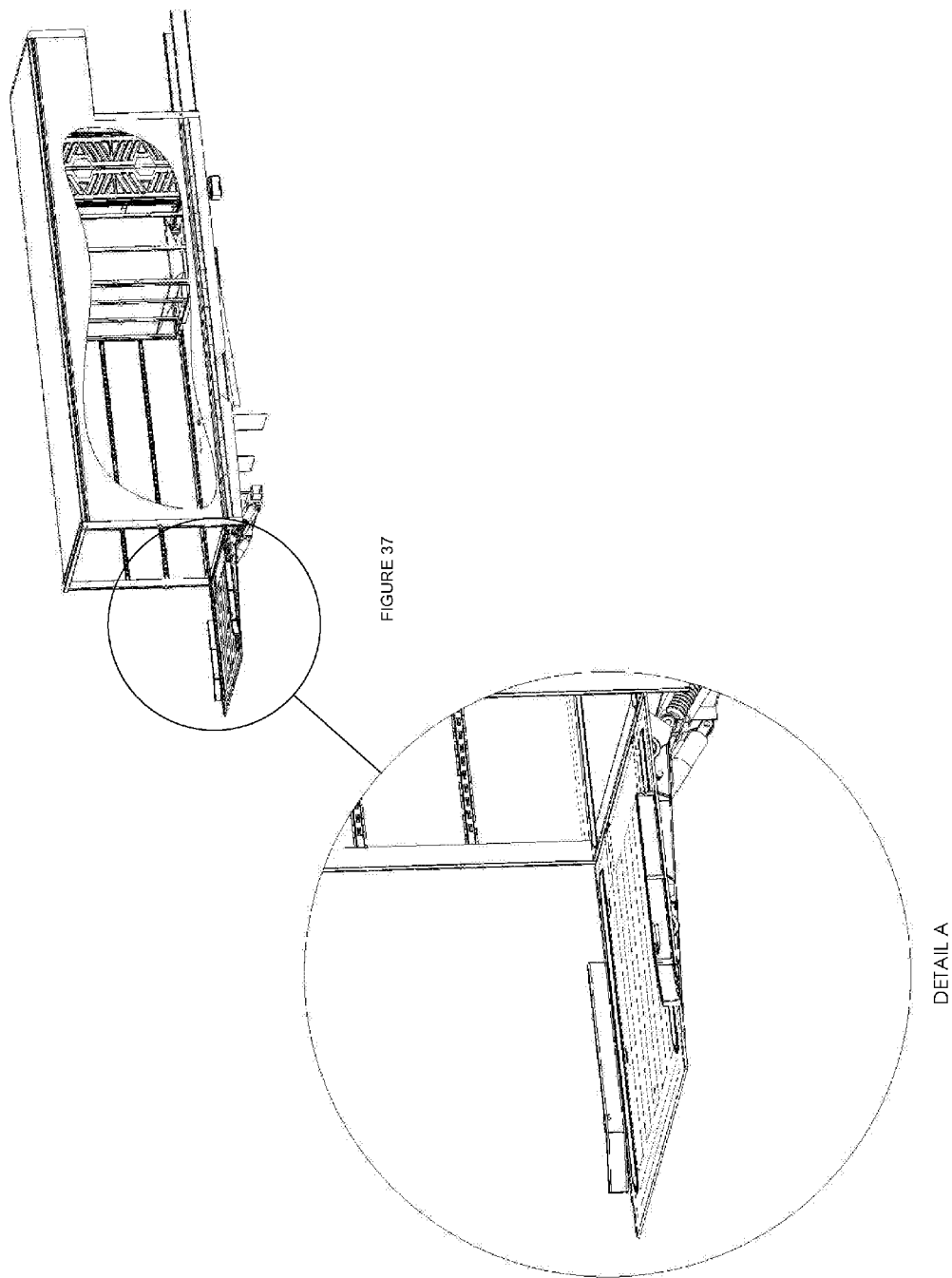
Figure 39:
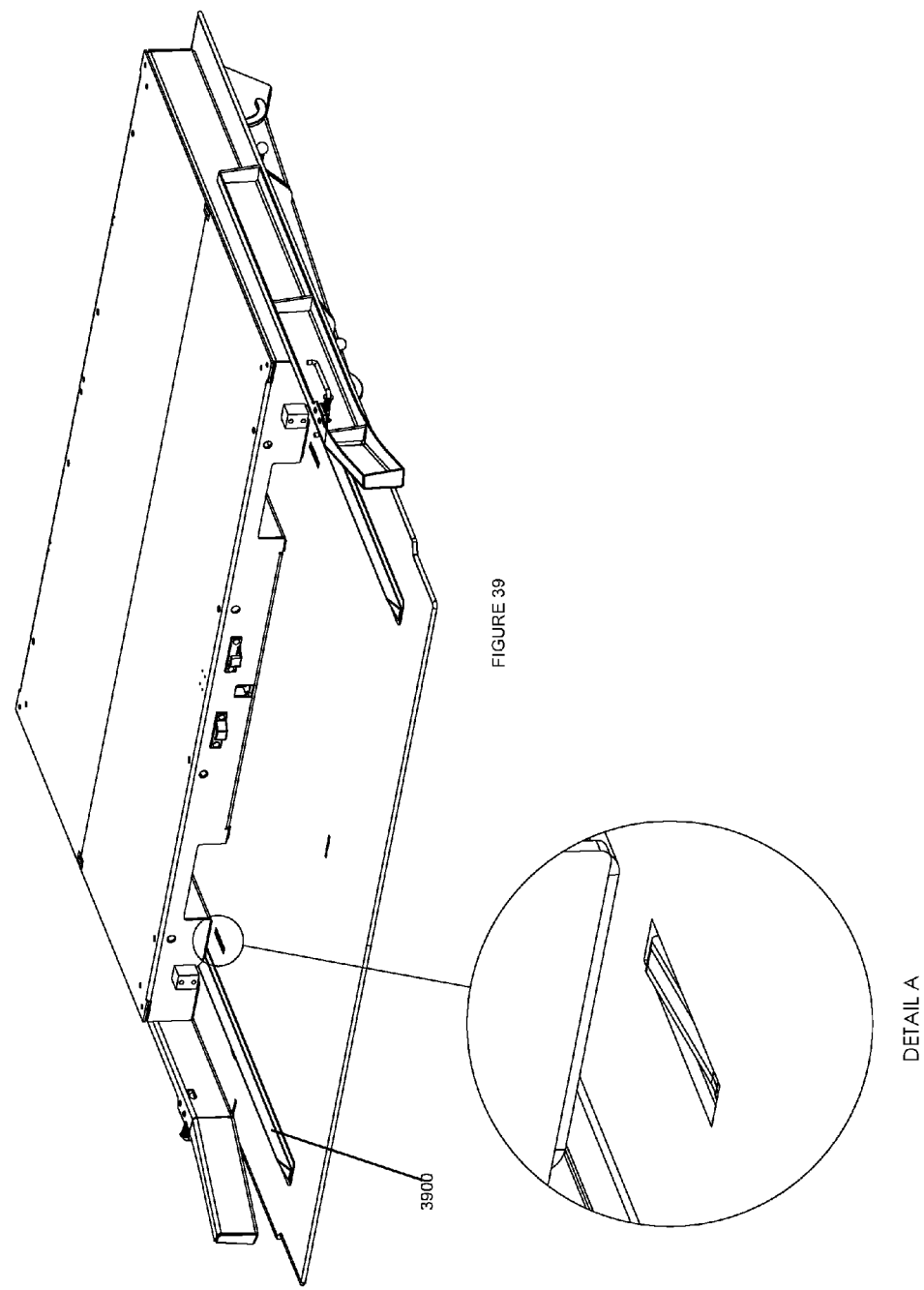
FIGS. 39-41 depict a footstopper on a lift gate.
Figure 40:
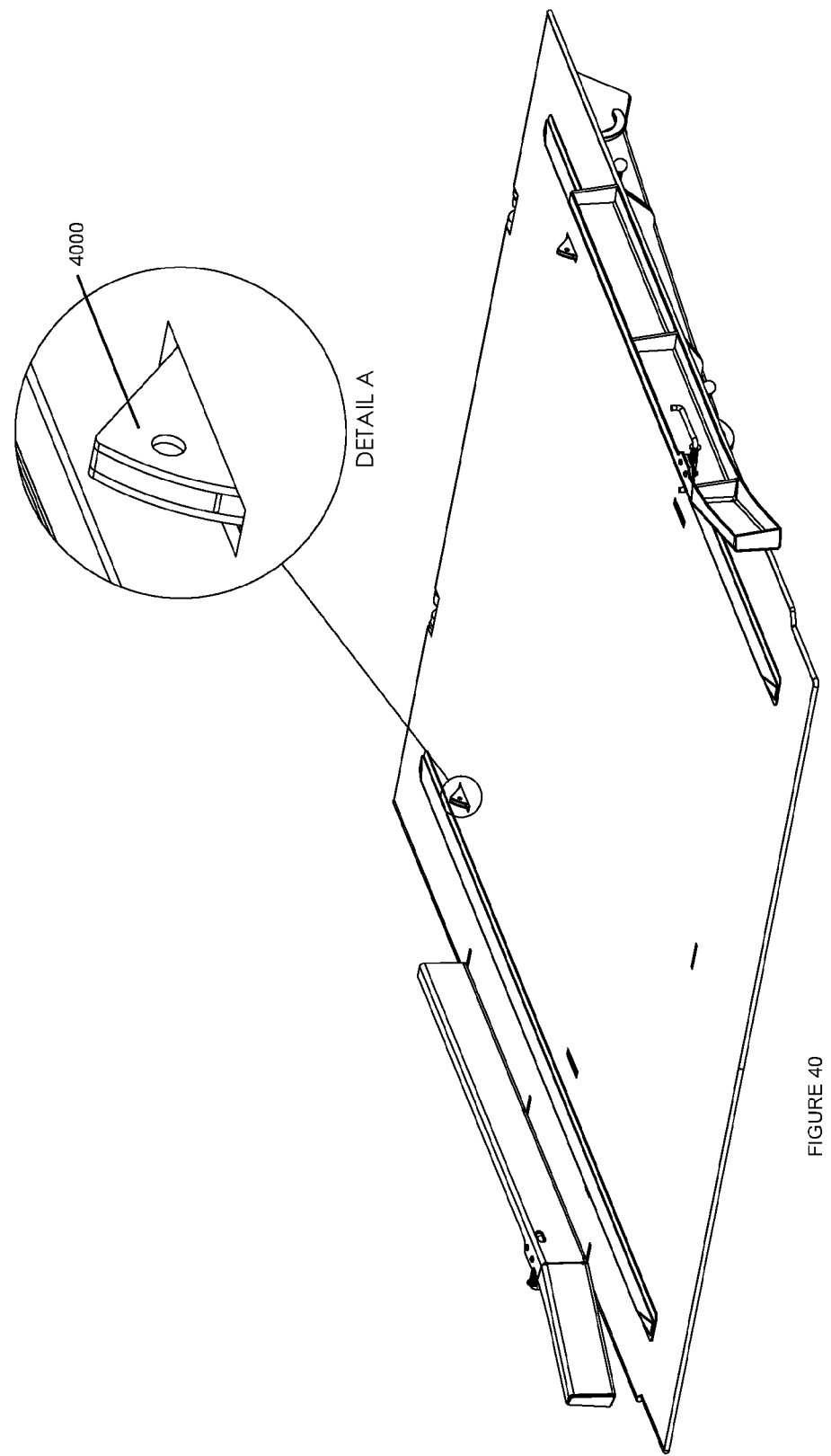
Figure 41:
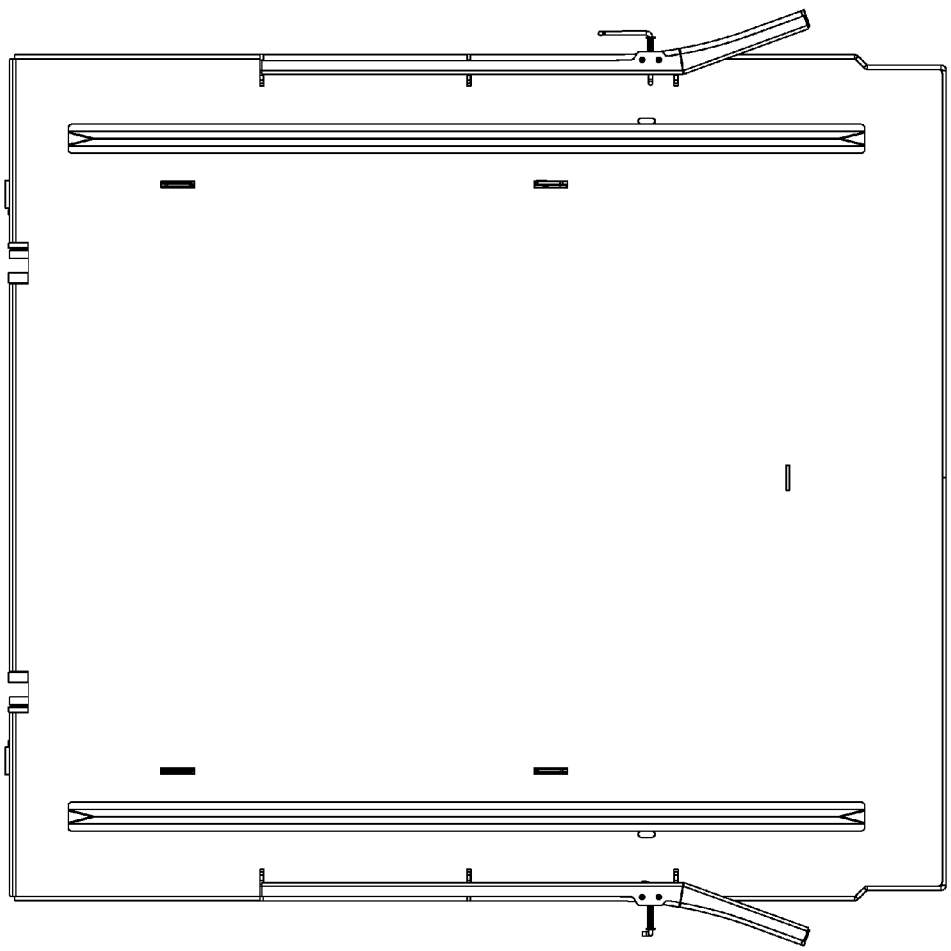

The wheel assembly may be a V-groove wheel assembly. The V-groove wheel assemblies maybe comprised of a V-groove wheel (146) with a bearing, a bolt, a nut and optionally a washer. The term V-groove wheel is intended to describe that there is a channel in the middle of the wheel that is substantially V shaped to allow the V-grove wheel to slide along a V-shaped track (See, for example, FIG. 39 track 3900). FIG. 40, depicts foot stoppers (4000) that will prevent a cargo container base from rolling back. As shown in FIG. 35, there is also shown a picture of a hydraulic (3500) that will lift a lift gate up and down.

Figure 70:
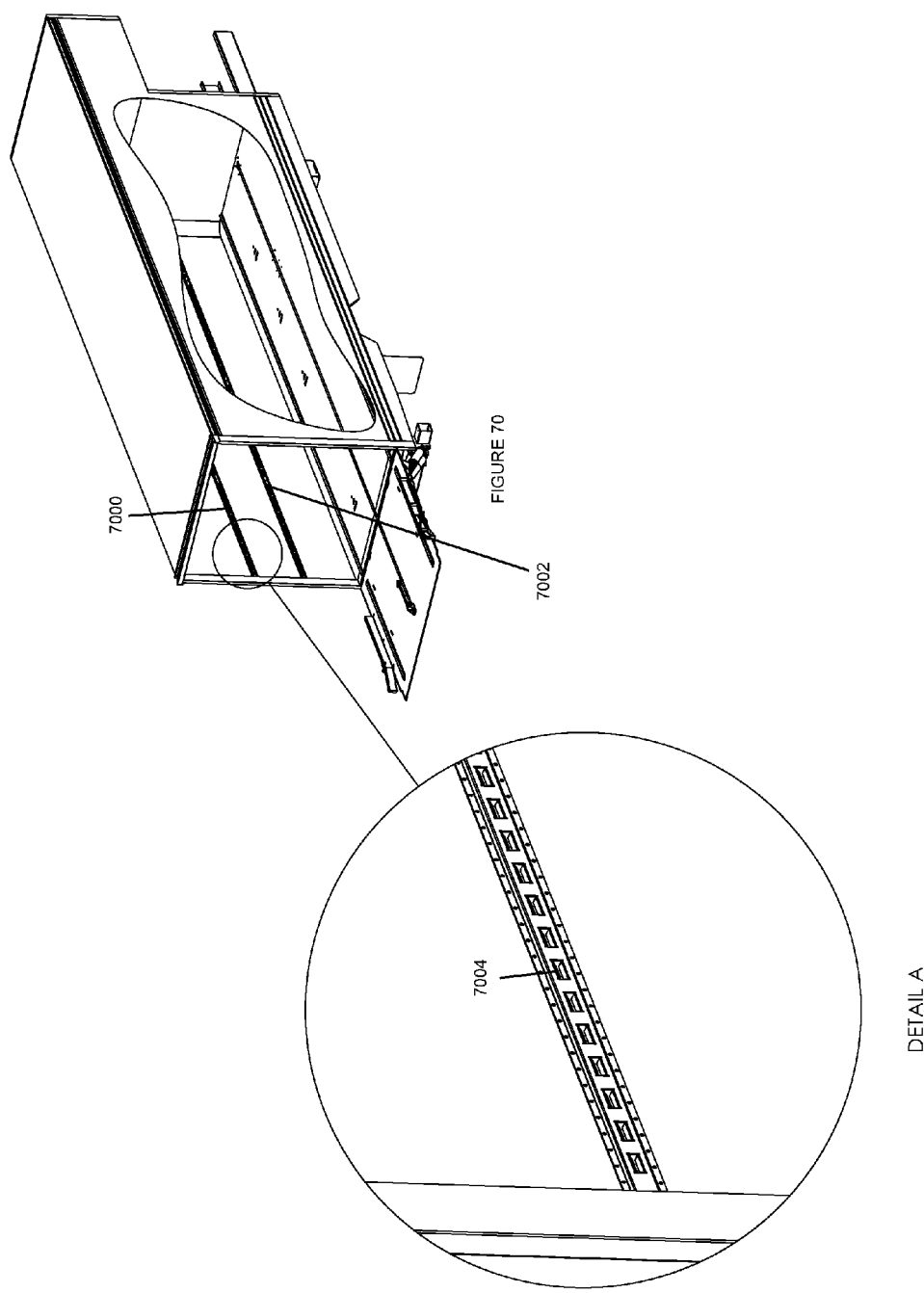
FIG. 70 depicts a truck with a portion of the side removed and an e-track.

FIG. 70 depicts an example of rails that receive straps to secure the cargo. The rails are also referred to as e-tracks and the terms are interchangeable. The cargo container may have a plurality of rails (e.g. 7000 and 7002) with elongated rail openings (e.g. 7004) that receive a strap.

The present invention allows for a cargo container that when empty, a user may easily disassemble in order to provide more efficient transportation. A cargo container base may be constructed out of aluminum or steel. Sides, door, and top of a cargo container are constructed out of aluminum, polyethylene, wood, and steel. The panels having S-shaped ends is also a very important feature of the present invention, as it allows for easy assembly and disassembly and also allows for the panels to expand and contract in heat or extreme cold. The panels having S-shaped ends also prevents water from dripping down at the end of the panel. This is very important, because cargo frequently sits in extreme heat or cold and the contents may expand or contract. If the sides of the panel are not able to do this, they may break and damage valuable cargo.

I claim:

1. A cargo container system, comprising:
   a base;
   at least four end frame supports attached substantially perpendicular to the base, wherein each of the end frame supports has a substantially closed square portion with four sides and having outer extensions extending from two of the four sides and an additional support extending from a junction of the remaining two of the four sides of the substantially closed square portion, wherein the additional support has two substantially L-shaped portions that are substantially parallel to the outer extensions and each of the at least four end frame supports having a corner support that is substantially parallel to the junction;
   at least three panels, wherein each of the panels has two S-shaped ends and at least one of the two S-shaped ends is interposed between one of the two substantially L-Shaped portions that are substantially parallel to the outer extensions;
   at least three rectangular frames each being removably attached to a corner support;
   a top attached to the at least three rectangular frames; and
   at least one door, each at least one door attached by at least one hinge to one of the outer extensions of one of the at least four closed end frame supports.

2. A cargo container system as in claim 1, wherein the two S-shaped ends are shorter than a side portion of the panel.

3. A cargo container system as in claim 1, further comprising a ratchet extension extending from the corner support.

4. A cargo container system as in claim 1, further comprising a female threaded hole, for receipt of a corresponding screw, between the two substantially L-shaped portions that are substantially parallel to the outer extensions and a brace having a hole at a first end and a hole at a second end, wherein a first screw is inserted through the hole at the first end and into a female threaded hole of one of the at least four end frame supports and a second screw is inserted through the hole at the second end and into a female threaded hole of another one of the at least four end frame supports.

5. A cargo container system as in claim 1, further comprising at least one center support attached to the base between two of the at least four end frame supports, wherein the center support has a closed square center portion with four sides and four corners and center extensions extending from each of the four corners of the closed square center portion, two partially open rectangular portions each between two center extensions and having an opening on a side away from the closed square center portion for the receipt of one of the two S-shaped ends of one of the panels.

6. A cargo container as in claim 5, further comprising two substantially L-shaped portions that each extend from one of the four corners and are substantially perpendicular to the center extensions, wherein the two substantially L-Shaped portions are faced in opposing directions.

7. A cargo container as in claim 5, further comprising a partition having a top, bottom, a first side and a second side, wherein one of the first side and the second side is between and supported in an upright position by the two substantially L-shaped portions.

8. A cargo container as in claim 7, further comprising a header support attached to the at least one center support at an end opposite the base and below the top and in communication with the top.

9. A cargo container as in claim 5, further comprising a center support female threaded hole for receipt of a corresponding screw in at least one of the two partially open rectangular portions and a brace having a hole at a first end and a hole at a second end, wherein a first screw is inserted through the hole at the first end and into a center support female threaded hole and a second screw is inserted through the hole at the second end and into a female threaded hole of another center support.

10. A cargo container system as in claim 1, wherein each base has at least two open bottom rectangular spaces and at least one wheel assembly is attached in each of the at least two open bottom rectangular spaces;
   wherein each base has a center portion and a first open bottom channel between the center portion and a left open top rectangular portion and a second open bottom channel between the center portion and a right open top rectangular portions.

11. A cargo container of claim 10, further comprising:
   at least two tracks attached to a bottom interior of a shipping container, wherein at least a portion of each of the at least one wheel assemblies slides along one of the at least two tracks.

12. A cargo container system as in claim 11, wherein the at least one wheel assembly is a V-groove wheel assembly.

13. A cargo container system as in claim 11, further comprising:

at least two tracks attached to a bottom interior of a shipping container, wherein at least a portion of each of the at least one wheel assemblies slides along one of the at least two tracks.

14. A cargo container as in claim 10, wherein each of the at least one wheel assemblies is an open bottom rectangle having a left side, a right side and a top side with at least two wheels rotatably attached to the left side and the right side and the top side attached to one of the at least two open bottom rectangular spaces.

15. A cargo container system as in claim 14, wherein each of the at least two tracks are V-shaped tracks.

16. A cargo container system as in claim 14, further comprising a pulley system assembly attached to the bottom interior of the shipping container and aligned with a center portion opening along a middle front portion of the center portion opening, wherein a portion of the pulley system assembly threads the center portion opening.

17. A cargo container as in claim 10, wherein each of the at least two open bottom rectangular spaces are formed by an open top rectangular portion and a substantially open top rectangular portion with an outer side and an inner side, the outer side having a greater height than the inner side and a lip extending towards the center portion.

18. A cargo container as in claim 17, further comprising at least one support on top of the at least two open bottom rectangular spaces and retained by the lip extending towards the center portion of two opposed substantially open top rectangular portions.

19. A cargo container system as in claim 1, wherein the at least three rectangular frames extend above the corner support and the at least three panels.

20. A cargo container system as in claim 1, wherein each base has a center portion and a first open bottom channel between the center portion and a left open top rectangular portion and a second open bottom channel between the center portion and a right open top rectangular portions.

21. A cargo container system, comprising:
a base wherein each base has at least two open bottom rectangular spaces and at least one wheel assembly is attached in each of the at least two open bottom rectangular spaces;
at least four end frame supports attached substantially perpendicular to the base, wherein each of the end frame supports has a substantially closed square portion with four sides and having outer extensions extending from two of the four sides and an additional support extending from a junction of the remaining two of the four sides of the substantially closed square portion, wherein the additional support has two substantially L-shaped portions that are substantially parallel to the outer extensions and each of the at least four end frame supports having a corner support that is substantially parallel to the junction;
at least three panels, wherein each of the panels has two S-shaped ends and at least one of the two S-shaped ends is interposed between one of the two substantially L-Shaped portions that are substantially parallel to the outer extensions;
at least three rectangular frames each being removably attached to a corner support;
a top attached to the at least three rectangular frames;
at least one door, each at least one door attached by at least one hinge to one of the outer extensions of one of the at least four closed end frame supports.

22. A cargo container system as in claim 21, wherein the two S-shaped ends are shorter than a side portion of the panel.

23. A cargo container system as in claim 21, further comprising a ratchet extension extending from the corner support.

24. A cargo container system as in claim 21, further comprising a female threaded hole, for receipt of a corresponding screw, between the two substantially L-shaped portions that are substantially parallel to the outer extensions and a brace having a hole at a first end and a hole at a second end, wherein a first screw is inserted through the hole at the first end and into a female threaded hole of one of the at least four end frame supports and a second screw is inserted through the hole at the second end and into a female threaded hole of another one of the at least four end frame supports.

25. A cargo container system as in claim 21, further comprising at least one center support attached to the base between two of the at least four end frame supports, wherein the center support has a closed square center portion with four sides and four corners and center extensions extending from each of the four corners of the closed square center portion, two partially open rectangular portions each between two center extensions and having an opening on a side away from the closed square center portion for the receipt of one of the two S-shaped ends of one of the panels.

26. A cargo container as in claim 25, further comprising two substantially L-shaped portions that each extend from one of the four corners and are substantially perpendicular to the center extensions, wherein the two substantially L-Shaped portions are faced in opposing directions.

27. A cargo container as in claim 25, further comprising a partition having a top, bottom, a first side and a second side, wherein one of the first side and the second side is between and supported in an upright position by the two substantially L-shaped portions.

28. A cargo container as in claim 27, further comprising a header support attached to the at least one center support at an end opposite the base and below the top and in communication with the top.

29. A cargo container as in claim 25, further comprising a center support female threaded hole for receipt of a corresponding screw in at least one of the two partially open rectangular portions and a brace having a hole at a first end and a hole at a second end, wherein a first screw is inserted through the hole at the first end and into a center support female threaded hole and a second screw is inserted through the hole at the second end and into a female threaded hole of another center support.

* * * * *